US008698845B2

(12) United States Patent
Lemay

(10) Patent No.: US 8,698,845 B2
(45) Date of Patent: Apr. 15, 2014

(54) DEVICE, METHOD, AND GRAPHICAL USER INTERFACE WITH INTERACTIVE POPUP VIEWS

(75) Inventor: Stephen O. Lemay, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 729 days.

(21) Appl. No.: 12/789,426

(22) Filed: May 27, 2010

(65) Prior Publication Data

US 2011/0164058 A1  Jul. 7, 2011

Related U.S. Application Data

(60) Provisional application No. 61/292,498, filed on Jan. 6, 2010.

(51) Int. Cl.
*G09G 5/32* (2006.01)
*G09G 5/14* (2006.01)

(52) U.S. Cl.
CPC .................................... *G09G 5/14* (2013.01)
USPC ........... 345/659; 345/649; 345/619; 345/158; 345/173; 345/169

(58) Field of Classification Search
CPC .......... G09G 2340/0492; G09G 5/393; G09G 2340/0464; G09G 2340/145; G09G 5/363; G09G 3/3611; G09G 5/14; G09G 2340/0471; G09G 2340/0478
USPC .................. 345/659, 649, 619, 158, 173, 169
See application file for complete search history.

(56) References Cited

U.S. PATENT DOCUMENTS 5,910,882 A * 6/1999 Burrell ..................... 361/679.56
6,115,043 A   9/2000 Levine et al.
(Continued)

FOREIGN PATENT DOCUMENTS

CN   1955906    5/2007
CN   101102573   1/2008
(Continued)

OTHER PUBLICATIONS

Moth, D., "Share Code—Write Code Once for Both Mobile and Desktop Apps," MSDN Magazine, Jul. 2007, 11 pages, http://msdn.microsoft.com/en-us/magazine/cc163387.aspx.

(Continued)

*Primary Examiner* — Javid A Amini
(74) *Attorney, Agent, or Firm* — Morgan, Lewis & Bockius LLP

(57) ABSTRACT

A method of operating a multifunction device includes: displaying a respective view of a first application on the touch screen display, detecting a first touch gesture within the respective view, and in response to detecting the first touch gesture, displaying a popup view of the first application partially covering the respective view of the first application. The popup view corresponds to a full-screen-width view in a corresponding first application on a second multifunction device having a touch screen display with lower resolution than the touch screen display of the first multifunction device. The method further includes: detecting one or more second touch gestures within the popup view, and in response to detecting the one or more second touch gestures within the popup view, performing an action in the first application that updates a state of the first application.

15 Claims, 76 Drawing Sheets

(56) References Cited

U.S. PATENT DOCUMENTS

| | | | |
|---|---|---|---|
| 6,459,424 | B1 | 10/2002 | Resman |
| 6,489,975 | B1 | 12/2002 | Patil et al. |
| 6,831,666 | B1 | 12/2004 | Kreis |
| 7,036,088 | B2 | 4/2006 | Tunney |
| 7,134,093 | B2 | 11/2006 | Etgen et al. |
| 7,346,855 | B2 | 3/2008 | Hellyar et al. |
| 7,380,218 | B2 | 5/2008 | Rundell |
| 7,581,186 | B2 | 8/2009 | Dowdy et al. |
| 7,673,255 | B2 | 3/2010 | Schechter et al. |
| 7,694,236 | B2 | 4/2010 | Gusmorino et al. |
| 7,739,604 | B1 | 6/2010 | Lyons et al. |
| 7,757,185 | B2 | 7/2010 | Paquette et al. |
| 7,788,595 | B2 | 8/2010 | Biwer et al. |
| 7,880,728 | B2 | 2/2011 | de los Reyes et al. |
| 7,921,373 | B2 | 4/2011 | Yamashita et al. |
| 8,010,900 | B2 | 8/2011 | Hart et al. |
| 8,020,028 | B1 | 9/2011 | Lutter |
| 8,024,670 | B1 | 9/2011 | Rahmatian et al. |
| 8,046,712 | B2 | 10/2011 | Landman et al. |
| 8,214,768 | B2 | 7/2012 | Boule et al. |
| 2004/0025112 | A1 | 2/2004 | Chasen et al. |
| 2004/0155908 | A1 | 8/2004 | Wagner |
| 2005/0022138 | A1 | 1/2005 | Tunney |
| 2006/0107226 | A1 | 5/2006 | Matthews et al. |
| 2006/0161861 | A1 | 7/2006 | Holecek et al. |
| 2006/0242602 | A1 | 10/2006 | Schechter et al. |
| 2006/0265653 | A1 | 11/2006 | Paasonen et al. |
| 2007/0004451 | A1* | 1/2007 | Anderson ............... 455/556.1 |
| 2007/0128899 | A1 | 6/2007 | Mayer |
| 2007/0157089 | A1 | 7/2007 | van Os et al. |
| 2007/0220445 | A1 | 9/2007 | Yach et al. |
| 2007/0226327 | A1* | 9/2007 | Redpath ..................... 709/223 |
| 2007/0262964 | A1 | 11/2007 | Zotov et al. |
| 2008/0036743 | A1 | 2/2008 | Westerman et al. |
| 2008/0094368 | A1 | 4/2008 | Ording et al. |
| 2008/0109753 | A1 | 5/2008 | Karstens |
| 2008/0165144 | A1* | 7/2008 | Forstall et al. ............. 345/173 |
| 2008/0165152 | A1 | 7/2008 | Forstall et al. ............. 345/173 |
| 2008/0168379 | A1 | 7/2008 | Forstall et al. |
| 2008/0168401 | A1 | 7/2008 | Boule et al. |
| 2008/0211959 | A1 | 9/2008 | Balram et al. |
| 2008/0270910 | A1 | 10/2008 | Lukasik et al. |
| 2009/0036108 | A1 | 2/2009 | Chou |
| 2009/0293007 | A1 | 11/2009 | Duarte et al. |
| 2010/0088628 | A1 | 4/2010 | Flygh et al. |
| 2010/0125816 | A1* | 5/2010 | Bezos ........................ 715/863 |
| 2010/0269039 | A1 | 10/2010 | Pahlavan et al. |
| 2010/0299597 | A1 | 11/2010 | Shin et al. |
| 2011/0035662 | A1* | 2/2011 | King et al. .................. 715/273 |
| 2011/0043652 | A1* | 2/2011 | King et al. ................ 348/222.1 |
| 2011/0087982 | A1 | 4/2011 | McCann et al. |
| 2011/0096174 | A1* | 4/2011 | King et al. ................ 348/207.1 |
| 2011/0145068 | A1* | 6/2011 | King et al. ................ 705/14.55 |
| 2011/0164042 | A1* | 7/2011 | Chaudhri .................... 345/473 |
| 2011/0167058 | A1* | 7/2011 | van Os ....................... 707/722 |
| 2011/0167339 | A1* | 7/2011 | Lemay ........................ 715/255 |
| 2011/0167382 | A1* | 7/2011 | van Os ....................... 715/800 |
| 2011/0202872 | A1 | 8/2011 | Park |
| 2011/0258582 | A1 | 10/2011 | Bang |
| 2011/0296333 | A1 | 12/2011 | Bateman et al. |
| 2011/0307778 | A1 | 12/2011 | Tsai et al. |
| 2012/0216139 | A1* | 8/2012 | Ording et al. ............... 715/773 |
| 2012/0218304 | A1* | 8/2012 | Anzures et al. ............. 345/649 |
| 2013/0080923 | A1* | 3/2013 | Anzures et al. ............. 715/753 |

FOREIGN PATENT DOCUMENTS

| | | | |
|---|---|---|---|
| CN | 101727268 A | 6/2010 | |
| EP | 1 562 105 A2 | 8/2005 | ............. G06F 3/033 |
| EP | 1 568 966 A2 | 8/2005 | ............. G01C 17/30 |
| EP | 1 571 549 A2 | 9/2005 | |
| EP | 1 640 855 A2 | 3/2006 | |
| WO | WO 2009/059062 | 5/2009 | |
| WO | WO 2009/143294 | 11/2009 | |

OTHER PUBLICATIONS

International Search Report and Written Opinion dated May 17, 2011, received in International Applcation No. PCT/US2010/062306, which corresponds to U.S. Appl. No. 12/789,426.

European Search Report dated May 16, 2011, received in European Patent Application No. 11150223.3, which corresponds to U.S. Appl. No. 12/789,426.

Apple: "iPhone User Guide for iPhone and iPhone 3G," Jul. 11, 2008, 154 pages, http://manuals.info.apple.com/en_US/iPhone_User_Guide.pdf.

Fehily, C., "Vsual QuickStart Guide: Miorcsoft Windows. 7," 2009, Peachpit Press, pp. x, 34-37, 40, 71, 76, and 267.

HTC, "User Manual—PDA Phone—HTC_P3050 Touch," Nov. 2, 2007, pp. 12-28, http://web.archive.org/web/20101228223033/http://www.comparecellular.com/images/phones/userguide1130.pdf.

Jade et al., "Apple's iPhone 4.0 to support multitasking via Expose-like interface," appleInsider.com, Mar. 31, 2010, 4 pages, http://www.appleinsider.com/articles/10/03/31/apples_iphone_4_0_to_support_muititasking_via_expose_like_interface.html.

Jade et al., "Apple's iPhone 4.0 software to deliver multitasking support," Appleinsider.com, Mar. 11, 2010, 3 pages, http://www.appleinsider.com/articles/10/03/11/apples_iphone_4_0_software_to_deliver_multitasking_support.html.

Newman, "Sprint's HTC EVO 4G: 5 Killer Features," pcworld, Mar. 24, 2010, 3 pages, http://www.pcworld.com/article/192286/sprints_htc_evo_4g_5_killer_features.html.

Nickinson, "Review: The new HTC Sense interface on Android phones," Android Central, Feb. 22, 2010, 10 pages, http://www.androidcentral.com/review-new-htc-sense-android-phones.

Nilsson, D., "Design guidelines for mobile applications," SINTEF ICT, Jun. 2008, 73 pages.

Nilsson et al., "Design patterns for user interface for mobile applications," Advances in Engineering Software, Elsevier Science, Oxford, GB, vol. 40, No. 12, Dec. 1, 2009, pp. 1318-1328.

Rieger, B., Effective Desion for Multipie Screen Sizes, Jan. 2009, 12 pages.

Savov, "HTC enhances Sense with Leap and Friend Stream (updated with video)," Engadget, Feb. 16, 2010, http://www.engadget.com/2010/02/16/htc-enhances-sense-with-leap-and-friend-stream/.

Seffah et al., "Multi-devices 'Multiple' user interfaces: development models and research opportunities," The Journal of Systems and Software, available online Dec. 2003, 14 pages.

Viana et al., "Xmobile: A MB-UID environment of semi-automatic generation of adaptive applications for mobile devices," The Journal of Systems and Software, available online Jun. 2007, 13 pages.

International Search Report and Written Opinion dated Apr. 14, 2011, received in International Application No. PCT/US2010/062309, which corresponds to U.S. Appl. No. 12/788,277, 13 pages (Chaudhri).

International Search Report and Written Opinion dated Dec. 10, 2010, received in International Application No. PCT/US2010/050057, which corresponds to U.S. Appl. No. 12/888,381, 10 pages (Chaudhri).

Office Action dated Jun. 14, 2013, received in Australian Patent Application No. 2010339698, which corresponds to U.S. Appl. No. 12/789,426, 3 pages (Lemay).

Office Action dated Mar. 29, 2012, received in European Patent Application No. 11 150 223.3, which corresponds to U.S. Appl. No. 12/789,426, 2 pages (Lemay).

Decision to Grant dated Aug. 1, 2013, received in European Patent Application No. 01150223.3, which corresponds to U.S. Appl. No. 12/789,426, 1 page (Lemay).

Office Action dated Aug. 30, 2012, received in U.S. Appl. No. 12/788,277, 17 pages (Chaudhri).

Final Office Action dated Mar. 12, 2013, received in U.S. Appl. No. 12/788,277, 20 pages (Chaudhri).

Office Action dated Jun. 14, 2013, received in Australian Patent Application No. 2010339633, which corresponds to U.S. Appl. No. 12/788,277, 3 pages (Chaudhri).

(56) References Cited

OTHER PUBLICATIONS

Office Action dated Aug. 28, 2012, received in European Patent Application No. 11 150 188.8, which corresponds to U.S. Appl. No. 12/788,277, 4 pages (Chaudhri).
Office Action dated May 22, 2012, received in U.S. Appl. No. 12/888,381, 19 pages (Chaudhri).
Final Office Action dated Nov. 19, 2012, received in U.S. Appl. No. 12/888,381, 16 pages (Chaudhri).
Office Action dated Aug. 8, 2013, received in Australian Patent Application No. 2010350740, which corresponds to U.S. Appl. No. 12/888,381, 3 pages (Chaudhri).
Office Action dated Aug. 28, 2012, received in Chinese Patent Application No. 201010602688.2, which corresponds to U.S. Appl. No. 12/888,381, 6 pages (Chaudhri).
Office Action dated May 24, 2013, received in Chinese Patent Application No. 201010602688.2, which corresponds to U.S. Appl. No. 12/888,381, 7 pages (Chaudhri).
Office Action dated Aug. 6, 2013, received in European Patent Application No. 10 760 867.1, which corresponds to U.S. Appl. No. 12/888,381, 4 pages (Chaudhri).
Office Action dated May 10, 2012, received in U.S. Appl. No. 12/888,382, 9 pages (Chaudhri).
Final Office Action dated Nov. 15, 2012, received in U.S. Appl. No. 12/888,382, 14 pages (Chaudhri).
Office Action dated May 17, 2012, received in U.S. Appl. No. 12/888,384, 15 pages (Chaudhri).
Final Office Action dated Nov. 7, 2012, received in U.S. Appl. No. 12/888,384, 15 pages (Chaudhri).
Office Action dated May 16, 2012, received in U.S. Appl. No. 12/888,386, 12 pages (Chaudhri).
Final Office Action dated Nov. 8, 2012, received in U.S. Appl. No. 12/888,386, 16 pages (Chaudhri).
Office Action dated Jan. 23, 2013, received in U.S. Appl. No. 12/888,389, 14 pages (Chaudhri).
Final Office Action dated Sep. 12, 2013, received in U.S. Appl. No. 12/888,389, 10 pages (Chaudhri).
Notice of Allowance dated Jun. 15, 2012, received in U.S. Appl. No. 12/888,391, 26 pages (Chaudhri).
Office Action dated Jun. 28, 2013, received in U.S. Appl. No. 13/077,524, 21 pages.
Office Action dated Mar. 19, 2013, received in U.S. Appl. No. 13/333,909, 20 pages (Khoe).

\* cited by examiner

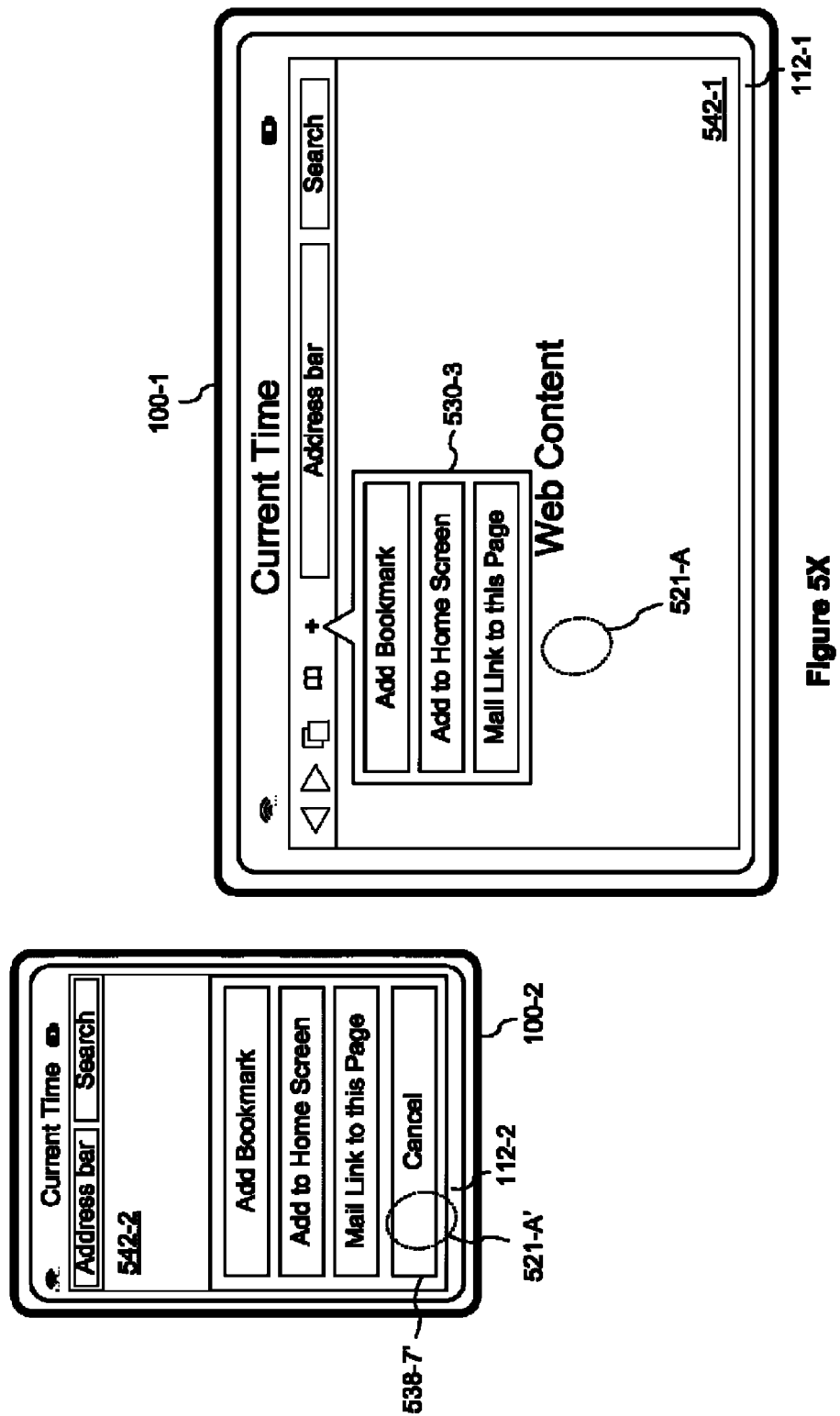

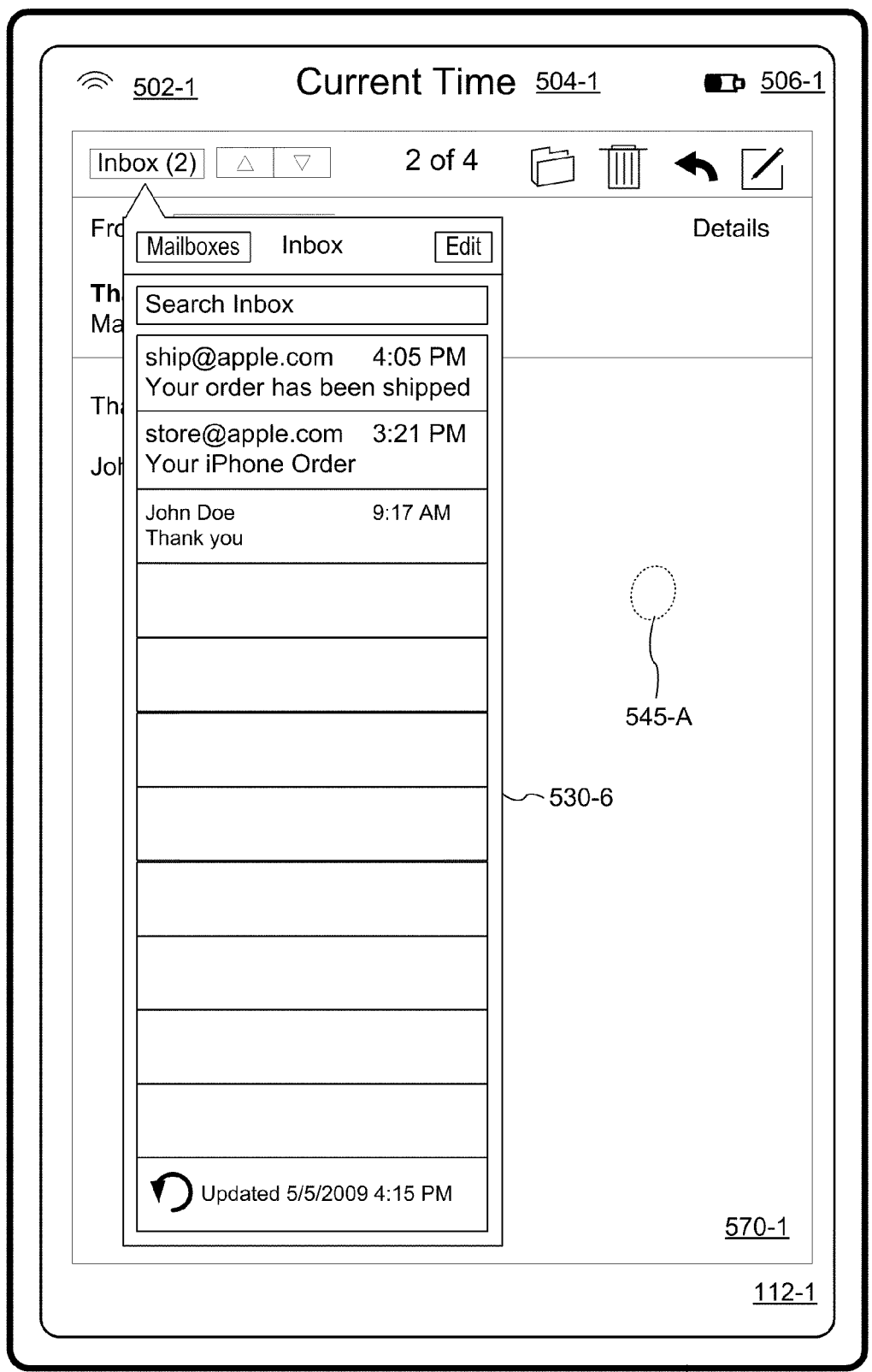
Figure 5AAA

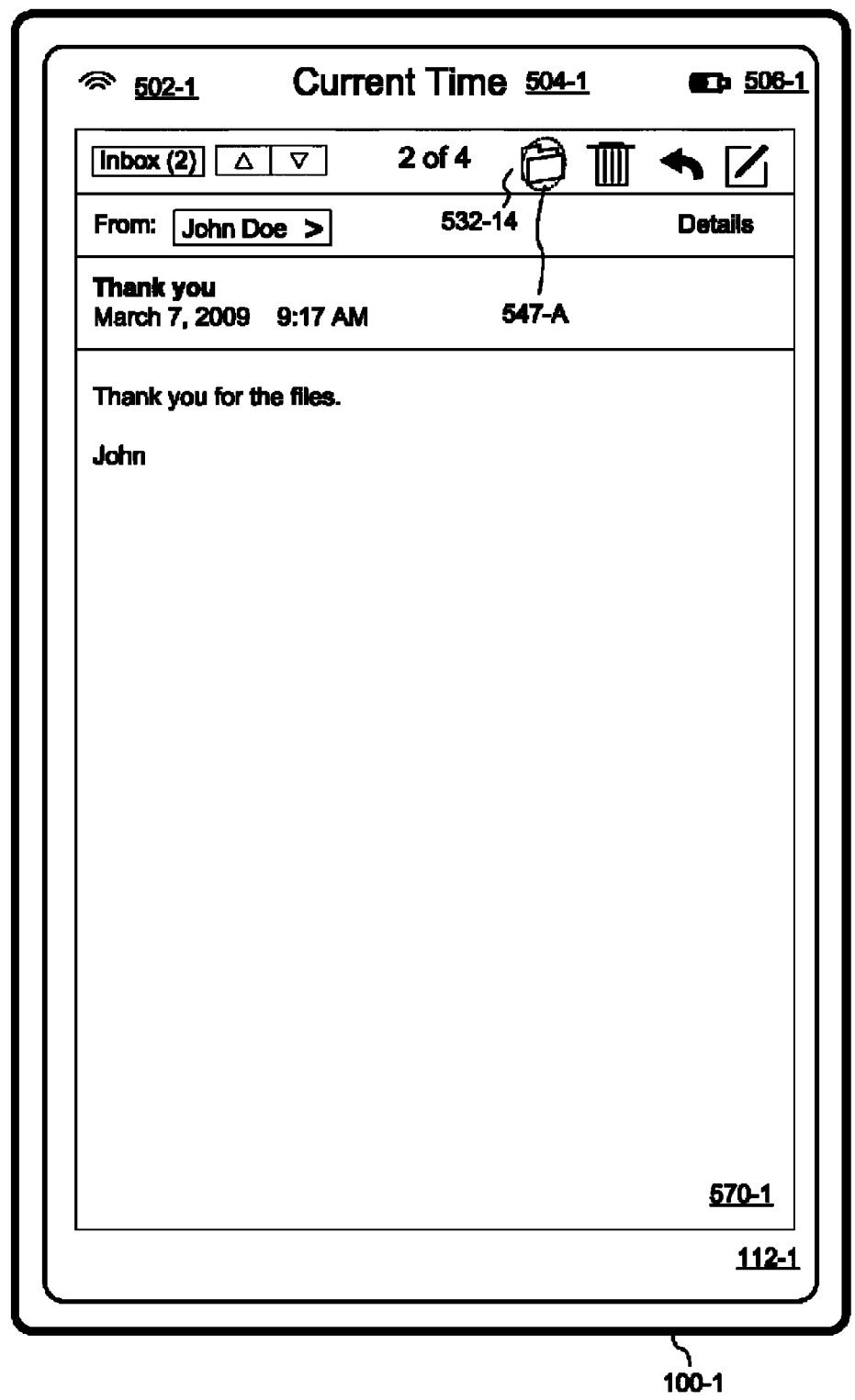
Figure 5BBB

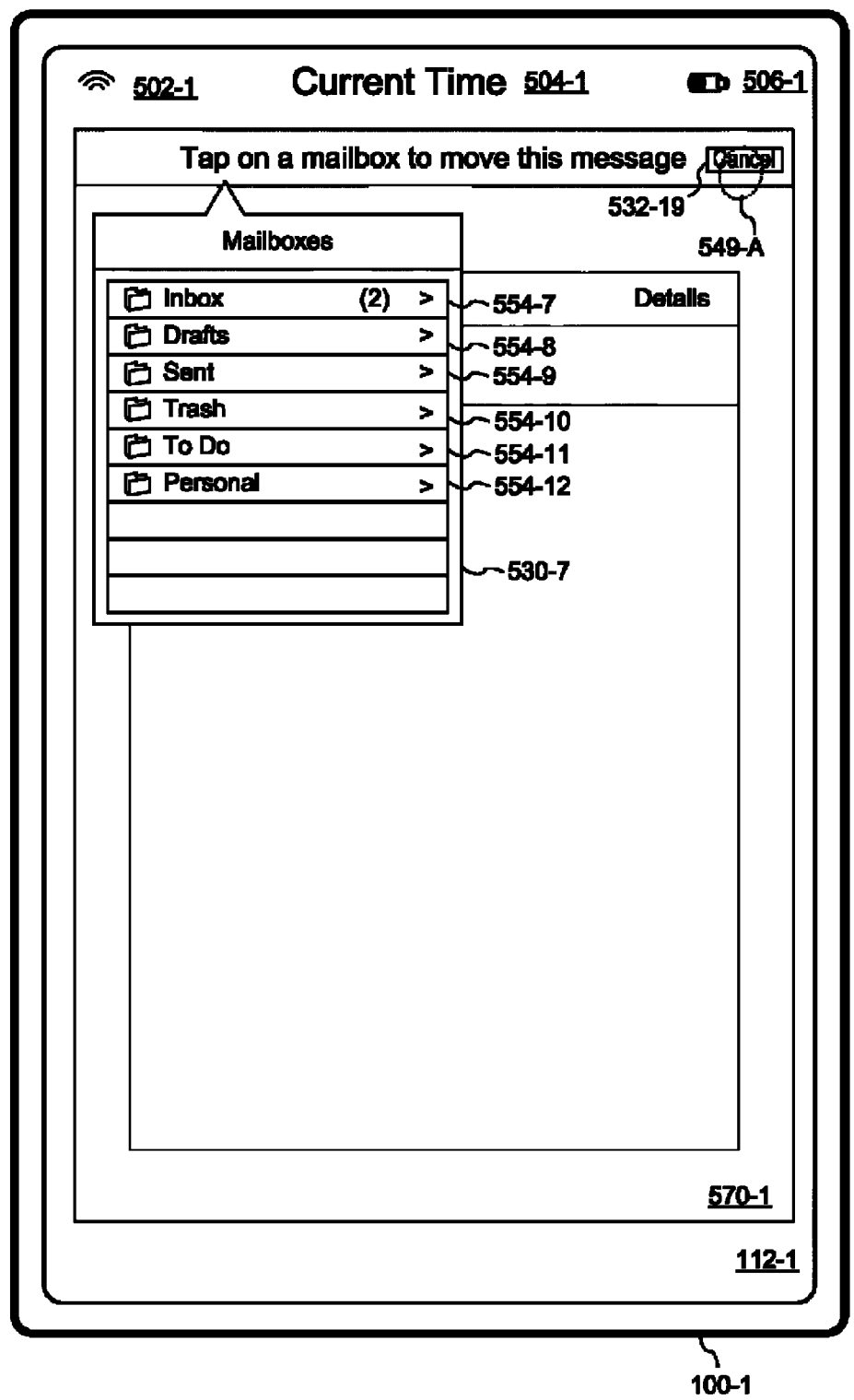
Figure 5CCC

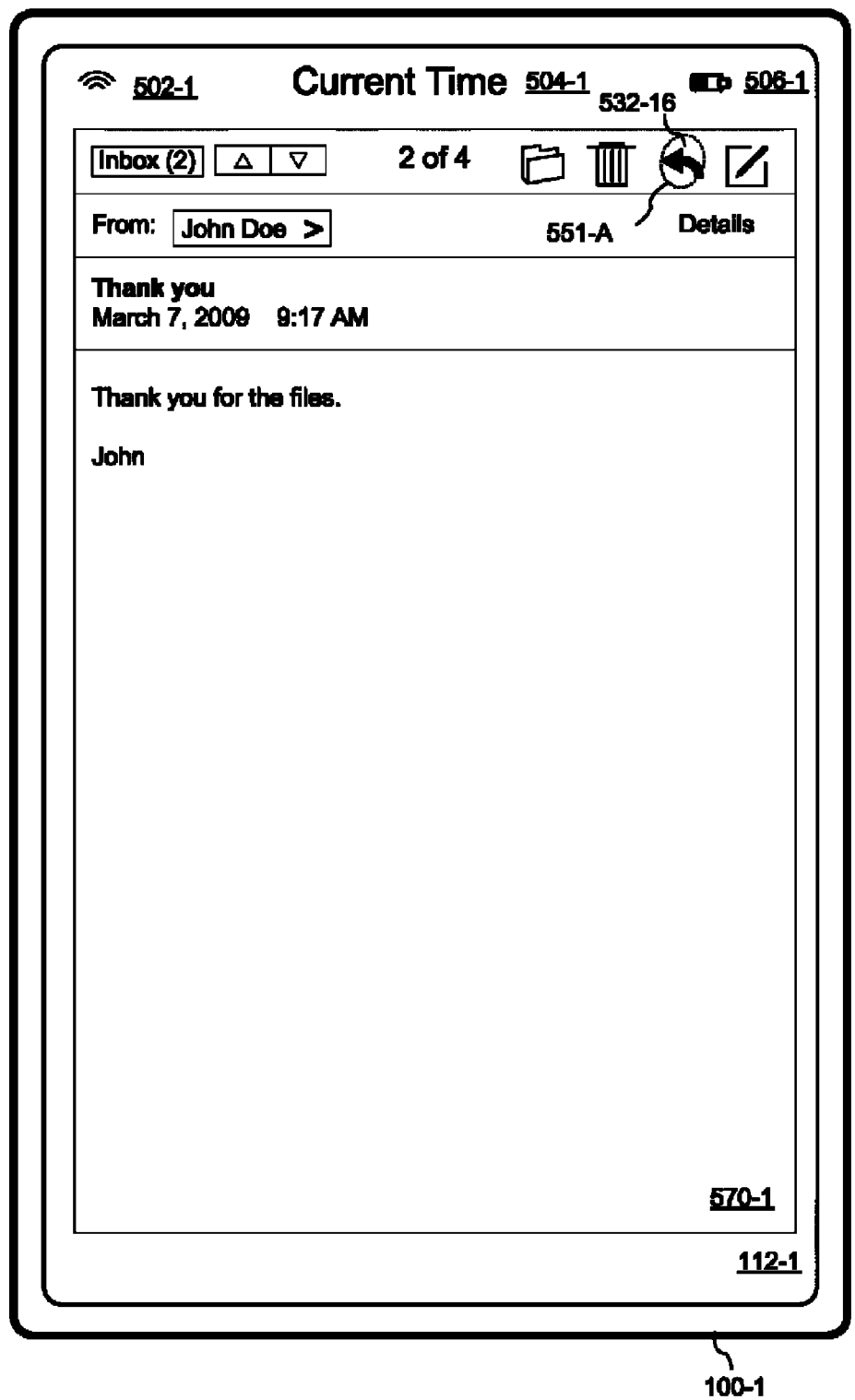
Figure 5DDD

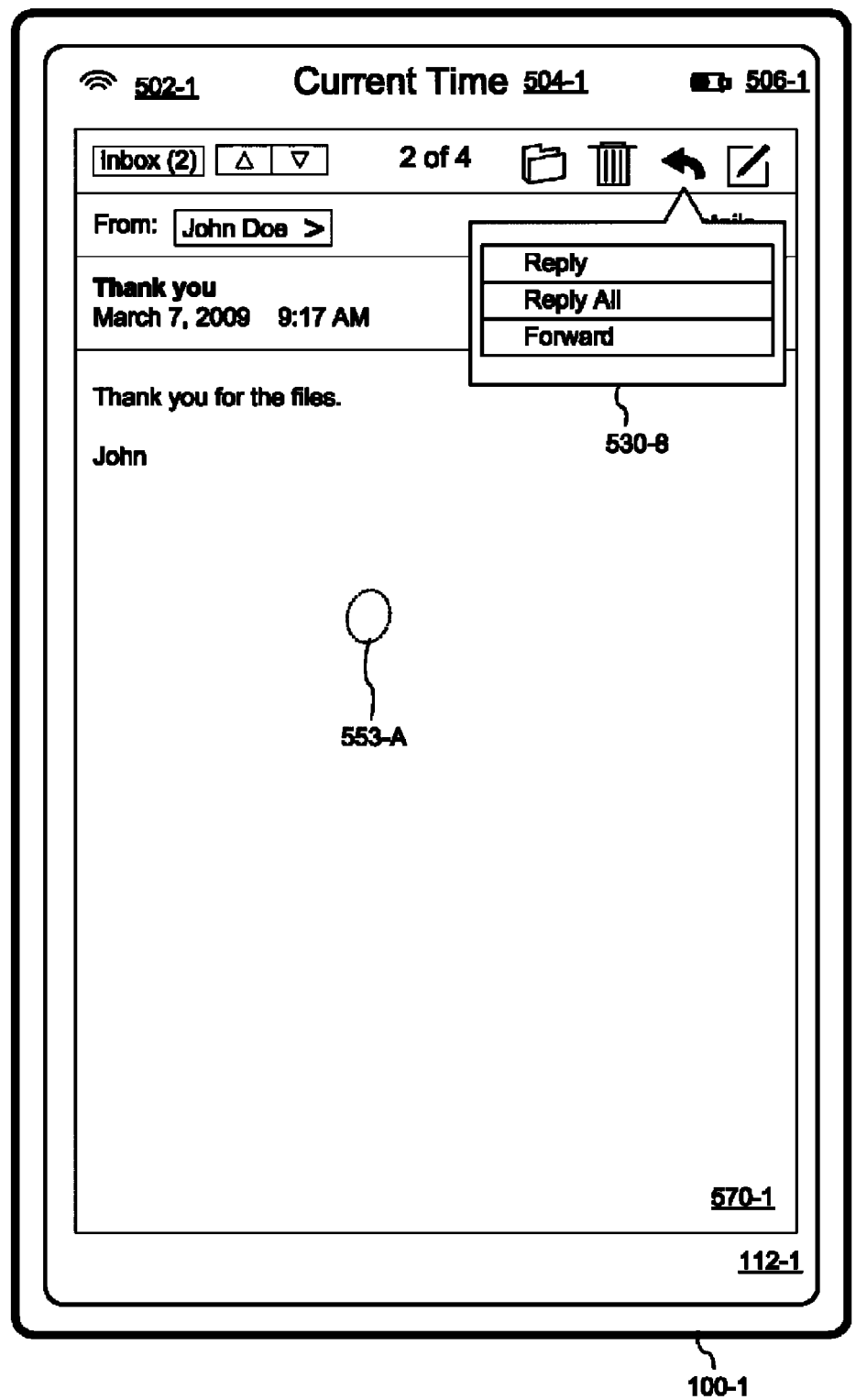
Figure 5EEE

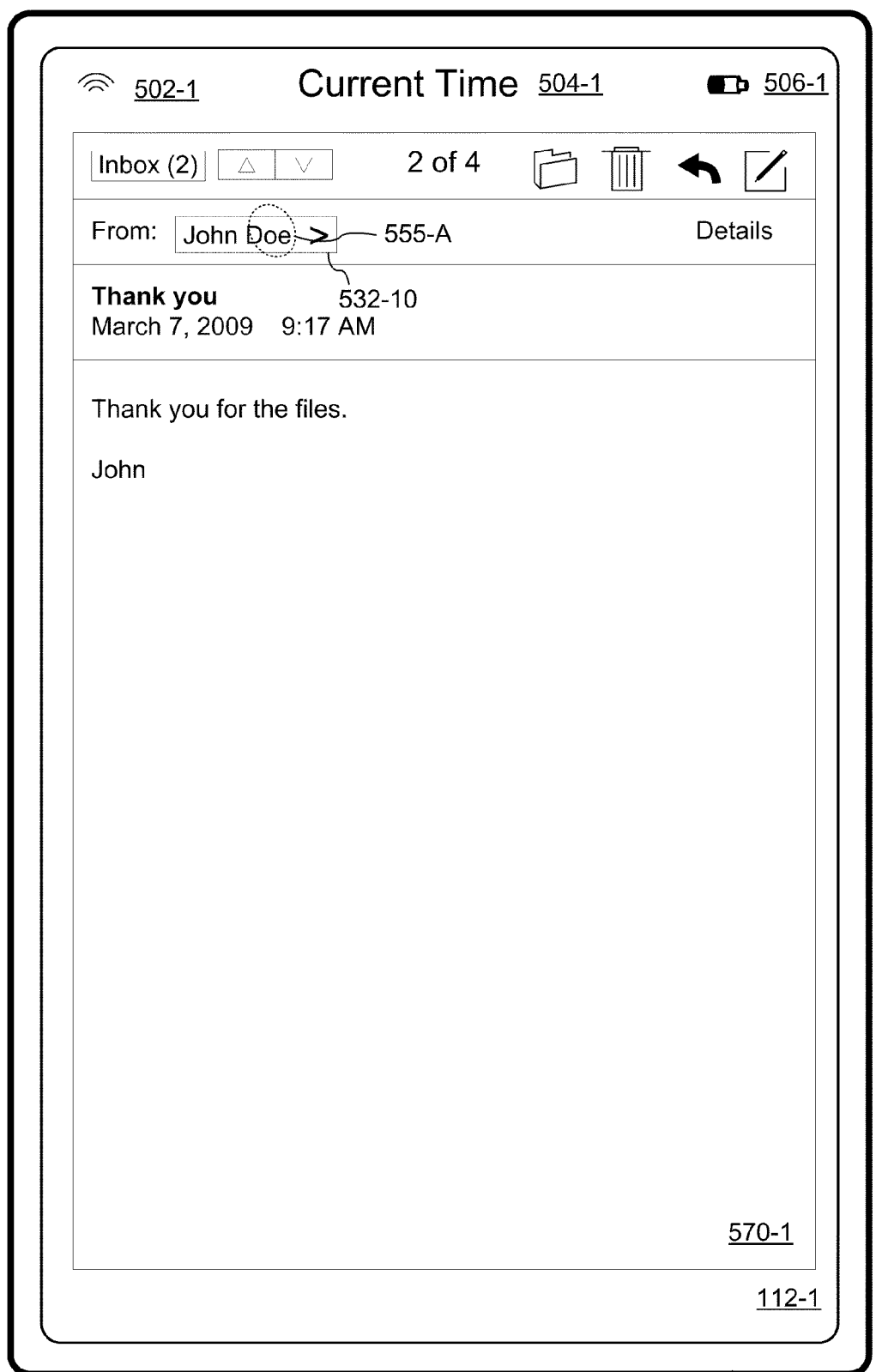
Figure 5FFF

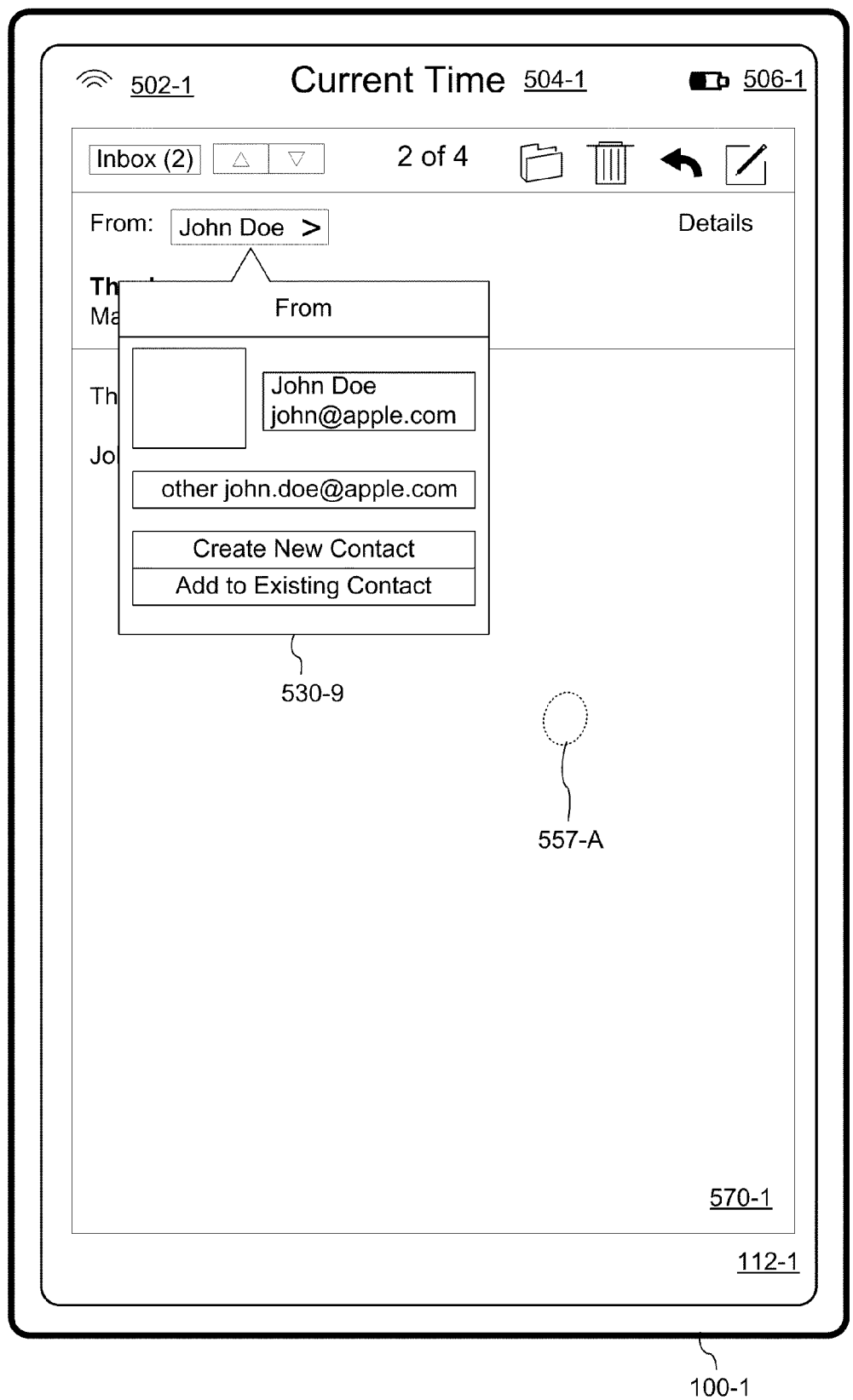
Figure 5GGG

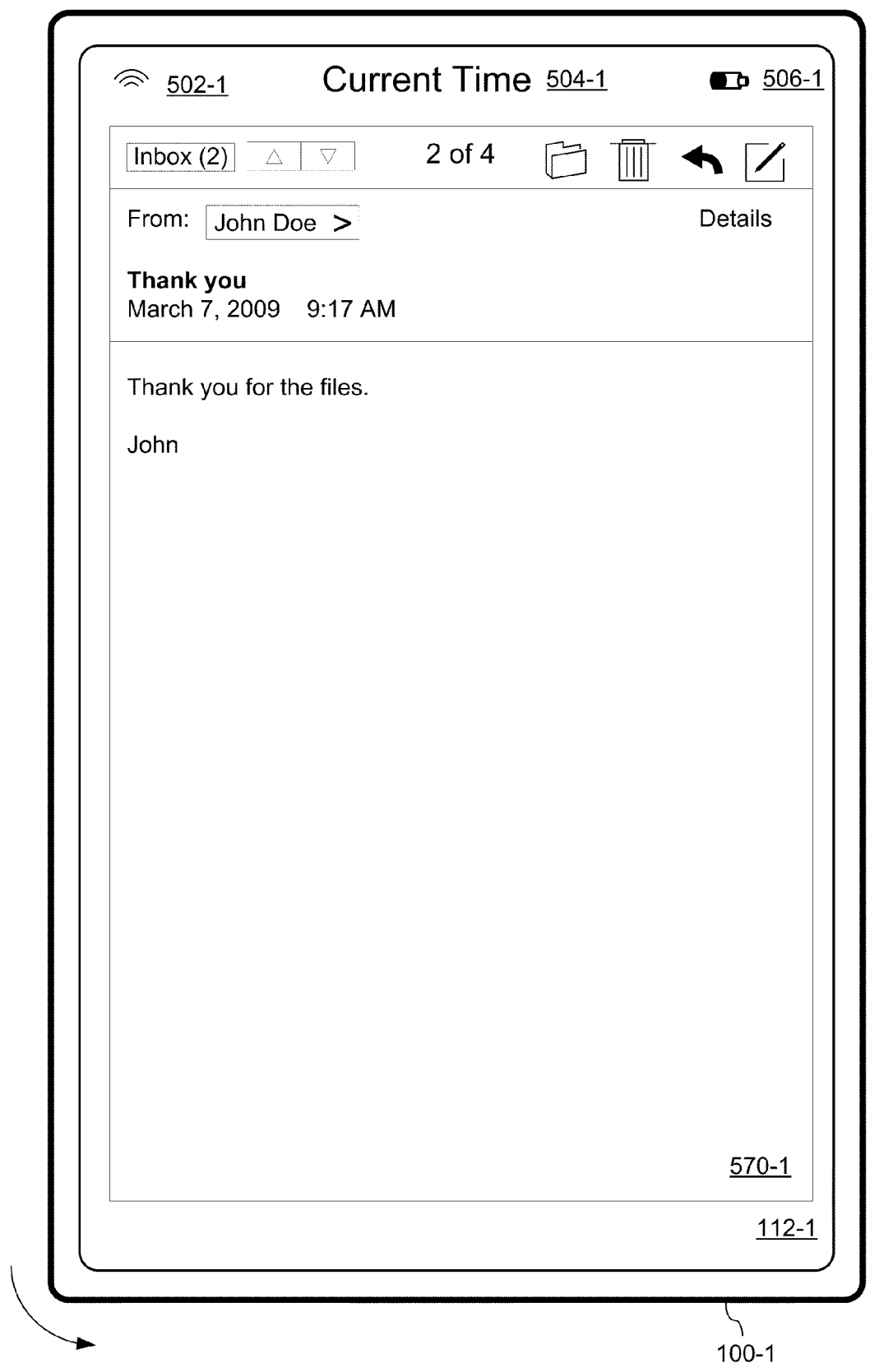
Figure 5HHH

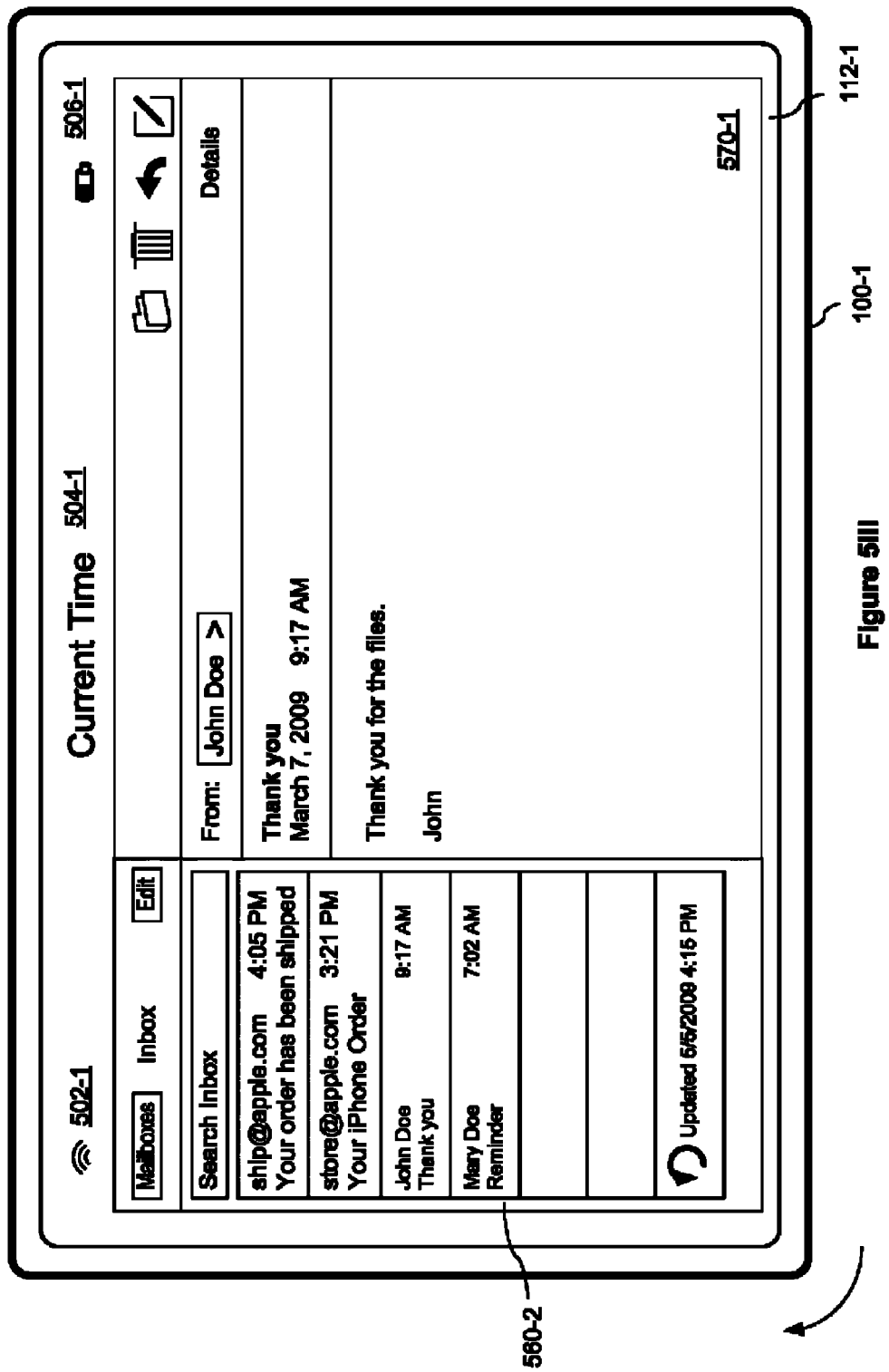
Figure 5III

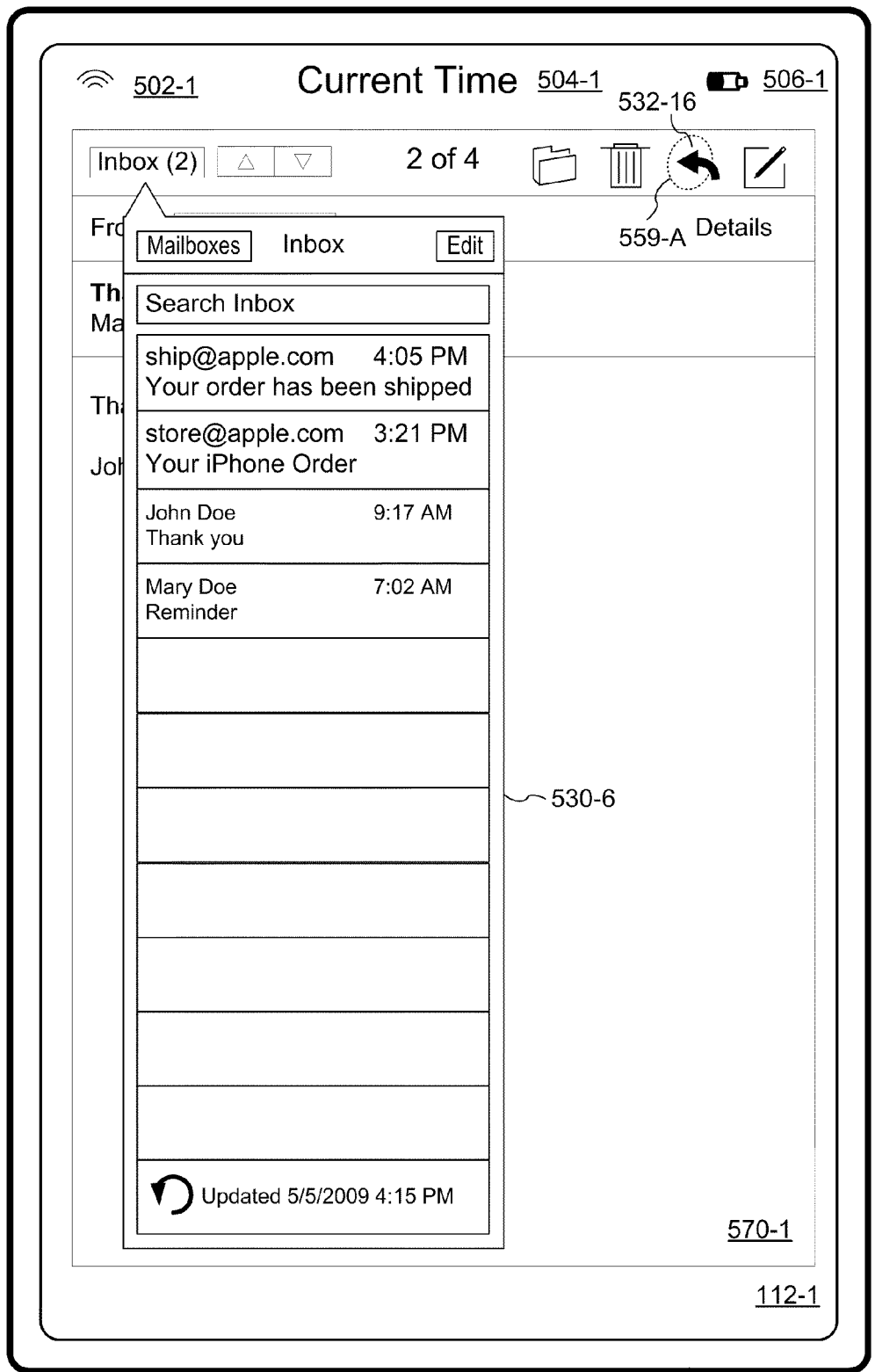
Figure 5JJJ

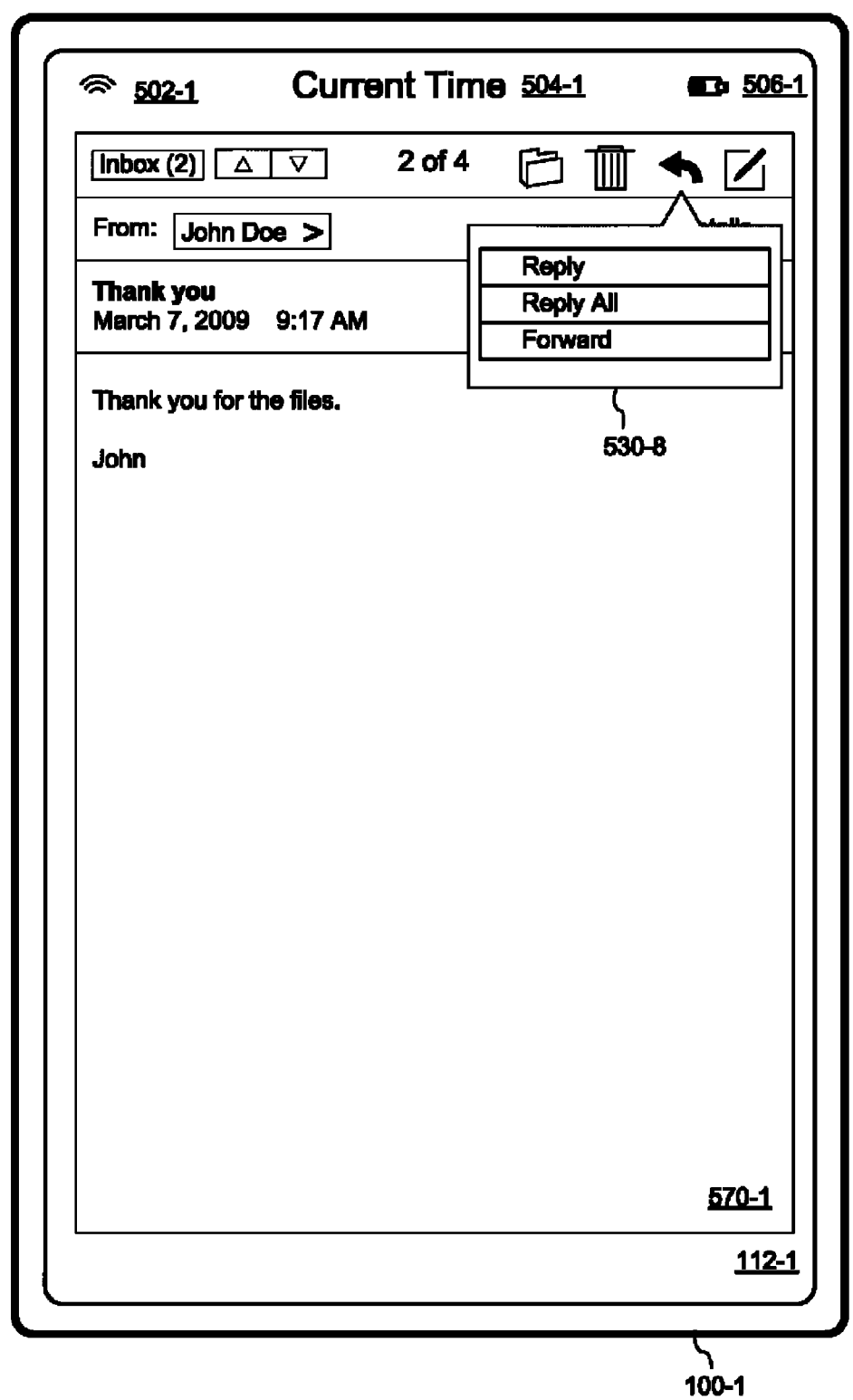
Figure 5KKK

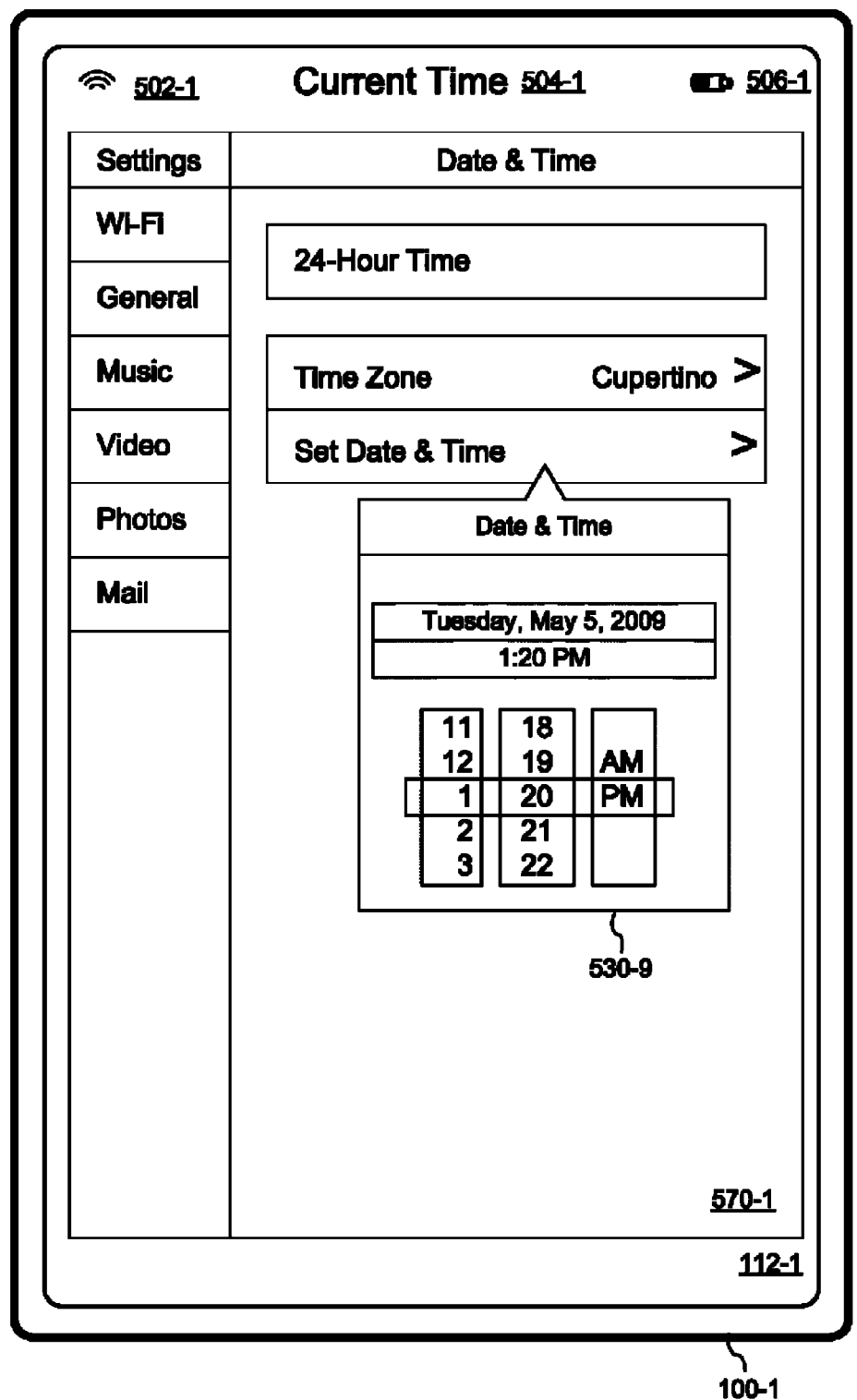
Figure 5LLL

DEVICE, METHOD, AND GRAPHICAL USER INTERFACE WITH INTERACTIVE POPUP VIEWS

RELATED APPLICATION

This application claims priority to U.S. Provisional Application Ser. No. 61/292,498, filed Jan. 6, 2010, entitled "Device, Method, and Graphical User Interface with Interactive Popup Views," which is incorporated herein by reference in its entirety.

This relates to the following application, which is hereby incorporated by reference: U.S. patent application Ser. No. 12/473,846, "Rotation Smoothing of a User Interface," filed May 28, 2009, which is incorporated herein by reference in its entirety.

TECHNICAL FIELD

This relates generally to electronic devices with touch-sensitive surfaces, including, but not limited to, devices with touch-sensitive surfaces that use interactive popup views.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to navigate and interact with user interfaces. One way to interact with user interfaces is via popup views (e.g., windows).

But existing methods for using popup views are cumbersome and inefficient. For example, popup views require more than necessary inputs to perform desired operations. Such use of popup views is tedious. In addition, existing methods take longer than necessary, thereby wasting energy. This latter consideration is particularly important in battery-operated devices.

SUMMARY

Accordingly, there is a need for computing devices with faster, more efficient methods and interfaces for using popup views. Such methods and interfaces may complement or replace conventional methods for using popup views. Such methods and interfaces reduce the cognitive burden on a user and produce a more efficient human-machine interface. For battery-operated computing devices, such methods and interfaces conserve power and increase the time between battery charges.

The above deficiencies and other problems associated with user interfaces for computing devices with touch-sensitive surfaces are reduced or eliminated by the disclosed devices. In various embodiments, the device is a desktop computer, while in other embodiments the device is portable (e.g., a notebook computer, tablet computer, or handheld device). Optionally, the device has a touchpad. Alternately, or in addition, the device may have a touch-sensitive display (also known as a "touch screen" or "touch screen display"). The device has a graphical user interface (GUI), one or more processors, memory and one or more modules, programs or sets of instructions stored in the memory for performing multiple functions. The functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors. The user interacts with the GUI primarily through finger contacts and gestures on the touch-sensitive surface.

In accordance with some embodiments, a method is performed at a multifunction device with a touch screen display. The method includes: displaying a respective view of a first application on the touch screen display and detecting a first touch gesture within the respective view. In response to detecting the first touch gesture, the device displays a popup view of the first application partially covering the respective view of the first application. The popup view corresponds to a full-screen-width view in a corresponding first application on a second multifunction device having a touch screen display with lower resolution than the touch screen display of the first multifunction device. The method also includes detecting one or more second touch gestures within the popup view, and in response to detecting the one or more second touch gestures within the popup view, performing an action in the first application that updates a state of the first application. The method further includes ceasing to display the popup view.

In accordance with some embodiments, a method performed at a multifunction device with a touch screen display and one or more accelerometers includes displaying a respective view of a first application on the touch screen display in a portrait orientation, detecting a first touch gesture within the respective view, and in response to detecting the first touch gesture, displaying a popup view of the first application partially covering the respective view of the first application. The method also includes detecting one or more second touch gestures within the popup view; and in response to detecting the one or more second touch gestures within the popup view, performing an action in the first application that updates a state of the first application. The method further includes, while displaying the popup view, detecting rotation of the multifunction device from a portrait orientation to a landscape orientation using the one or more accelerometers; and, in response to detecting the rotation, converting the respective view to the landscape orientation, and converting the popup view into a sidebar alongside the respective view in the landscape orientation.

In accordance with some embodiments, a multifunction device includes a touch screen display, one or more processors, memory, and one or more programs; the one or more programs are stored in the memory and configured to be executed by the one or more processors and the one or more programs include instructions for performing the operations of any of the methods described above. In accordance with some embodiments, a graphical user interface on a multifunction device with touch screen display, a memory, and one or more processors to execute one or more programs stored in the memory includes one or more of the elements displayed in any of the methods described above, which are updated in response to inputs, as described in any of the methods above. In accordance with some embodiments, a computer readable storage medium has stored therein instructions which when executed by a multifunction device with a touch screen display, cause the device to perform the operations of any of the methods described above. In accordance with some embodiments, a multifunction device includes: a touch screen display; and means for performing the operations of any of the methods described above. In accordance with some embodiments, an information processing apparatus, for use in a multifunction device with a touch screen display, includes means for performing the operations of any of the methods described above.

Thus, multifunction devices with touch screen displays are provided with faster, more efficient methods and interfaces for using interactive popup views, thereby increasing the effectiveness, efficiency, and user satisfaction with such devices. Such methods and interfaces may complement or replace conventional methods for using popup views.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
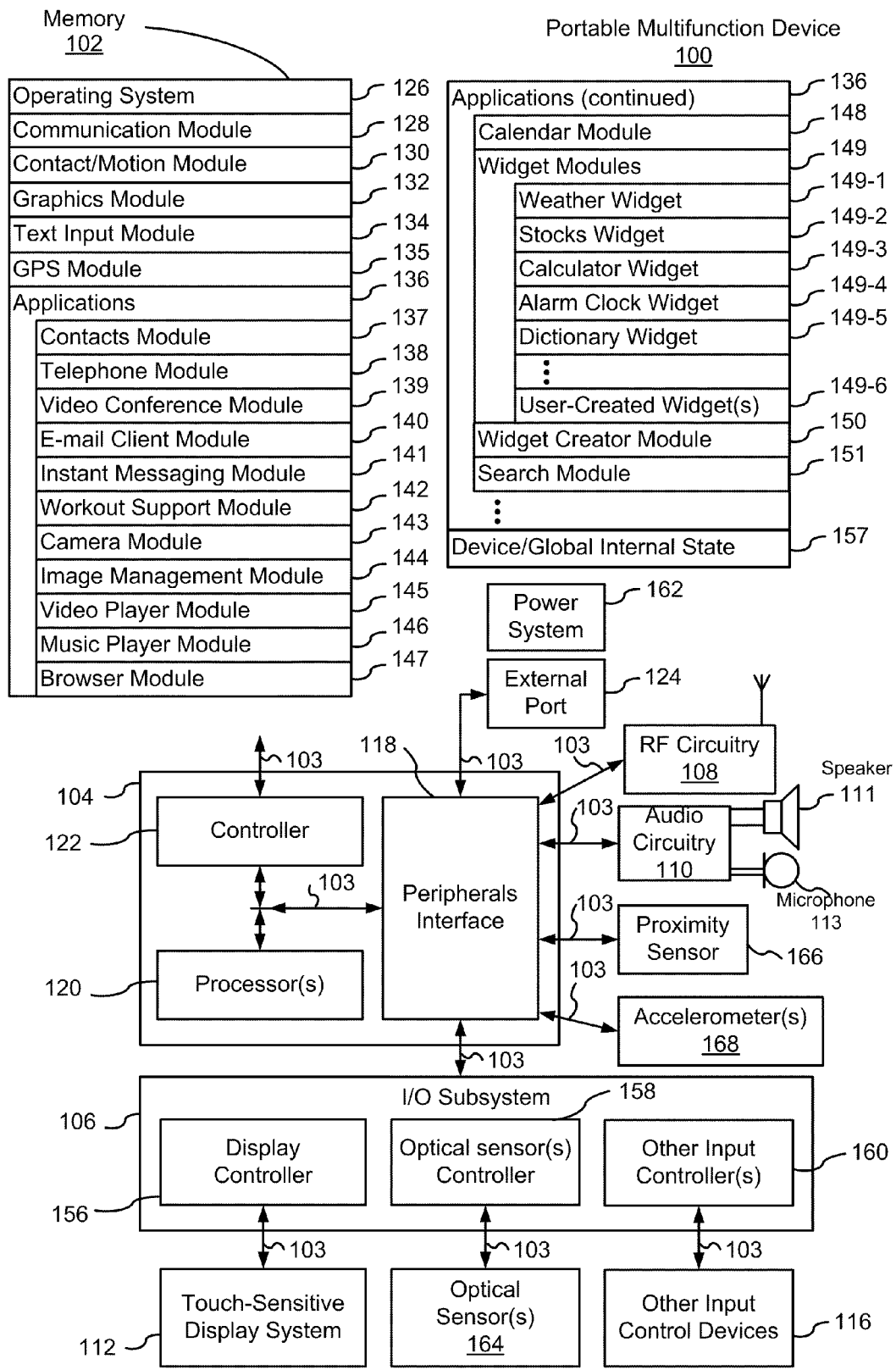
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the term "resolution" of a display refers to the number of pixels (also called "pixel counts" or "pixel resolution") along each axis or in each dimension of the display. For example, a display may have a resolution of 320×480 pixels. Furthermore, as used herein, the term "resolution" of a multifunction device refers to the resolution of a display in the multifunction device. The term "resolution" does not imply any limitations on the size of each pixel or the spacing of pixels. For example, compared to a first display with a 1024×768-pixel resolution, a second display with a 320×480-pixel resolution has a lower resolution. However, it should be noted that the physical size of a display depends not only on the pixel resolution, but also on many other factors, including the pixel size and the spacing of pixels. Therefore, the first display may have the same, smaller, or larger physical size, compared to the second display.

As used herein, the term "video resolution" of a display refers to the density of pixels along each axis or in each dimension of the display. The video resolution is often measured in a dots-per-inch (DPI) unit, which counts the number of pixels that can be placed in a line within the span of one inch along a respective dimension of the display.

Embodiments of computing devices, user interfaces for such devices, and associated processes for using such devices are described. In some embodiments, the computing device is a portable communications device, such as a mobile telephone, that also contains other functions, such as PDA and/or music player functions. Exemplary embodiments of portable multifunction devices include, without limitation, the iPhone® and iPod Touch® devices from Apple Inc. of Cupertino, Calif. Other portable devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

The user interfaces may include one or more soft keyboard embodiments. The soft keyboard embodiments may include standard (QWERTY) and/or non-standard configurations of symbols on the displayed icons of the keyboard, such as those described in U.S. patent applications Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entireties. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
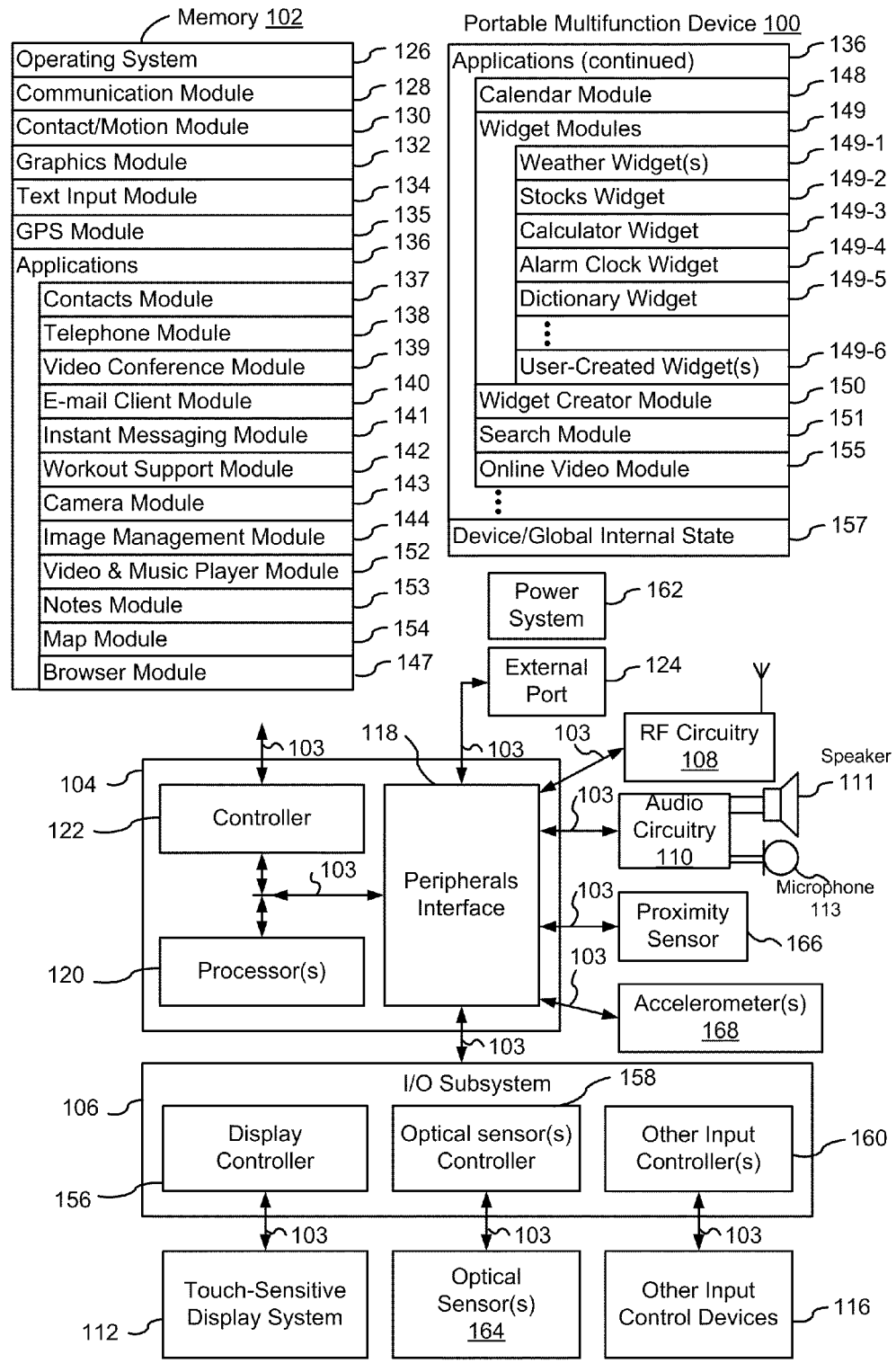

Attention is now directed toward embodiments of portable devices with touch-sensitive displays. FIGS. 1A and 1B are block diagrams illustrating portable multifunction devices 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2). A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from portable device 100, whereas touch sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

In some embodiments, device 100 may include a physical or virtual wheel (e.g., a click wheel) as input control device 116. A user may navigate among and interact with one or more graphical objects (e.g., icons) displayed in touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by input controller 160 as well as one or more of the modules and/or sets of instructions in memory 102. For a virtual click wheel, the click wheel and click wheel controller may be part of touch screen 112 and display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIGS. 1A and 1B show an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 may also include one or more proximity sensors 166. FIGS. 1A and 1B show proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 may also include one or more accelerometers 168. FIGS. 1A and 1B show accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
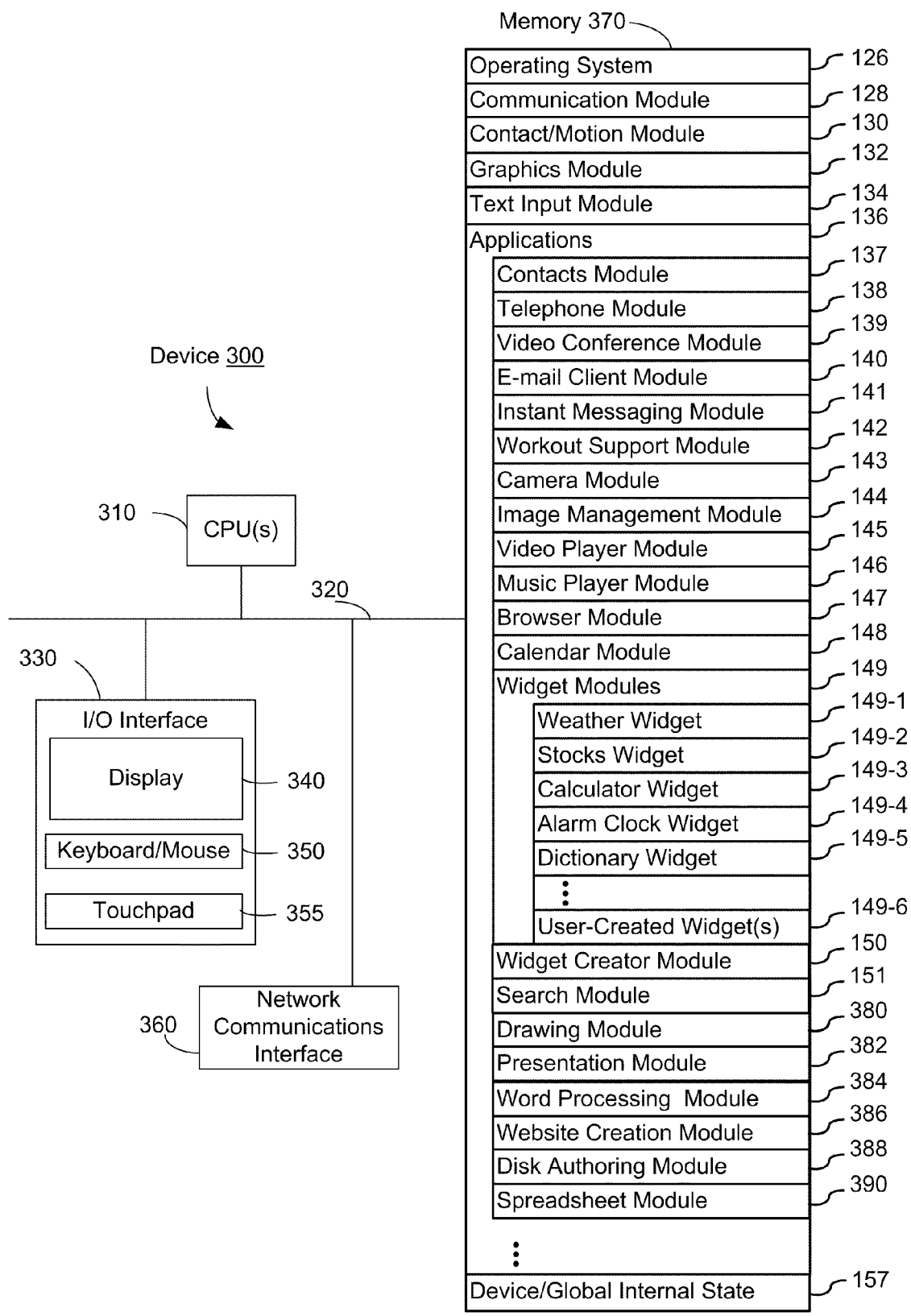
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A, 1B and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detects contact on a touchpad. In some embodiments, contact/motion module 130 and controller 160 detects contact on a click wheel.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- video player module 145;
- music player module 146;
- browser module 147;
- calendar module 148;
- widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, video player module 145 includes executable instructions to display, present or otherwise play back videos (e.g., on touch screen 112 or on an external, connected display via external port 124).

In conjunction with touch screen 112, display system controller 156, contact module 130, graphics module 132, audio circuitry 110, speaker 111, RF circuitry 108, and browser module 147, music player module 146 includes executable instructions that allow the user to download and play back recorded music and other sound files stored in one or more file formats, such as MP3 or AAC files. In some embodiments, device 100 may include the functionality of an MP3 player, such as an iPod (trademark of Apple Inc.).

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1C:
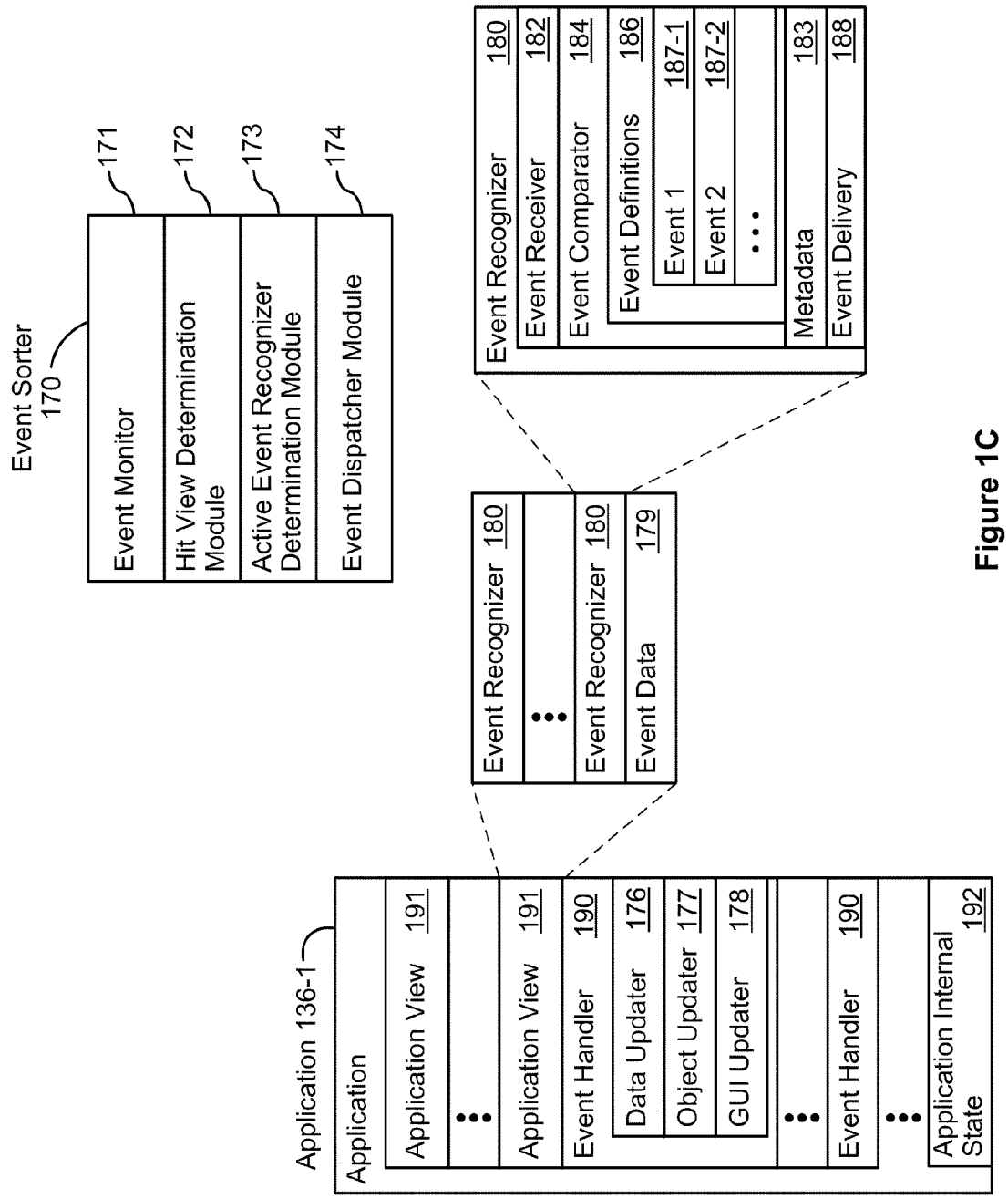
FIG. 1C is a block diagram illustrating exemplary components for event handling in accordance with some embodiments.

FIG. 1C is a block diagram illustrating exemplary components for event handling in accordance with some embodiments. In some embodiments, memory 102 (in FIGS. 1A and 1B) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is(are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
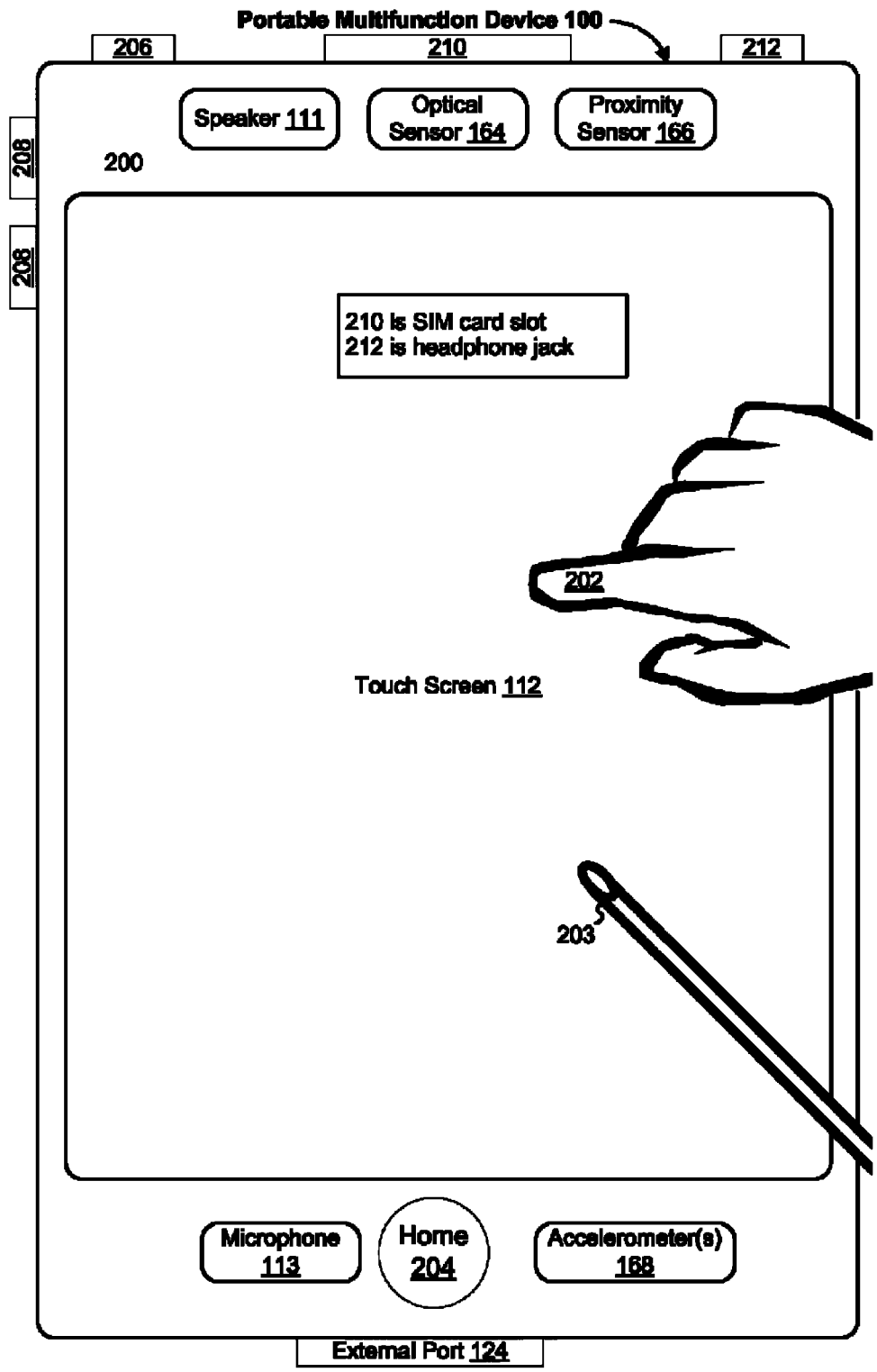
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
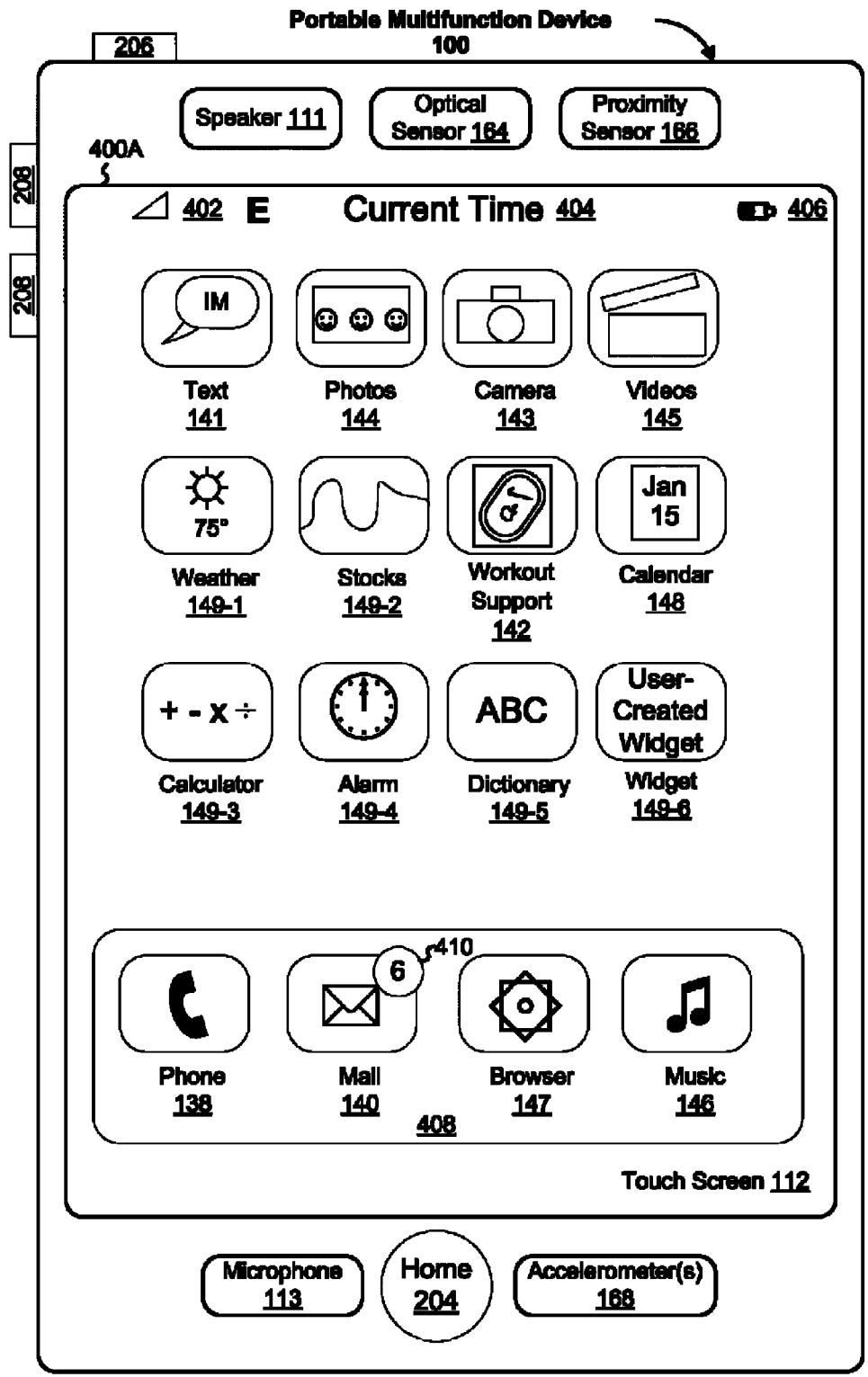
FIGS. 4A and 4B illustrate exemplary user interfaces for a menu of applications on a portable multifunction device in accordance with some embodiments.
Figure 4B:
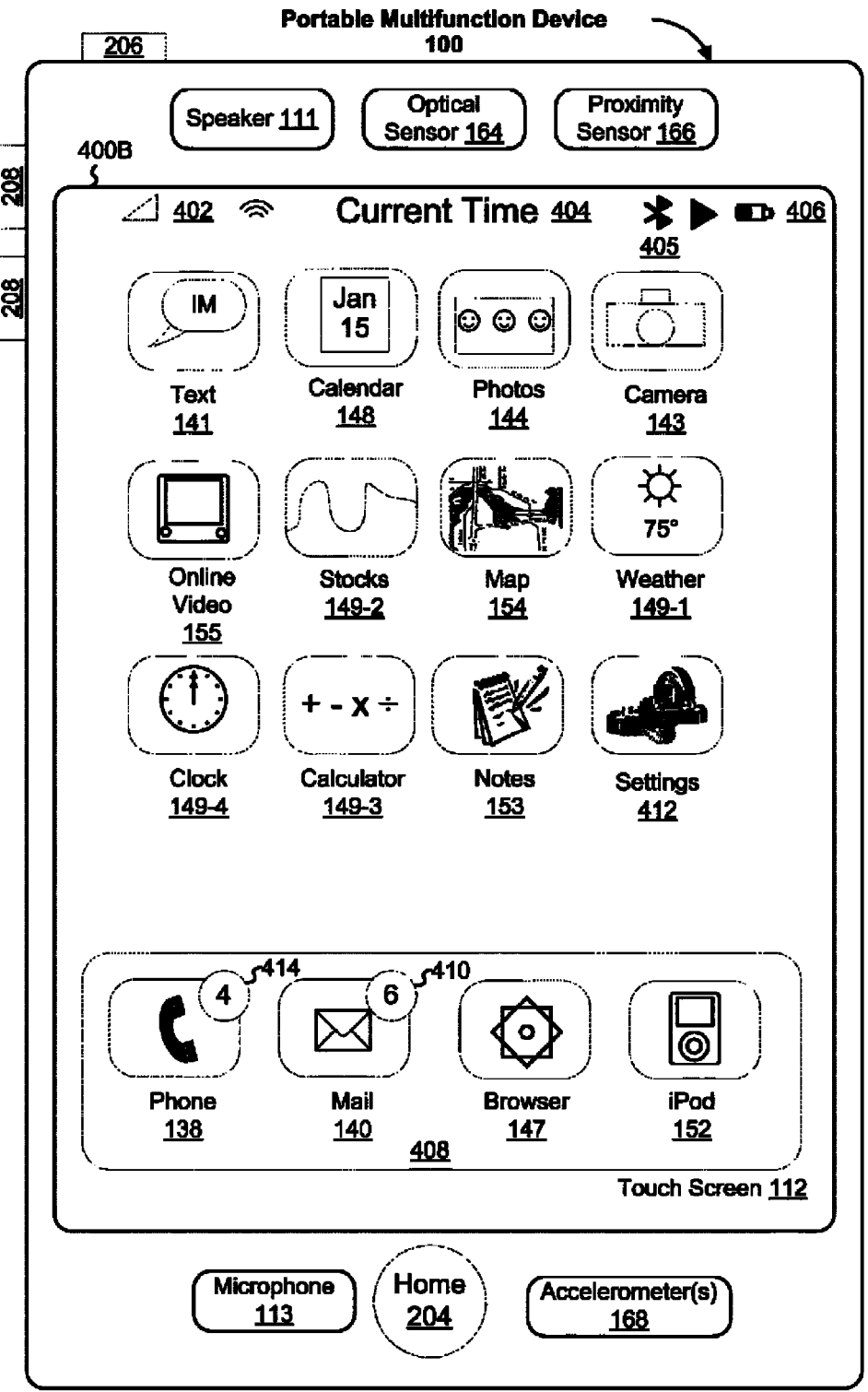

FIGS. 4A and 4B illustrate exemplary user interfaces for a menu of applications on portable multifunction device 100 in accordance with some embodiments. Similar user interfaces may be implemented on device 300. In some embodiments, user interface 400A includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Music player 146; and
Icons for other applications, such as:
  IM 141;
  Image management 144;
  Camera 143;
  Video player 145;
  Weather 149-1;
  Stocks 149-2;

Workout support 142;
Calendar 148;
Calculator 149-3;
Alarm clock 149-4;
Dictionary 149-5; and
User-created widget 149-6.

In some embodiments, user interface 400B includes the following elements, or a subset or superset thereof:

402, 404, 405, 406, 141, 148, 144, 143, 149-3, 149-2, 149-1, 149-4, 410, 414, 138, 140, and 147, as described above;
Map 154;
Notes 153;
Settings 412, which provides access to settings for device 100 and its various applications 136, as described further below;
Video and music player module 152, also referred to as iPod (trademark of Apple Inc.) module 152; and
Online video module 155, also referred to as YouTube (trademark of Google Inc.) module 155.

Figure 4C:
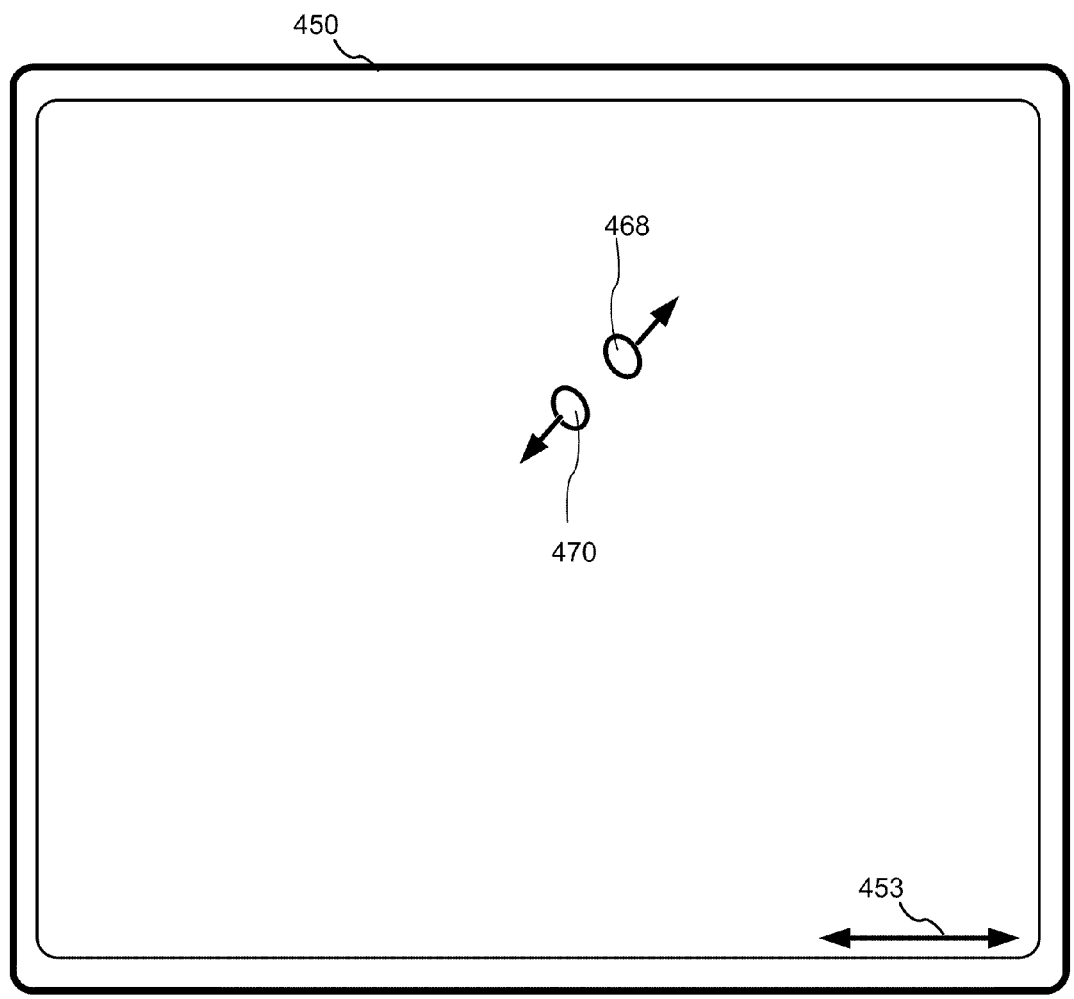
FIG. 4C illustrates an exemplary user interface for a multifunction device with a touch-sensitive surface that is separate from the display in accordance with some embodiments.
Figure 4C:
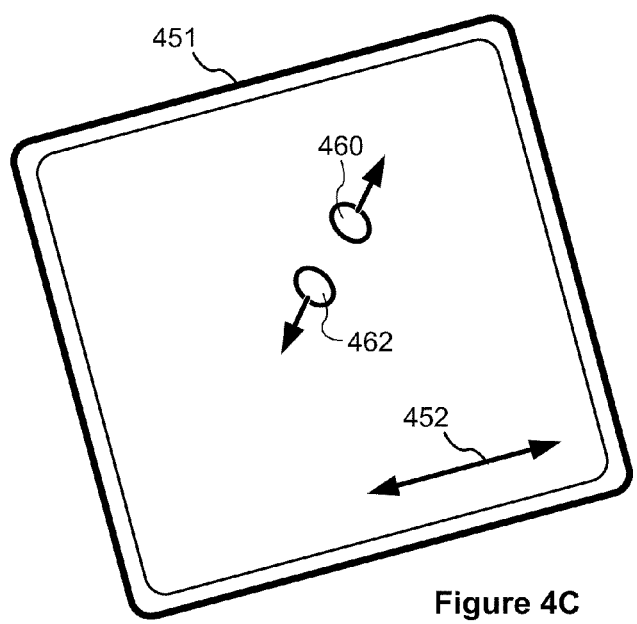

FIG. 4C illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4C. In some embodiments the touch sensitive surface (e.g., 451 in FIG. 4C) has a primary axis (e.g., 452 in FIG. 4C) that corresponds to a primary axis (e.g., 453 in FIG. 4C) on the display (e.g., 450). In accordance with these embodiments, the device detects contacts (e.g., 460 and 462 in FIG. 4C) with the touch-sensitive surface 451 at locations that correspond to respective locations on the display (e.g., in FIG. 4C 460 corresponds to 468 and 462 corresponds to 470). In this way, user inputs (e.g., contacts 460 and 462, and movements thereof) detected by the device on the touch-sensitive surface (e.g., 451 in FIG. 4C) are used by the device to manipulate the user interface on the display (e.g., 450 in FIG. 4C) of the multifunction device when the touch-sensitive surface is separate from the display. It should be understood that similar methods may be used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a stylus input).

In the descriptions provided below, the term "contact" (except when used to describe an entry in a contact list, address book or the like) is used as a short hand term for "touch gesture," and thus each contact mentioned or described below may be any suitable touch gesture detected by a sensor (or set of sensors) of a touch-sensitive display or other touch-sensitive surface. Similarly, each "finger tap" mentioned or described below may be any suitable touch gesture. Furthermore, in some embodiments, "touch gestures" include not only gestures, made by one or more fingers or one or more styluses, that make physical contact a touch-sensitive screen 112 or other touch-sensitive surface, but also gestures that occur, in whole or in part, sufficiently close to touch-sensitive screen 112 or other touch-sensitive surface that the one or more sensors of touch-sensitive screen 112 or other touch-sensitive surface are able to detect those gestures.

Attention is now directed towards embodiments of user interfaces ("UI") and associated processes that may be implemented on a multifunction device with a display and a touch-sensitive surface, such as device 300 or portable multifunction device 100.

FIGS. 5A-5LLL illustrate exemplary user interfaces with interactive popup views in accordance with some embodiments. The user interfaces in these figures are used to illustrate the processes described below, including the processes in FIGS. 6A-6B and 7A-7B.

It should be noted that in FIGS. 5A-5LLL, corresponding gestures are labeled similarly. For example, in FIG. 5B, a contact on first multifunction device 100-1 is labeled as 505-A, while a corresponding contact on second multifunction device 100-2 is labeled as 505-A'. Additional examples of corresponding gestures can be found at least in FIGS. 5D, 5J-5L, 5O-5R, 5V, 5Y, 5AA, 5EE, and 5MM.

Figure 5A:
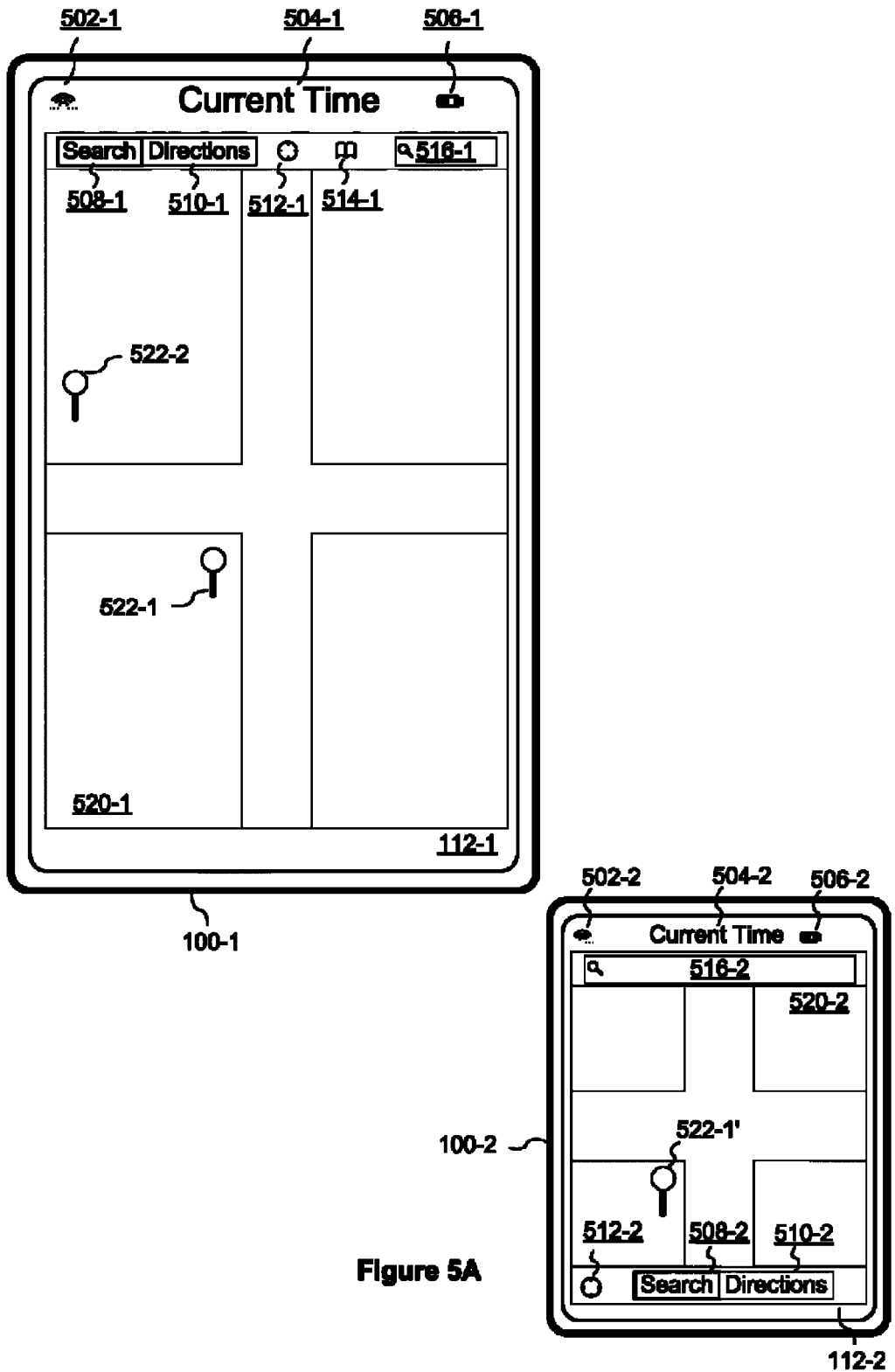
FIGS. 5A-5LLL illustrate exemplary user interfaces for using interactive popup views in accordance with some embodiments.
Figure 5B:
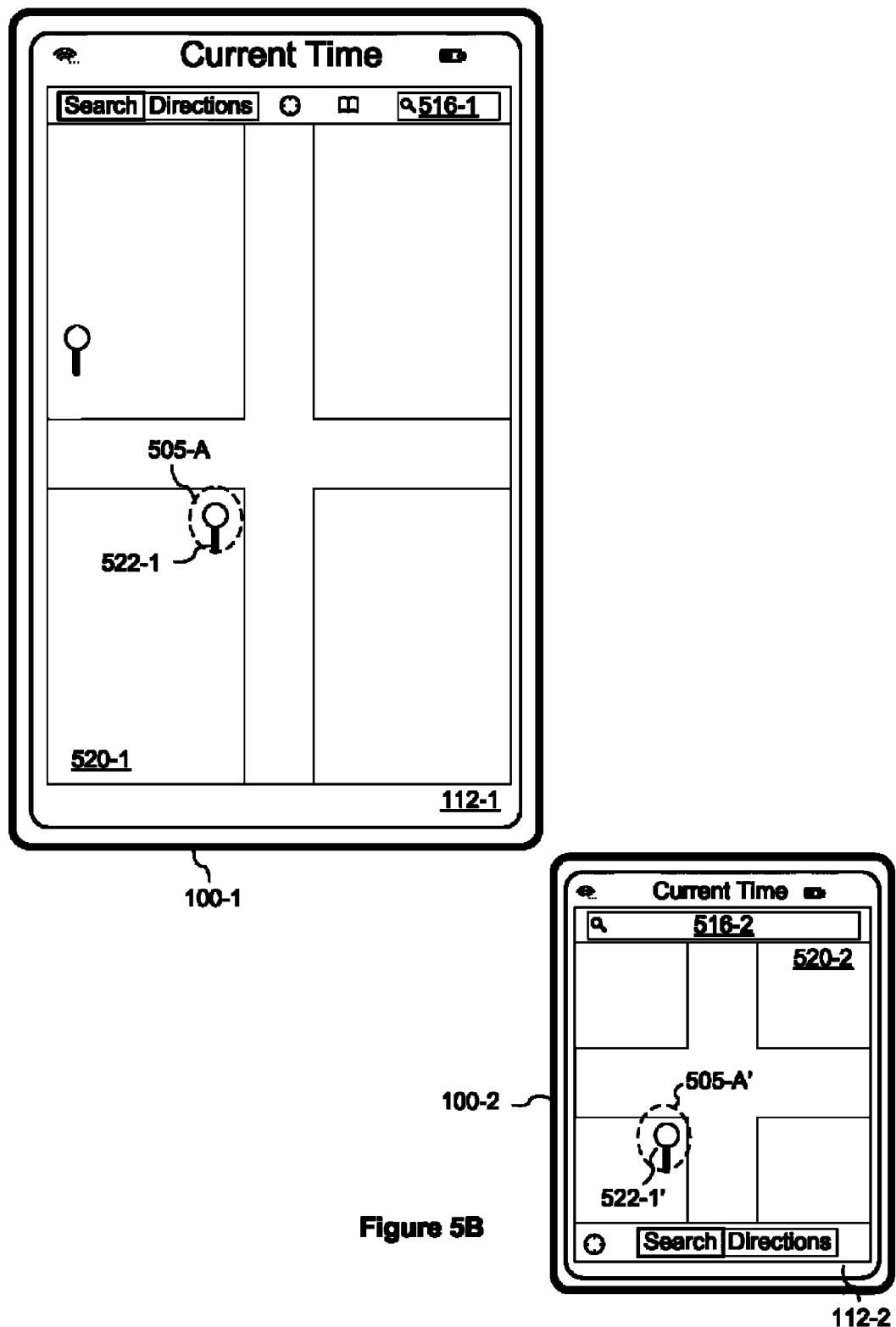
Figure 5C:
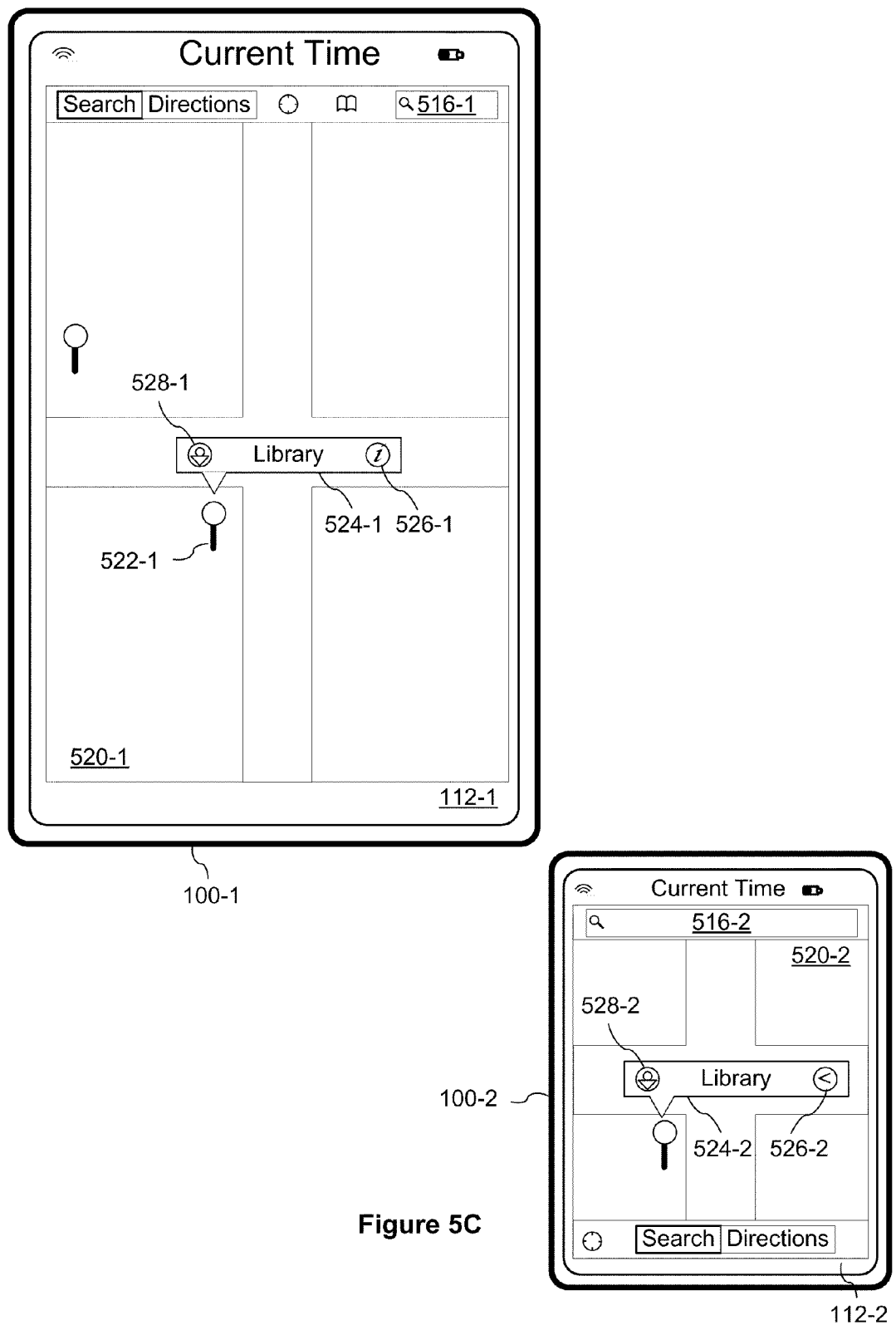
Figure 5D:
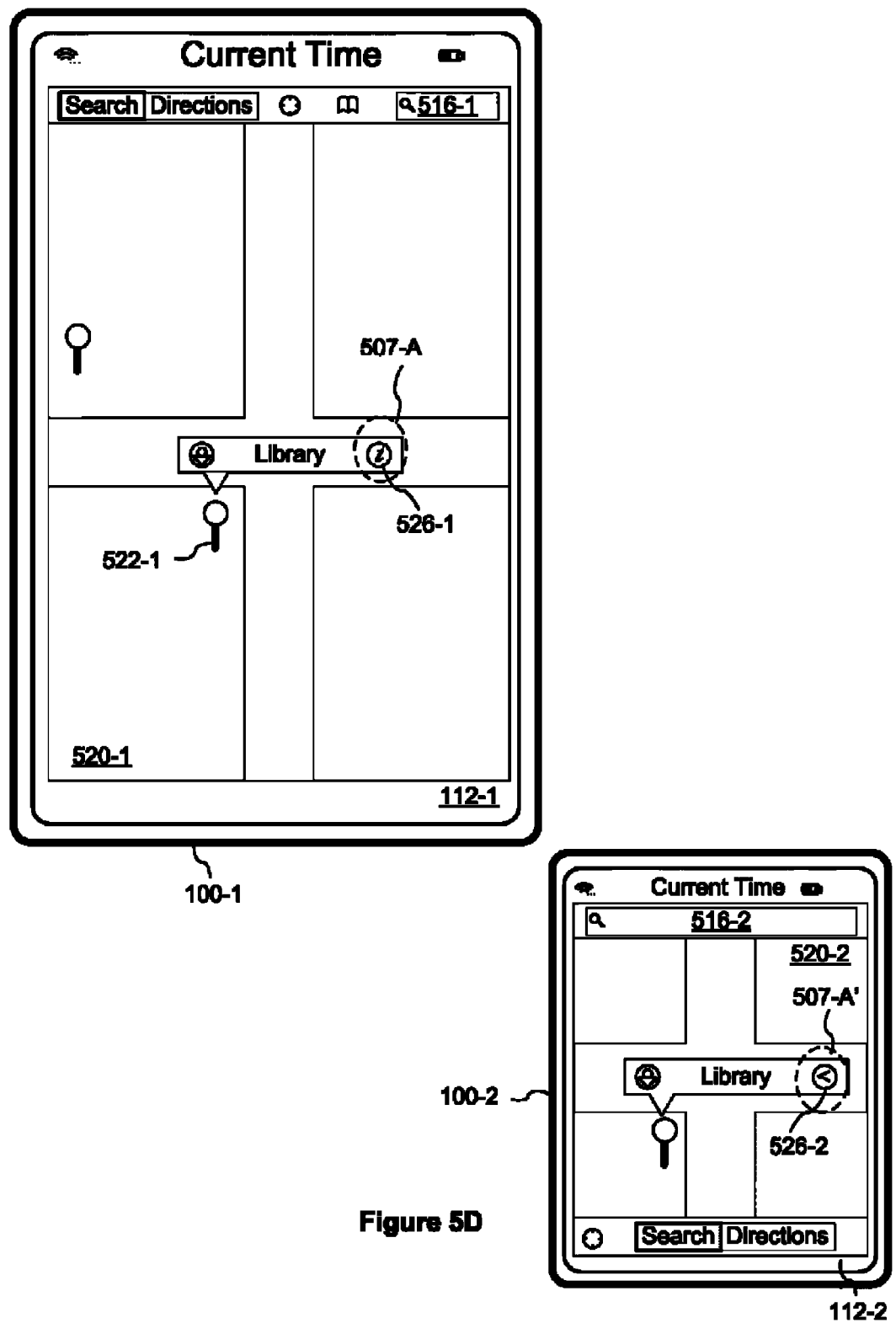
Figure 5E:
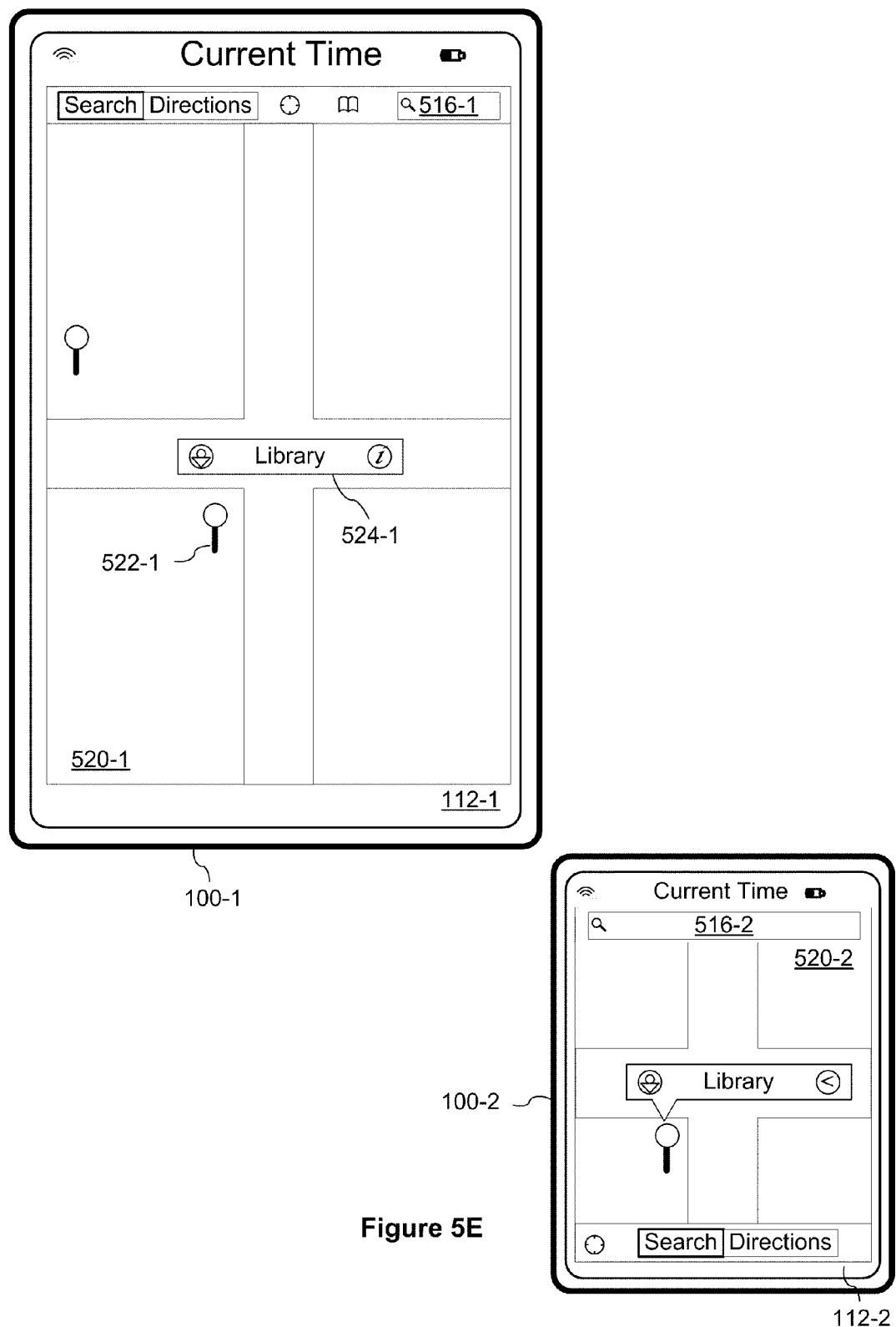
Figure 5F:
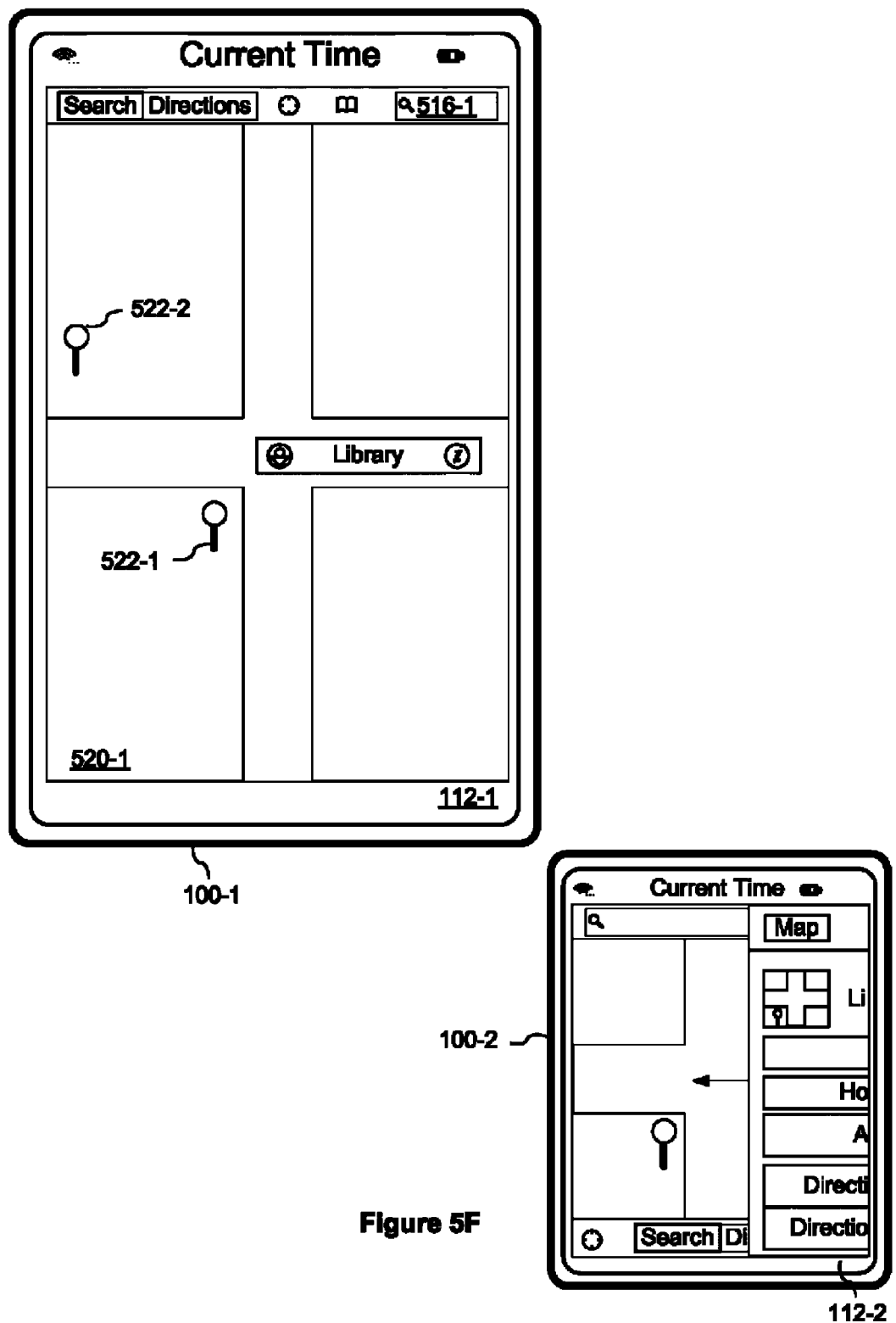
Figure 5G:
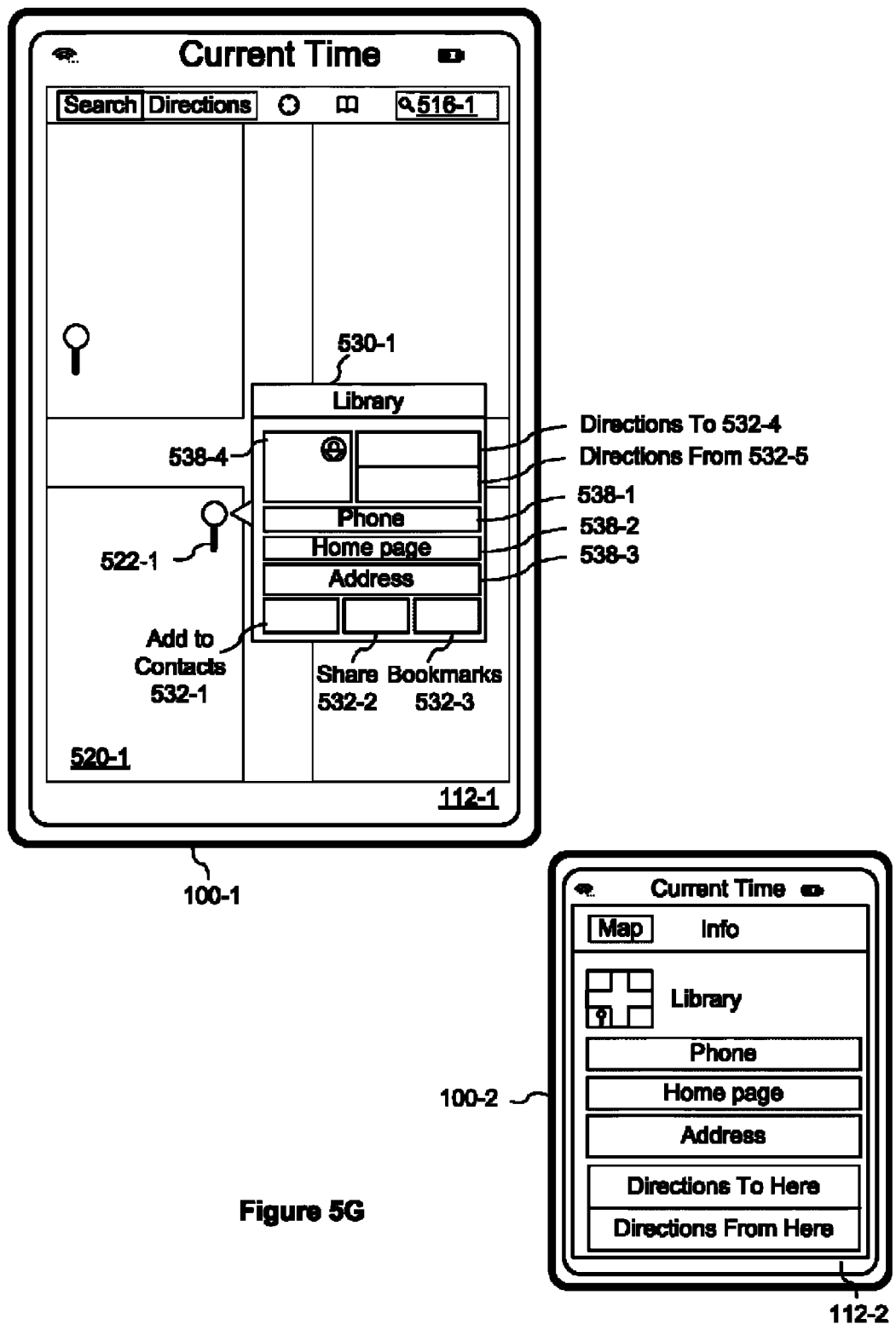
Figure 5H:
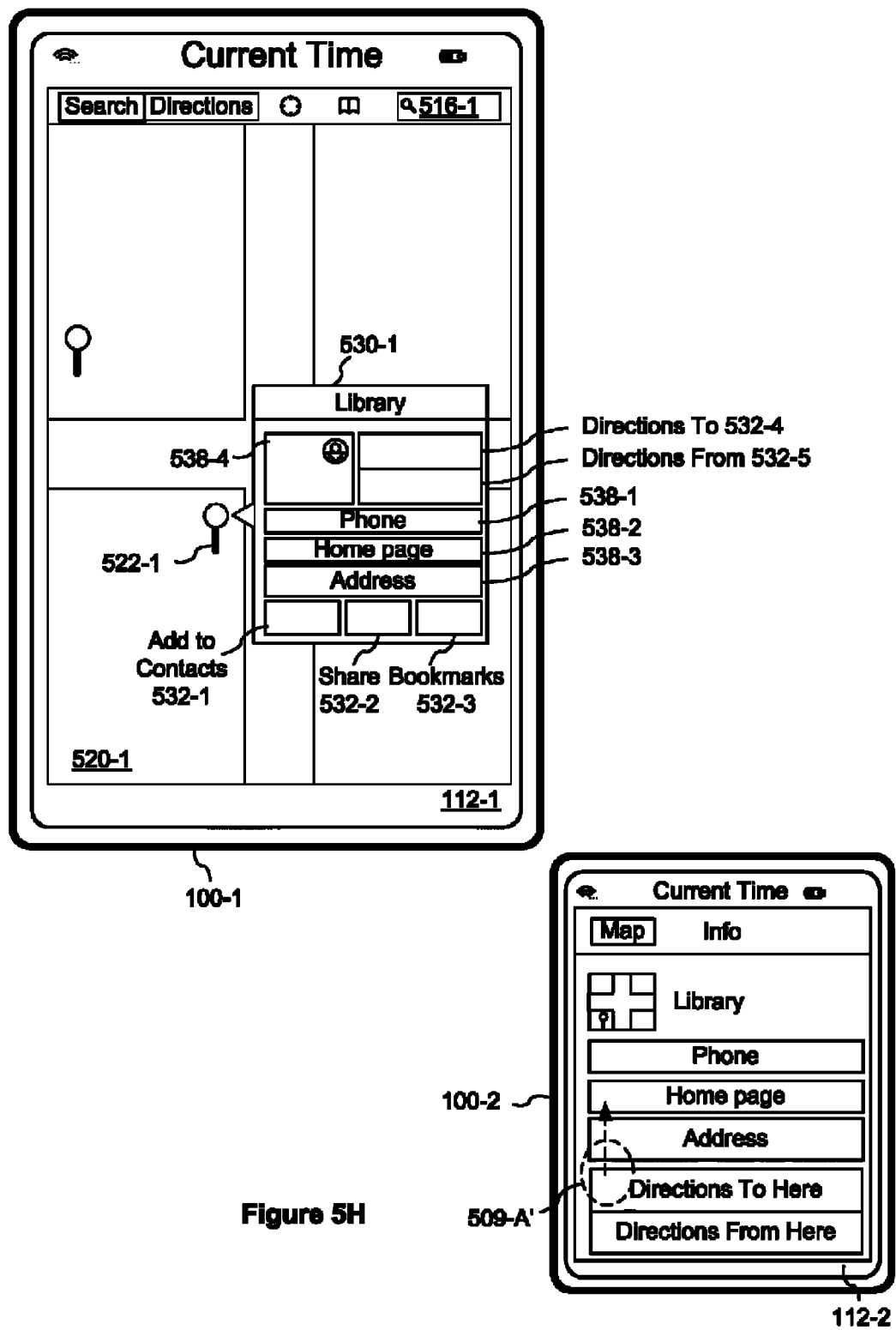
Figure 5I:
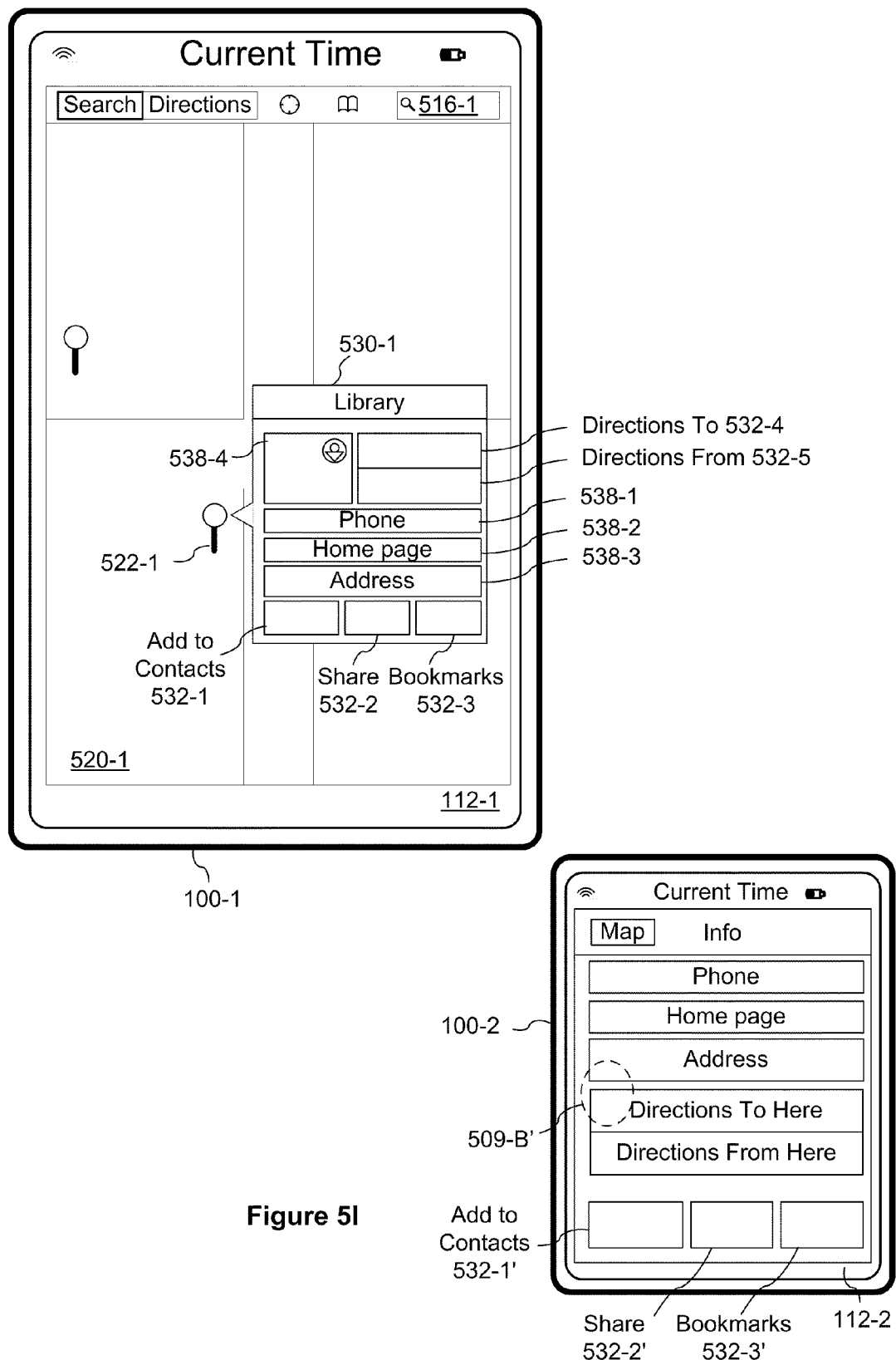
Figure 5J:
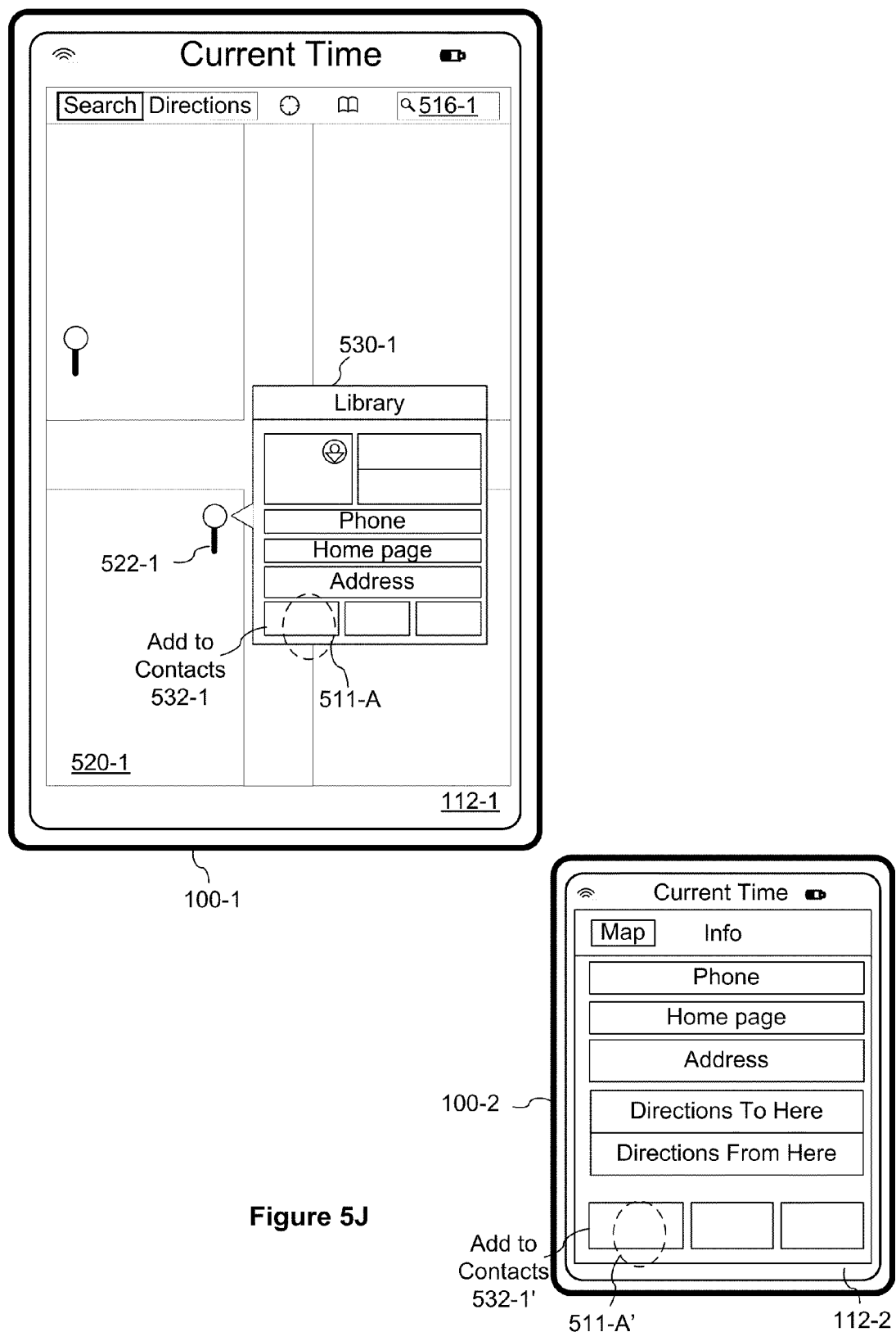
Figure 5K:
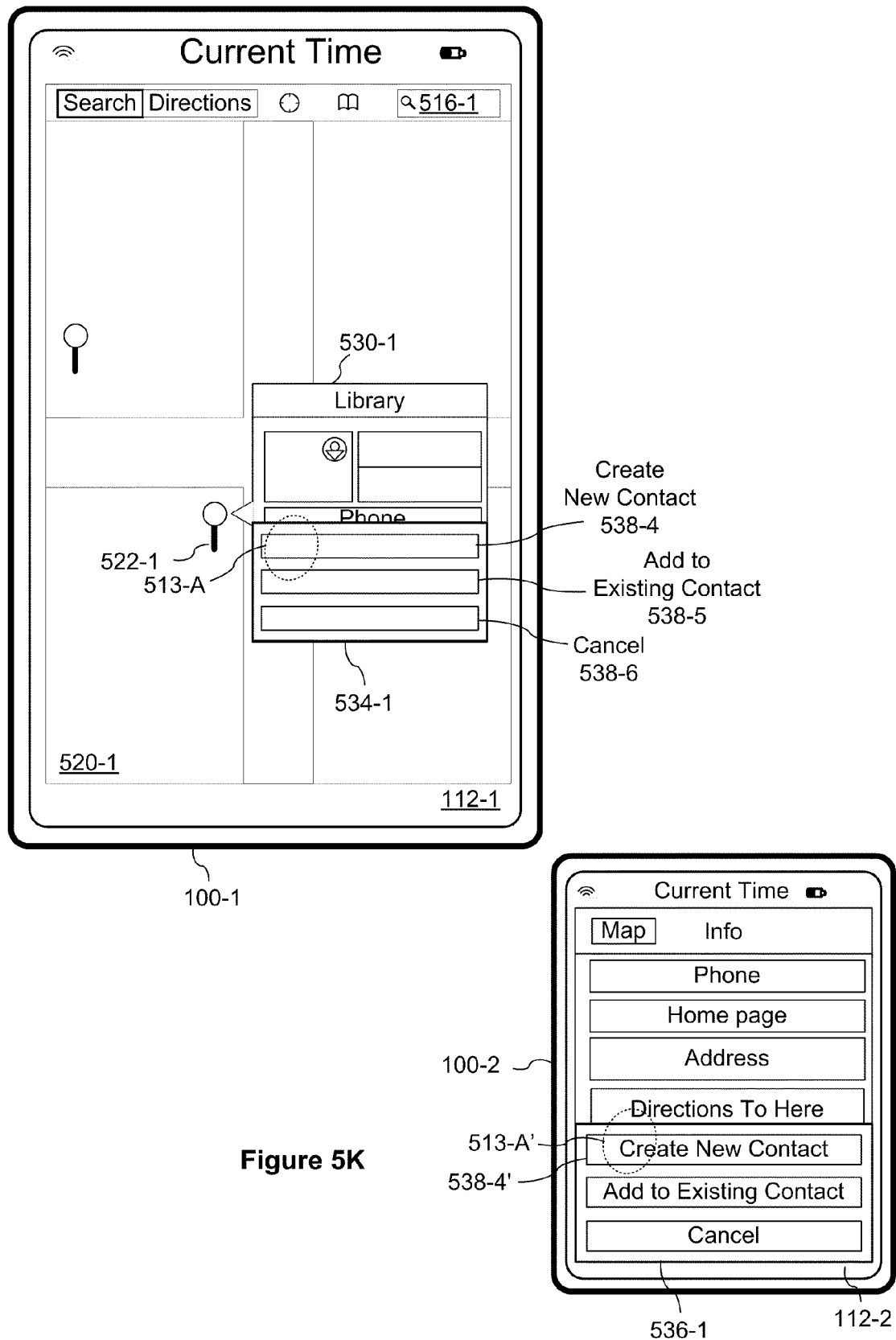
Figure 5L:
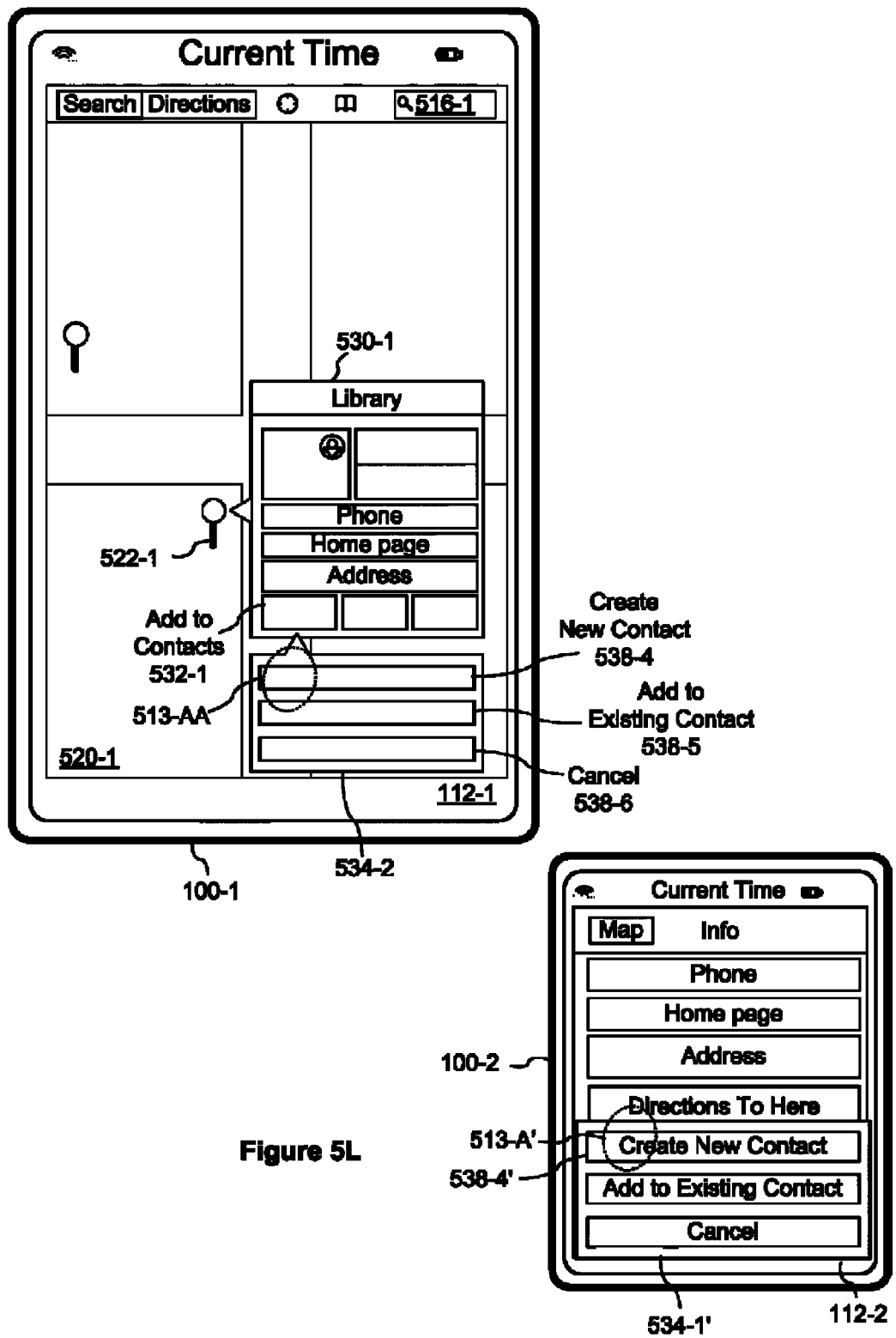
Figure 5M:
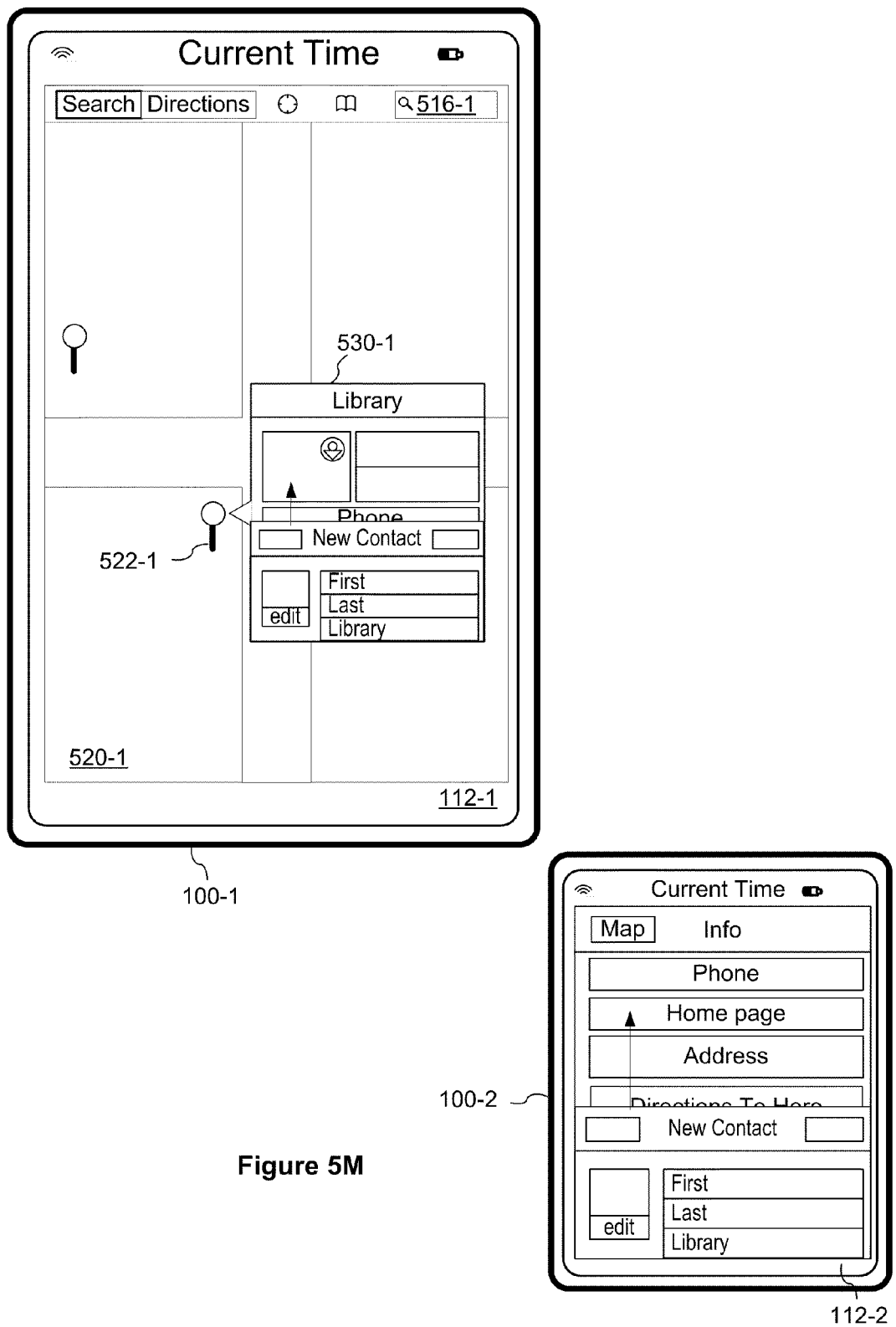
Figure 5N:
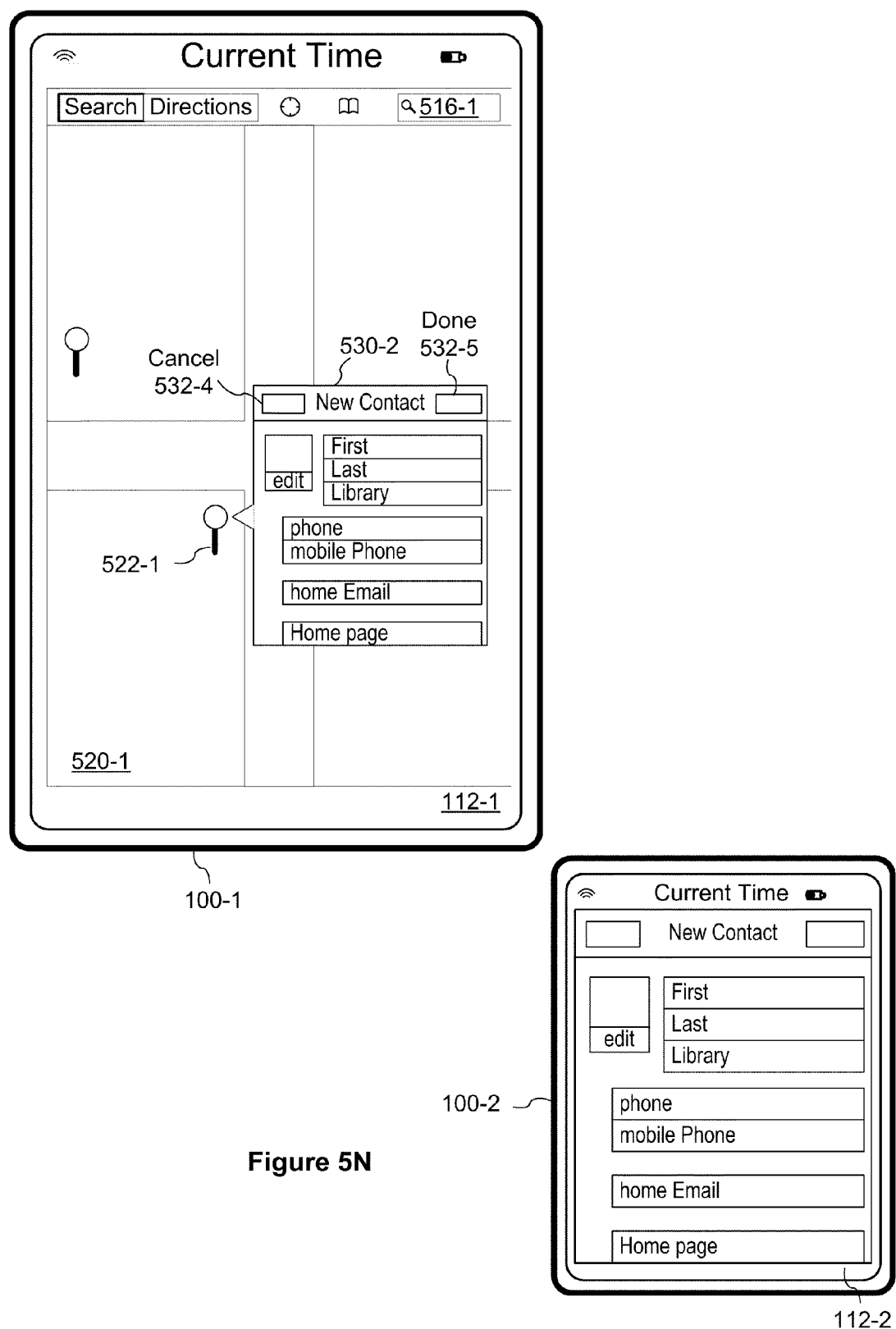
Figure 5O:
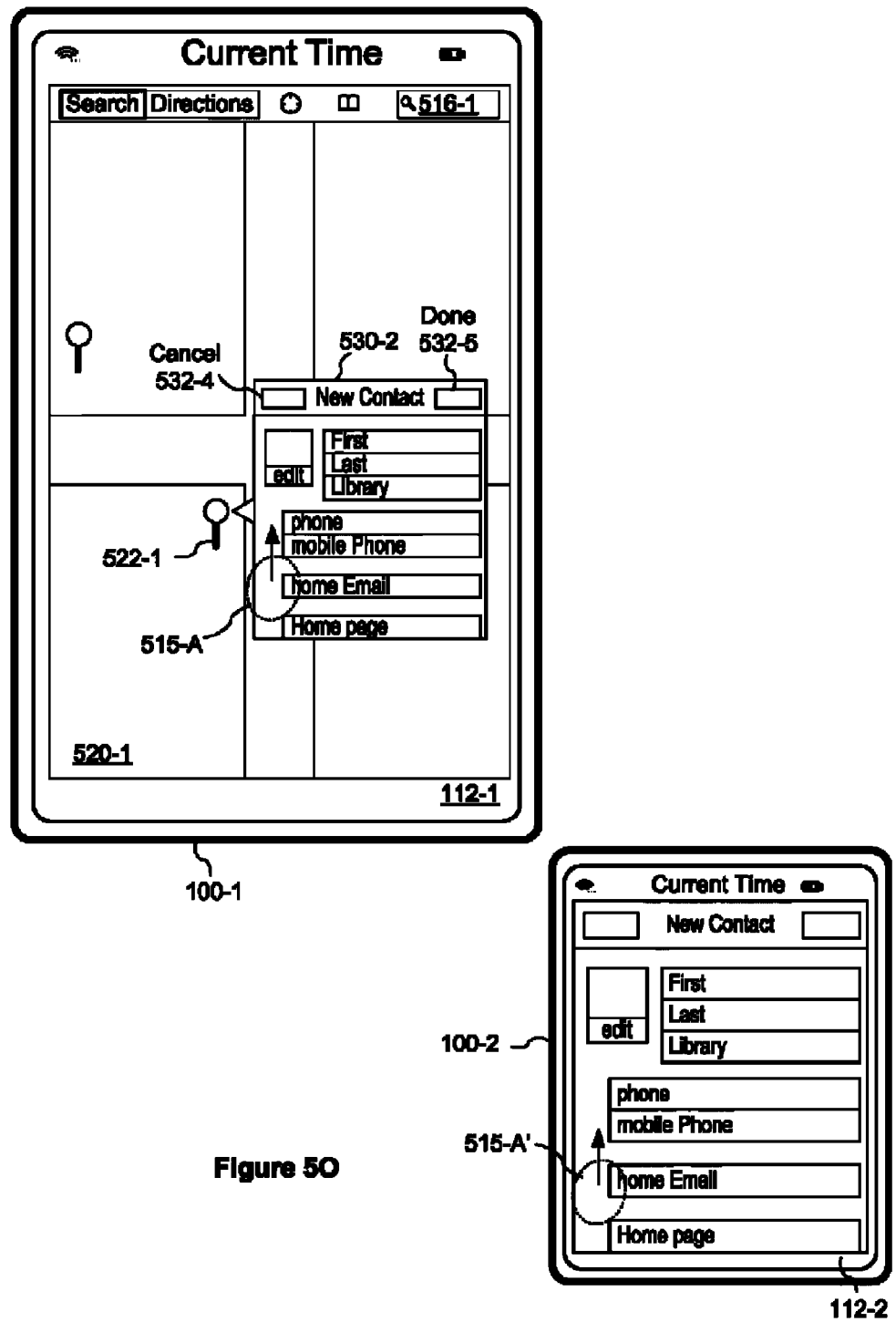
Figure 5P:
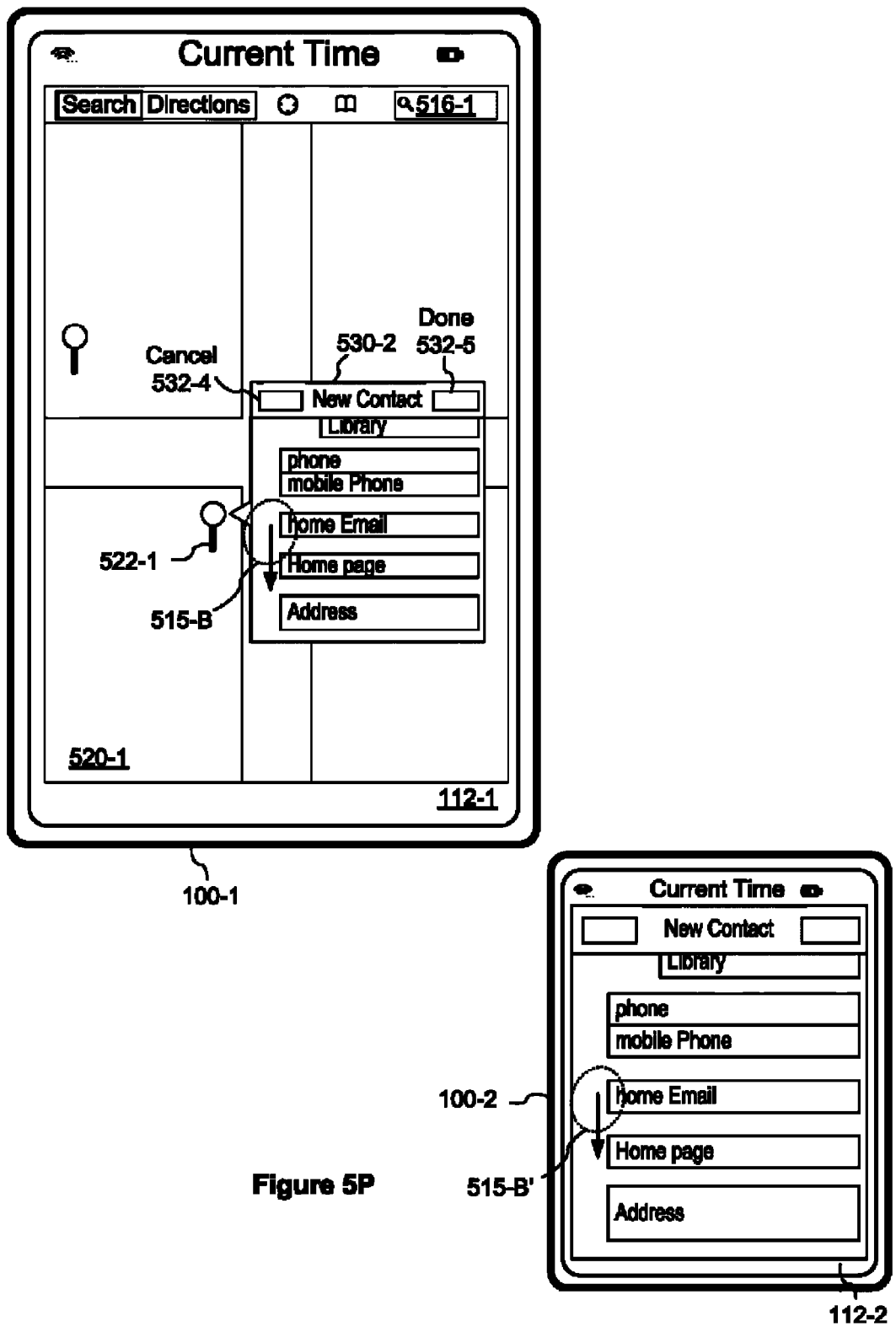
Figure 5Q:
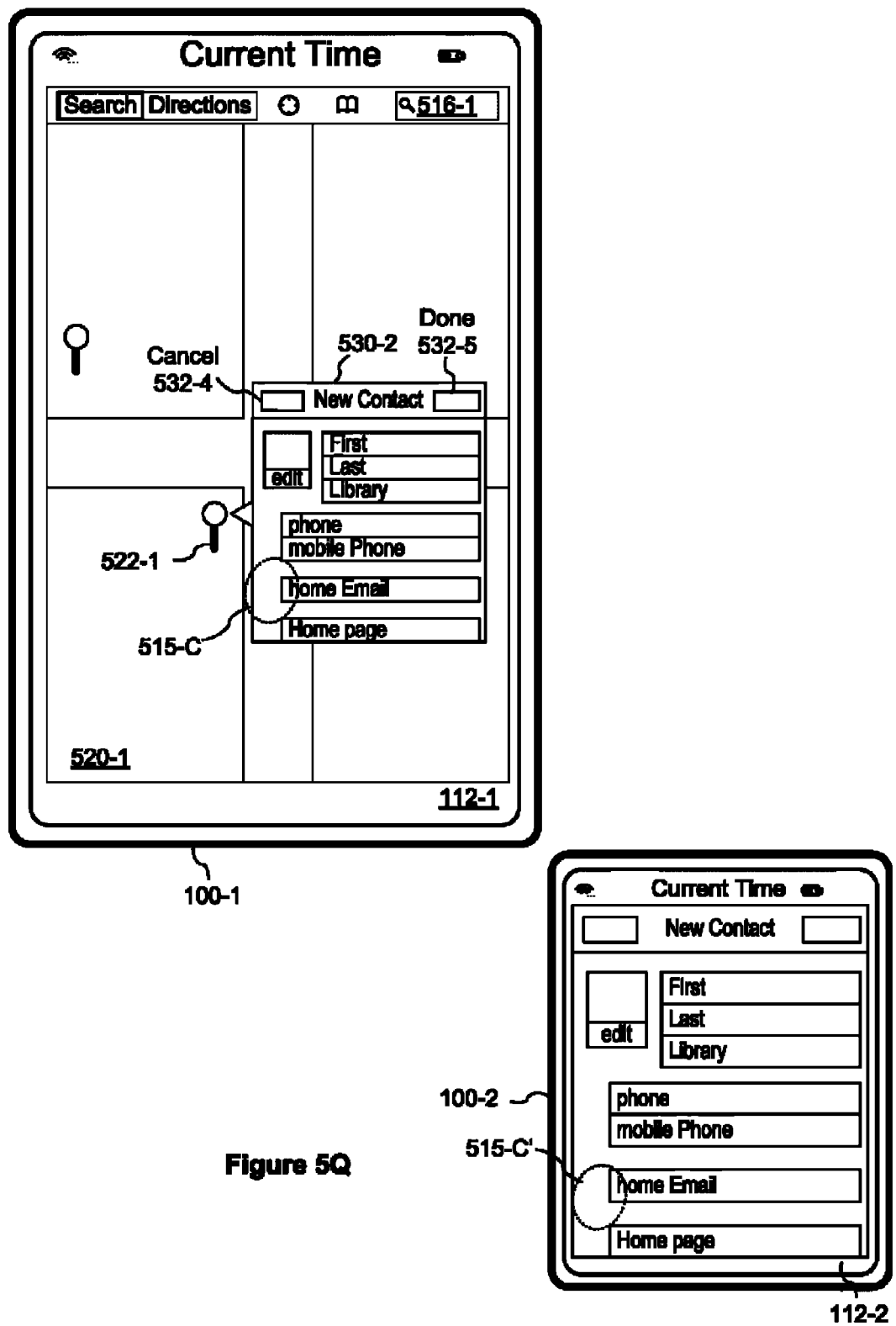
Figure 5R:
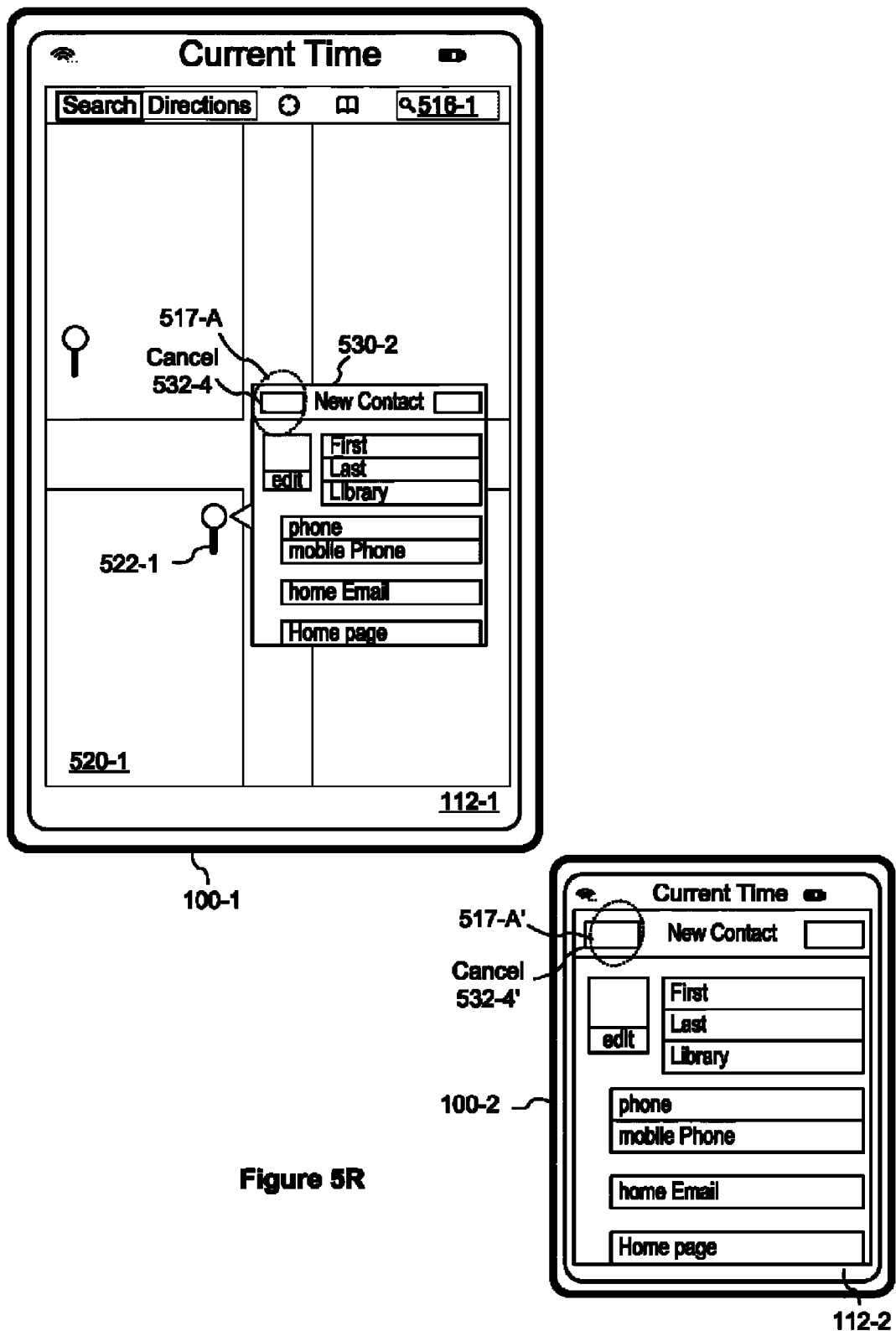
Figure 5S:
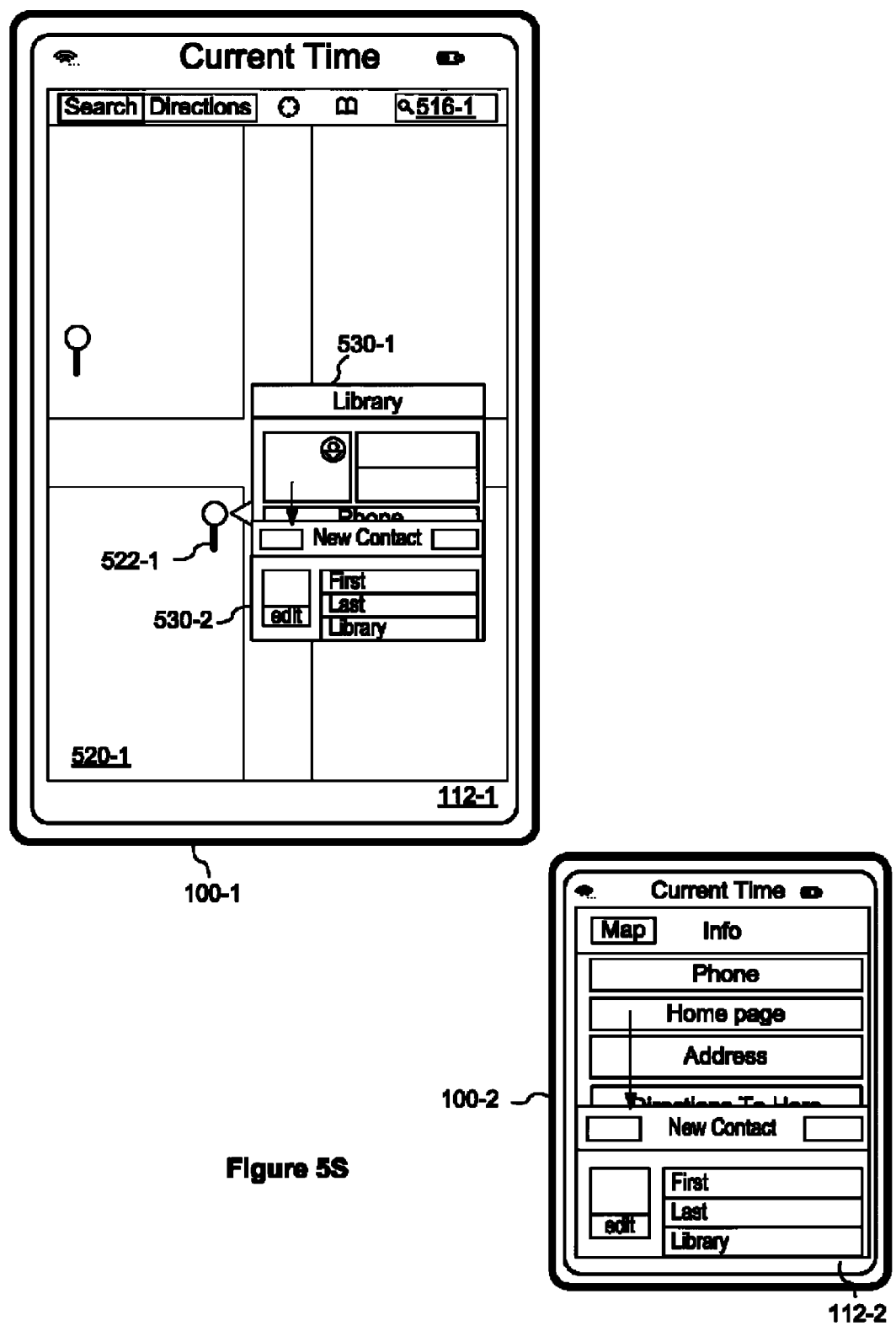
Figure 5T:
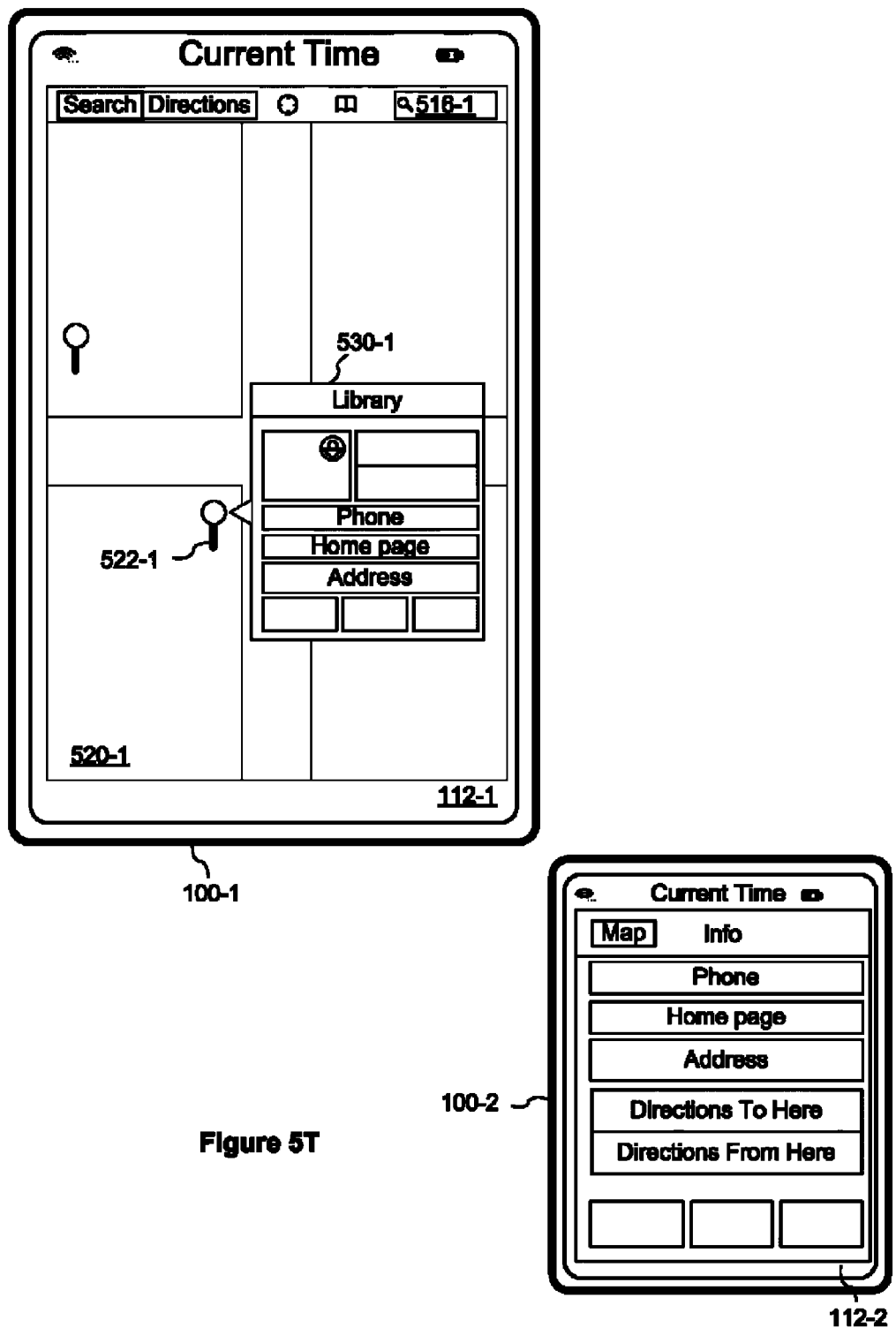

In FIGS. 5A-5T, exemplary user interfaces with interactive popup views in a map application (e.g., map module 154, FIG. 1) on touch screen 112-1 of first multifunction device 100-1 are depicted. For comparison, user interfaces for corresponding full-screen-width views in a corresponding map application on touch screen 112-2 of second multifunction device 100-2 are also depicted. Touch screen 112-2 of second multifunction device 100-2 has a lower resolution than touch screen 112-1 of first multifunction device 100-1. In one example, touch screen 112-1 has a resolution that is two times the resolution of touch screen 112-2 (i.e., twice as many pixels in the lateral or horizontal dimension and twice as many pixels in the vertical dimension, for a total of four times as many pixels, as touch screen 112-2). In another example, touch screen 112-1 has a resolution that is more than two times the resolution of touch screen 112-2, with at least twice as many pixels in the horizontal dimension and at least twice as many pixels in the vertical dimension as touch screen 112-2.

As used herein, the term "full-screen-width view" in an application on a display refers to a view that occupies all or substantially all of the width of the display (e.g., at least 80%, 85%, 90% or 95% of the width of the display). Note that a full-screen-width view does not necessarily occupy the full-screen height of the display. For example, full-screen-width views include a first view that occupies the entire screen of a display (i.e., full-screen-width and full-screen-height view) as well as a second view that occupies the full-screen-width yet half-screen-height area of the display.

FIG. 5A depicts an exemplary user interface displaying map 520-1 in the map application on first multifunction device 100-1. The map application may include the following elements, or a subset or superset thereof:

search mode icon 508-1 that when activated (e.g., by a finger tap or other touch gesture on the icon) initiates the display of a map in a search mode; in the search mode, the map is configured to overlay search results; in this example, the search mode icon is activated, and the as a result, the search mode icon is highlighted with a bold outline;

directions mode icon 510-1 that when activated (e.g., by a finger tap or other touch gesture on the icon) initiates the display of a map in a directions mode; in the directions mode, the map application is configured to overlay directions;

view location icon 512-1 that when activated (e.g., by a finger tap or other touch gesture on the icon) initiates various modes in the map application; for example, when view location icon 512-1 is first activated, a current location of the device is displayed on map 520-1;

recent inputs icon 514-1 that when activated (e.g., by a finger tap or other touch gesture on the icon) initiates the display of bookmark locations, contacts, and/or recent inputs (i.e., recent search term inputs); and search term input area 516-1 that when activated (e.g., by a finger tap or other touch gesture on the icon) initiates receiving search terms (e.g., for location search, search terms can be full or partial address, or name of a business or a person).

The exemplary user interface on first multifunction device 100-1 also includes signal intensity indicator 502-1 (which indicates the intensity of the radio communication signal, such as signal for Wi-Fi, EDGE, and 3G), current time indicator 504-1, and battery power indicator 506-1.

FIG. 5A also illustrates two pins (522-1 and 522-2), indicating two locations. The locations may be obtained from a search (e.g., search results), from an address book (e.g., locations stored in the address book), from the map (e.g., points of interest or popular locations, such as gas stations), and/or from user inputs (e.g., dropped pins as described below).

In addition, FIG. 5A depicts an exemplary user interface displaying corresponding map 520-2 in the map application on second multifunction device 100-2. The map application on second multifunction device 100-2 may include the following elements, or a subset or superset thereof: 508-2, 510-2, 512-2, 516-2, and 522-1', which are analogous to similar elements described above. The user interface on second multifunction device 100-2 may include the following elements, or a subset or superset thereof: 502-2, 504-2, and 506-2, which are analogous to similar elements described above.

In FIG. 5B, contact 505-A (or other touch gesture) is detected at a location on touch screen 112-1 corresponding to pin 522-1, thereby selecting pin 522-1. Similarly, contact 505-A' is detected at a location on touch screen 112-2 corresponding to pin 522-1'.

FIG. 5C illustrates the display of callout 524-1 adjacent to pin 522-1 on first multifunction device 100-1. Callout 524-1 has a pointer pointing to pin 522-1. Callout 524-1 may include a text corresponding to the address, the type of the location (or the building), and/or the name of the person at the location. In this example, the callout 524-1 includes a text indicating the type of the location/building, "library". Callout 524-1 may additionally include the following elements, or a subset or superset thereof:

street view icon 528-1 that when activated (e.g., by a finger tap or other touch gesture on the icon) initiates the display of a street view from a location corresponding to the location of pin 522-1 on map 520-1; and information icon 526-1 that when activated (e.g., by a finger tap or other touch gesture on the icon) initiates the display of a popup view including information about the location corresponding to the location of pin 522-1 on map 520-1.

Similarly, callout 524-2 is displayed on the second multifunction device 100-2. Callout 524-2 may include the following elements, or a subset or superset thereof: 526-2 and 528-2, which are analogous to similar elements described above.

In FIG. 5D, contact 507-A is detected at a location on touch screen 112-1 corresponding to information icon 526-1. Similarly, contact 507-A' is detected at a location on touch screen 112-2 corresponding to information icon 526-2.

FIGS. 5E-5G illustrate an animation of displaying popup view 530-1 on first multifunction device 100-1. In FIGS. 5E-5G, an animation on a corresponding full-screen-width view on second multifunction device 100-2 is also illustrated.

In FIGS. 5E-5G, popup view 530-1 has a lateral resolution corresponding to the lateral resolution of touch screen 112-2 of second multifunction device 100-2. For example, when touch screen 112-2 of second multifunction device 100-2 has a lateral resolution of 320 pixels, the lateral resolution of popup view 530-1 is 320 pixels.

FIG. 5G illustrates the completion of the animation. On first multifunction device 100-1, popup view 530-1 partially covers map 520-1. In comparison, the corresponding full-screen-width view on second multifunction device 100-2 completely covers map 520-2.

In FIG. 5G, popup view 530-1 includes a pointer, and the pointer points to pin 522-1.

FIG. 5G also illustrates that popup view 530-1 may include the following elements, or a subset or superset thereof:

directions icons 532-4 and 532-5 that when activated (e.g., by a finger tap on the icon) initiate the directions mode and provides the location of the pin as an ending point or a starting point, respectively;

menu icons 538-1, 538-2, and 538-3 that respectively include phone number, home page, and address associated with the location corresponding to the location of pin 522-1 on map 520-1; the respective menu icon 538, when activated (e.g., by a finger tap on the icon), initiates an editing process for the respective content (e.g., phone number, home page, and address) associated with respective menu icon 538;

street view icon 538-4 that includes a street view for the location corresponding to the location of pin 522-1 on map 520; street view icon 538-4 when activated (e.g., by a finger tap on the icon) initiates the display of street views;

"add to contacts" icon 532-1 that when activated (e.g., by a finger tap on the icon) initiates storing the location information associated with pin 522-1 in the user's address book (also called the user's contacts or the user's contact list);

share icon 532-2 that when activated (e.g., by a finger tap on the icon) initiates sharing with a selected person or group the location information associated with pin 522-1; and bookmarks icon 532-3 that when activated (e.g., by a finger tap on the icon) initiates storing the location information associated with pin 522-1 in bookmarks.

In FIG. 5G, the corresponding full-screen-width view on the second multifunction device 100-2 may include similar elements described above (e.g., phone, home page, address, etc.), or a subset or superset thereof.

Popup view 530-1 and the corresponding full-screen-width view are not identical in FIG. 5G. In particular, the arrangement of the elements is different. For example, directions icons 532-4 and 532-5 appear above menu icons 538-1, 538-2, and 538-3 in popup view 530-1, while the directions icons appear below menu icons in the corresponding full-screen-width view displayed on the second multifunction device 100-2.

Furthermore, the height of popup view 530-1 need not match the height of the corresponding full-screen-width view. In this example, popup view 530-1 is taller than the height of the corresponding full-screen-width view on the second multifunction device 100-2. Popup view 530-1 in this example also displays icons 532-1, 532-2, and 532-3 that do not appear on the corresponding full-screen-width view on the second multifunction device 100-2.

FIGS. 5H-5I illustrate a scrolling operation on the corresponding full-screen-width view. FIG. 5H illustrates a detection of contact 509 at a location corresponding to 509-A' on touch screen 112-2. In FIG. 5I, contact 509 has moved across touch screen 112-2 to a location corresponding to 509-B'. The corresponding full-screen-width view has scrolled in accordance with the movement of contact 509, and displays icons 532-1', 532-2', 532-3', which are analogous to similar elements described above.

In FIG. 5J, contact 511-A is detected on touch screen 112-1 at a location corresponding to the "add to contacts" icon 532-1. Similarly, contact 511-A' is detected on touch screen 112-2 at a location corresponding to "add to contacts" icon 532-1'.

FIGS. 5K and 5L illustrate two embodiments of displaying a second popup view. FIG. 5K illustrates the display of second popup view 534-1 within popup view 530-1. Second popup view 534-1 may include the following elements, or a subset or superset thereof:

"create new contact" icon 538-4, when activated (e.g., by a finger tap or other touch gesture on the icon), initiates creating a new contact in the user's address book with the location information associated with pin 522-1;

"add to existing contact" icon 538-5, when activated (e.g., by a finger tap or other touch gesture on the icon), initiates adding the location information associated with pin 522-1 to an existing contact; and cancel icon 538-6, when activated (e.g., by a finger tap or other touch gesture on the icon), ceases to display second popup view 534-1.

Similarly, second multifunction device 100-2 displays slide-in menu 536-1. Slide-in menu 536-1 may include the elements described above, or a subset or superset thereof. In this example, slide-in menu 536-1 includes "create new contact" icon 538-4' (for creating a new contact in the user's address book).

FIG. 5K also illustrates that contact 513-A is detected on touch screen 112-1 of device 100-1 at a location corresponding to "create new contact" icon 538-4. Similarly, contact 513-A' is detected on touch screen 112-2 of device 100-2 at a location corresponding to "create new contact" icon 538-4'.

FIG. 5L illustrates the display of second popup view 534-2 next to popup view 530-1. In this example, second popup view 534-2 is displayed below popup view 530-1. In FIG. 5L, second popup view 534-2 does not cover first popup view 530-1. Second popup view 534-2 has a pointer that points to "add to contacts" icon 532-1. The display of popup view 530-1 and a remaining portion of map 520-1 is maintained. Second popup view 534-2 may include the elements described above, or a subset or superset thereof.

FIG. 5L also illustrates that contact 513-AA is detected on touch screen 112-1 of first multifunction device 100-1 at a location corresponding to the "create new contact" icon 538-4 in second popup view 534-2. Second multifunction device 100-2 is illustrated in FIG. 5L as described above with reference to FIG. 5K.

FIGS. 5M-5N illustrate an animation of third popup view 530-2 (shown in FIG. 5N) sliding in over popup view 530-1 (shown in FIG. 5M). As shown in FIG. 5N, third popup view 530-2 includes a plurality of elements, such as first last name, type of the contact, photo, phone numbers, e-mail address, and home page.

In FIG. 5N, third popup view 530-2 also includes the following elements, or a subset or superset thereof:

cancel icon 532-4 that when activated (e.g., by a finger tap or other touch gesture on the icon) initiates multifunction device 100-1 to cease to display third popup view 530-2; and done icon 532-5 that when activated (e.g., by a finger tap or other touch gesture on the icon) stores the location information associated with pin 522-1 in the user's address book (also called the user's contacts or contact list) in memory (e.g., memory 102, FIG. 1A, or memory 370, FIG. 3) of first multifunction device 100-1.

Similar to first popup view 530-1 described above, second popup view 530-2 partially covers map 520-1 on first multifunction device 100-1. In comparison, a corresponding full-screen-width view on second multifunction device 100-2 completely covers map 520-2 on second multifunction device 100-2.

FIGS. 5O-5Q illustrate a scrolling operation within third popup view 530-2. In FIG. 5O, contact 515-A is detected on third popup view 530-2. Similarly, contact 515-A' is detected on user interface 112-2 of second multifunction device 100-2.

FIG. 5P illustrates a movement of the contact 515 across touch screen 112-1 to another location 515-B on first multifunction device 100-1. During the movement, contact 515 remains in contact touch screen 112-1. Third popup view 530-2 scrolls a portion of third popup view 530-2 in accordance with the movement of contact 515. Similarly, contact 515 on second multifunction device 100-2 moves across touch screen 112-2 to another location 515-B', and the view on second multifunction device 100-2 scrolls a portion of the view.

FIG. 5Q illustrates a movement of contact 515 across touch screen 112-1 to yet another location 515-C on first multifunction device 100-1. In this example, contact 515 returns to a location close to location 515-A. Third popup view 530-2 scrolls a portion of popup view 530-2 in accordance with the movement of contact 515. Similarly, a corresponding contact 515 moves to yet another location 515-C' on the second multifunction device 100-2.

In FIG. 5R, contact 517-A is detected on touch screen 112-1 of first multifunction device 100-1 at a location corresponding to cancel icon 532-4. Similarly, contact 517-A' is detected on touch screen 112-2 on the second multifunction device 100-2 at a location corresponding to cancel icon 532-4'.

FIGS. 5S-5T illustrate an animation of ceasing to display third popup view 530-2. In FIG. 5S, third popup view 530-2 slides out at the bottom. FIG. 5T illustrates the completion of the animation. In FIG. 5T, the display of popup view 530-1 is maintained on first multifunction device 100-1.

Figure 5U:
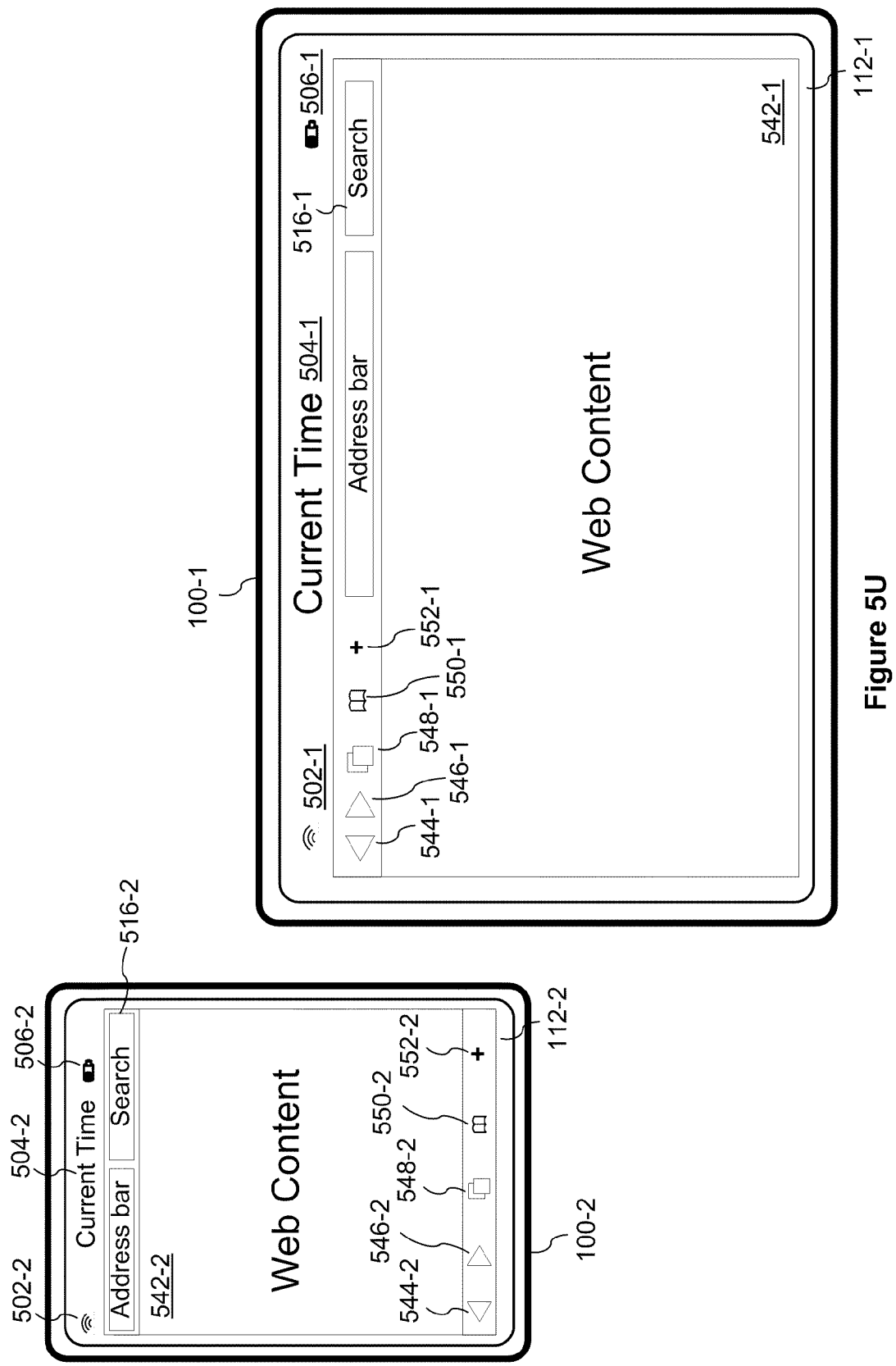

FIGS. 5U-5JJ illustrate exemplary user interfaces with interactive popup views in a browser application on touch screen 112-1. For comparison, user interfaces for corresponding full-screen-width views in a corresponding map application on touch screen 112-2 of second multifunction device 100-2 are also depicted.

In FIGS. 5U-5JJ, popup views 530 have a lateral resolution corresponding to the lateral resolution of touch screen 112-2 of second multifunction device 100-2, as described above.

FIG. 5U depicts an exemplary user interface displaying web content 542-1 in the browser application on first multifunction device 100-1. The browser application may include the following elements, or a subset or superset thereof:

back icon 544-1 that when activated (e.g., by a finger tap on the icon) initiates the display of a previous page visited in the browser application;

forward icon 546-1 that when activated (e.g., by a finger tap on the icon) initiates the display of a next page visited in the browser application;

page icon 548-1 that when activated (e.g., by a finger tap on the icon) initiates the display of multiple web pages;

bookmarks icon 550-1 that when activated (e.g., by a finger tap on the icon) initiates the display of bookmarks;

add icon 552-1 that when activated (e.g., by a finger tap on the icon) initiates adding the current web page address to the bookmarks;

address bar that displays the web address of a displayed web page; when activated, the address bar initiates receiving a web page address for browsing; and search term input area 516-1, as described above (for browsers, search term inputs are query terms for internet search engines).

In addition, touch screen 112-1 includes signal intensity indicator 502-1, current time indicator 504-1, and battery power indicator 506-1 as described above.

FIG. 5U also depicts an exemplary user interface displaying web content 542-2 in a corresponding browser application on second multifunction device 100-2. The browser on second multifunction device 100-2 may include the following elements, or a subset or superset thereof: 516-2, 544-2, 546-2, 548-2, 550-2, 552-2, which are analogous to elements 516-1, 544-1, 546-1, 548-1, 550-1, 552-1 described above. The user interface on second multifunction device 100-2 may also include the following elements, or a subset or superset thereof: 502-2, 504-2, and 506-2, which are analogous to elements 502-1, 504-1 and 506-1, described above.

Figure 5V:
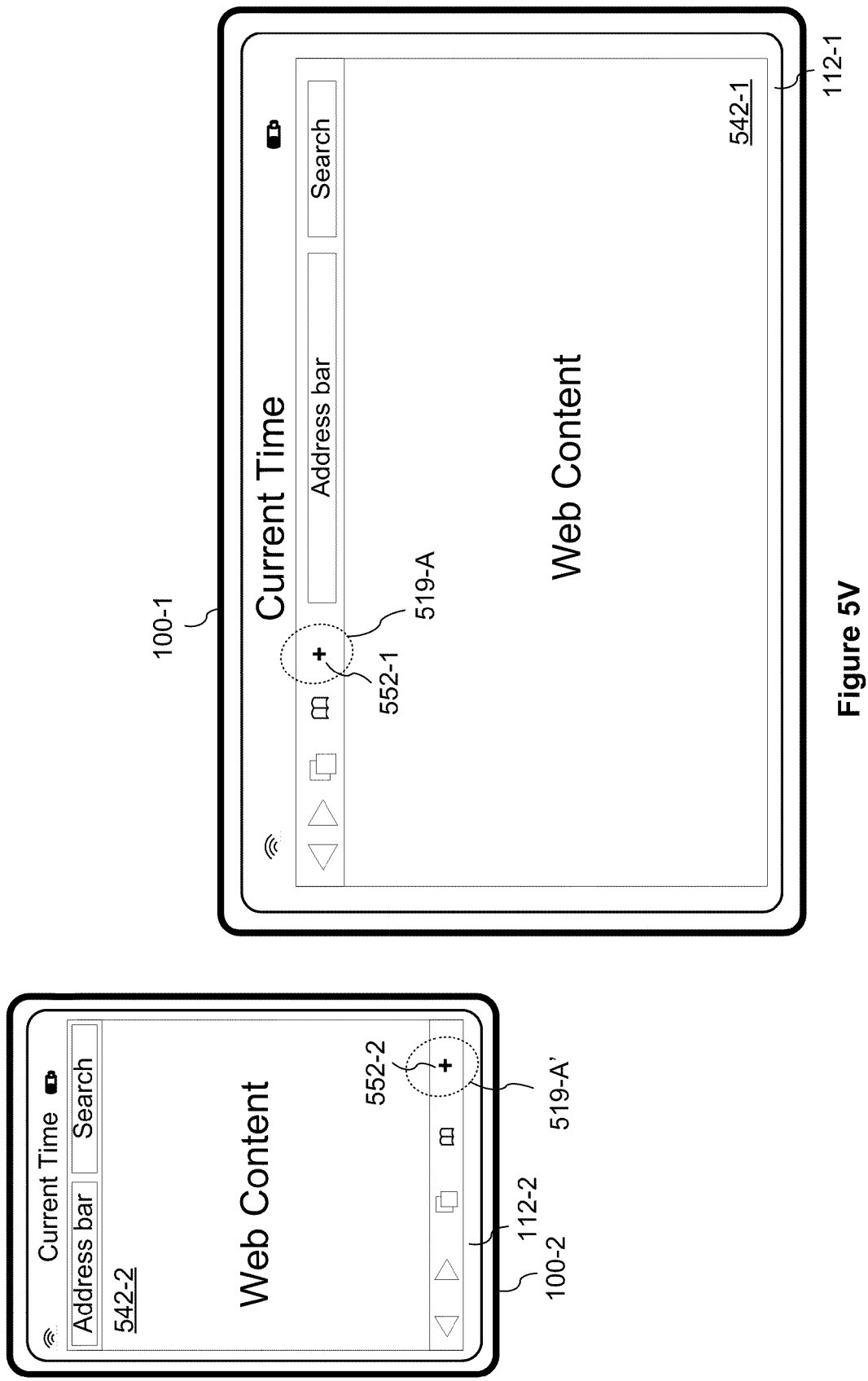

In FIG. 5V, contact 519-A or other touch gesture is detected at a location on touch screen 112-1 corresponding to add icon 552-1 on first multifunction device 100-1. Similarly, contact 519-A' or other touch gesture is detected at a location on touch screen 112-2 corresponding to add icon 552-2 on second multifunction device 100-2.

Figure 5W:
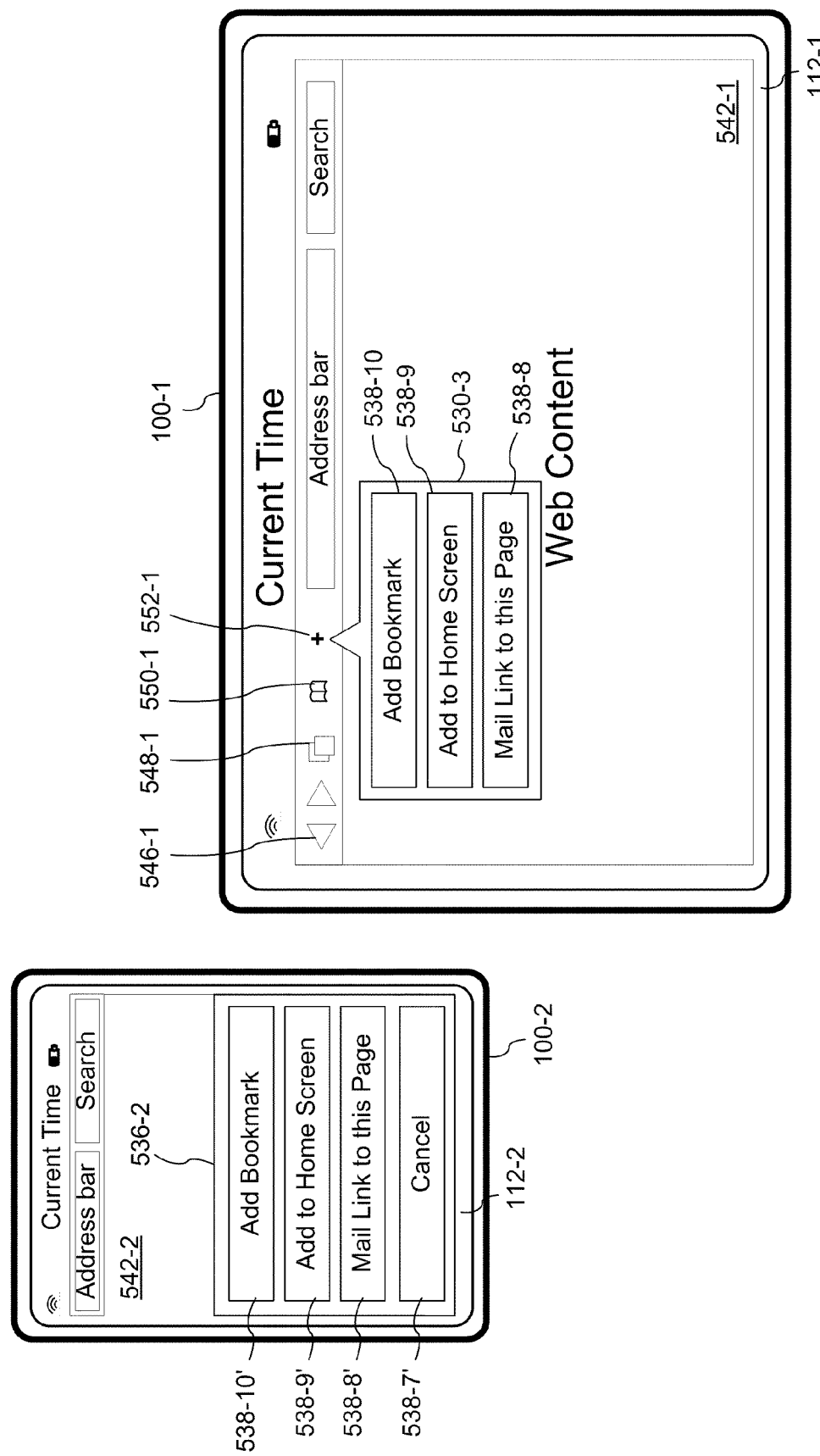

FIG. 5W illustrates popup view 530-3 displayed on first multifunction device 100-1. Popup view 530-3 includes icons 538-8, 538-9, and 538-10 that when activated (e.g., by a finger tap or other touch gesture on the respective icon) initiates performance of respective actions (mail link to this page, add to home screen, add bookmark) indicated by the respective icons 538. Popup view 530-3 corresponds to the full-screen-width view on second multifunction device 100-2. The full-screen-width view on second multifunction device 100-2 includes add-menu view 536-2. Add-menu view 536-2 includes icons 538-8', 538-9', and 538-10', which when activated initiate performance of the same or similar actions as icons 538-8, 538-9, and 538-10. In addition, the add-menu view 536-2 includes cancel icon 538-7' for returning the second device to the view displayed prior to add-menu view 536-2. Popup view 530-3 is canceled by tapping or other touch gesture at a location within view 542-1 not covered by add-menu view 536-2.

In FIG. 5W, the menu icons (e.g., back icon 544-1, forward icon 546-1, page icon 548-1, bookmarks icon 550-1, and add icon 552-1) remain on touch screen 112-1. In comparison, corresponding menu icons on touch screen 112-2 are covered by add-menu view 536-2.

Figure 5Y:
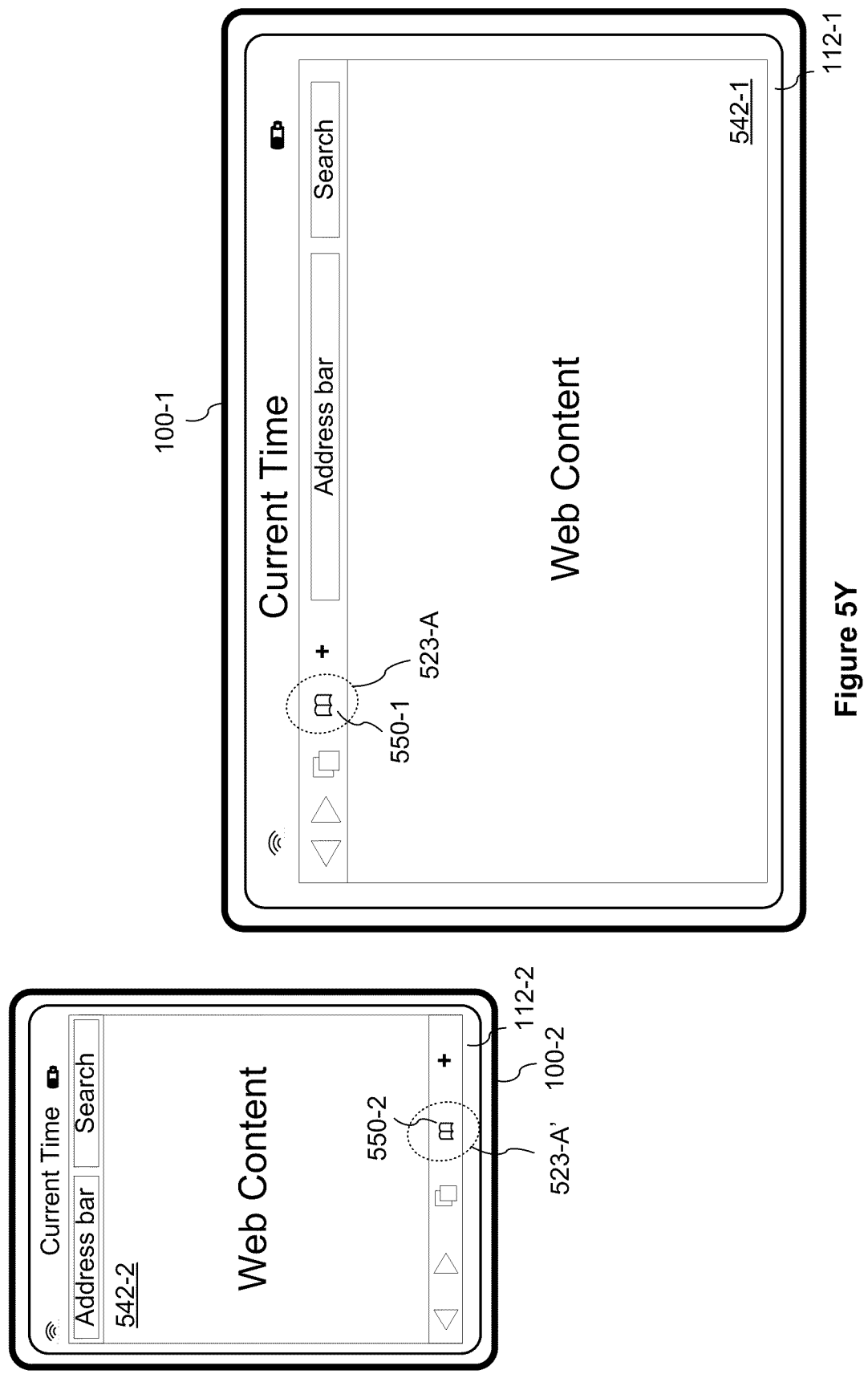
Figure 5Z:
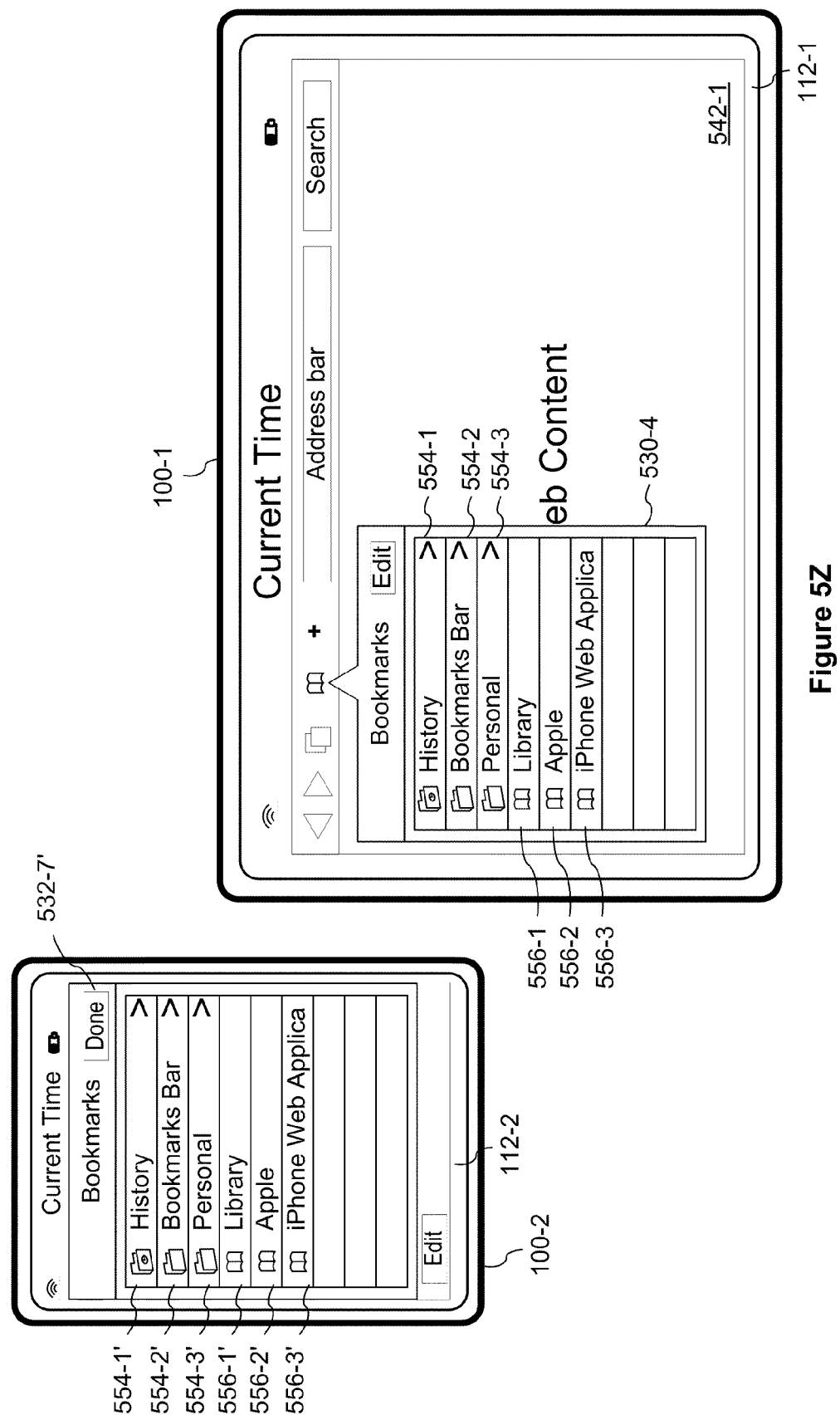
Figure 5A:
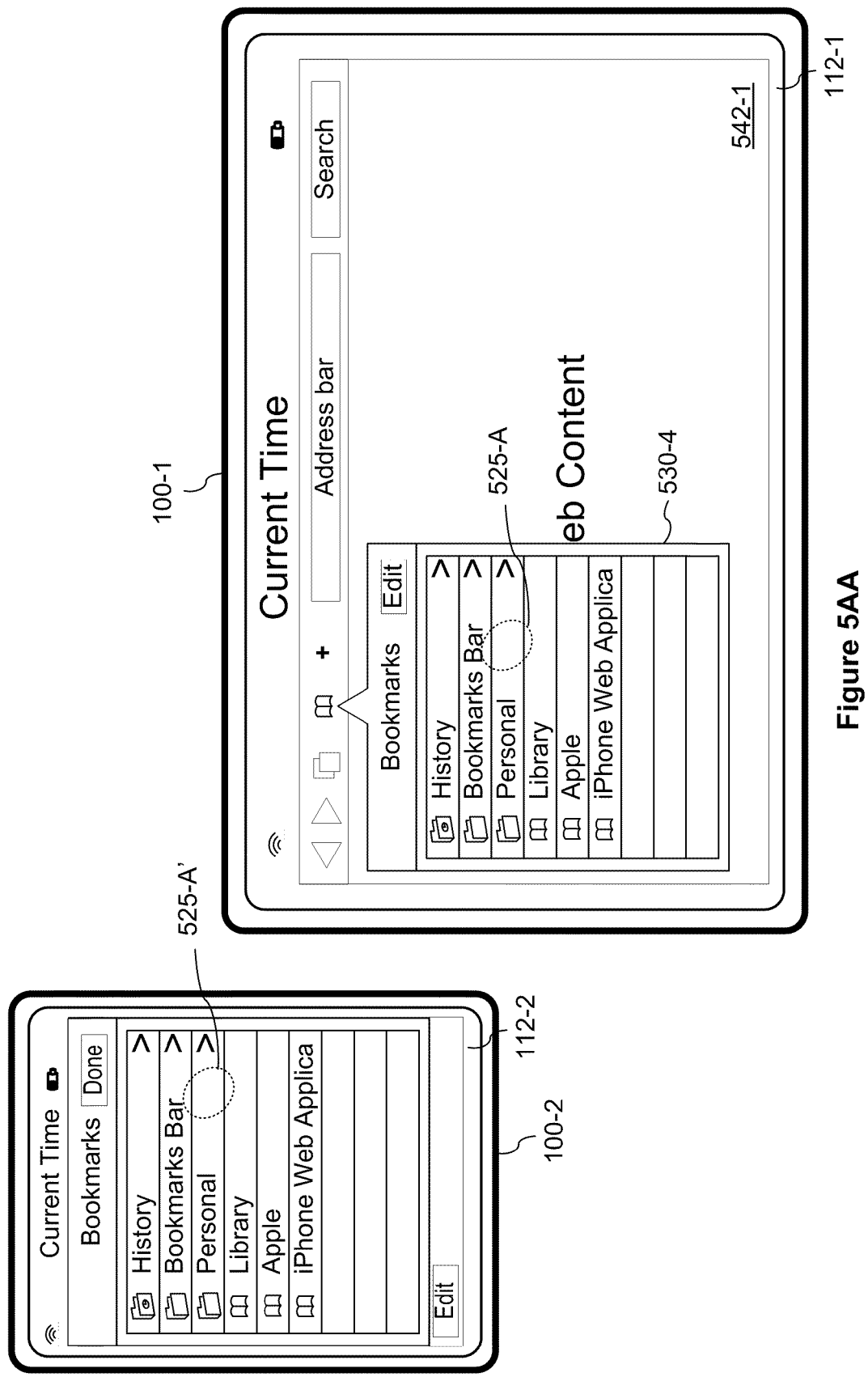
Figure 5B:
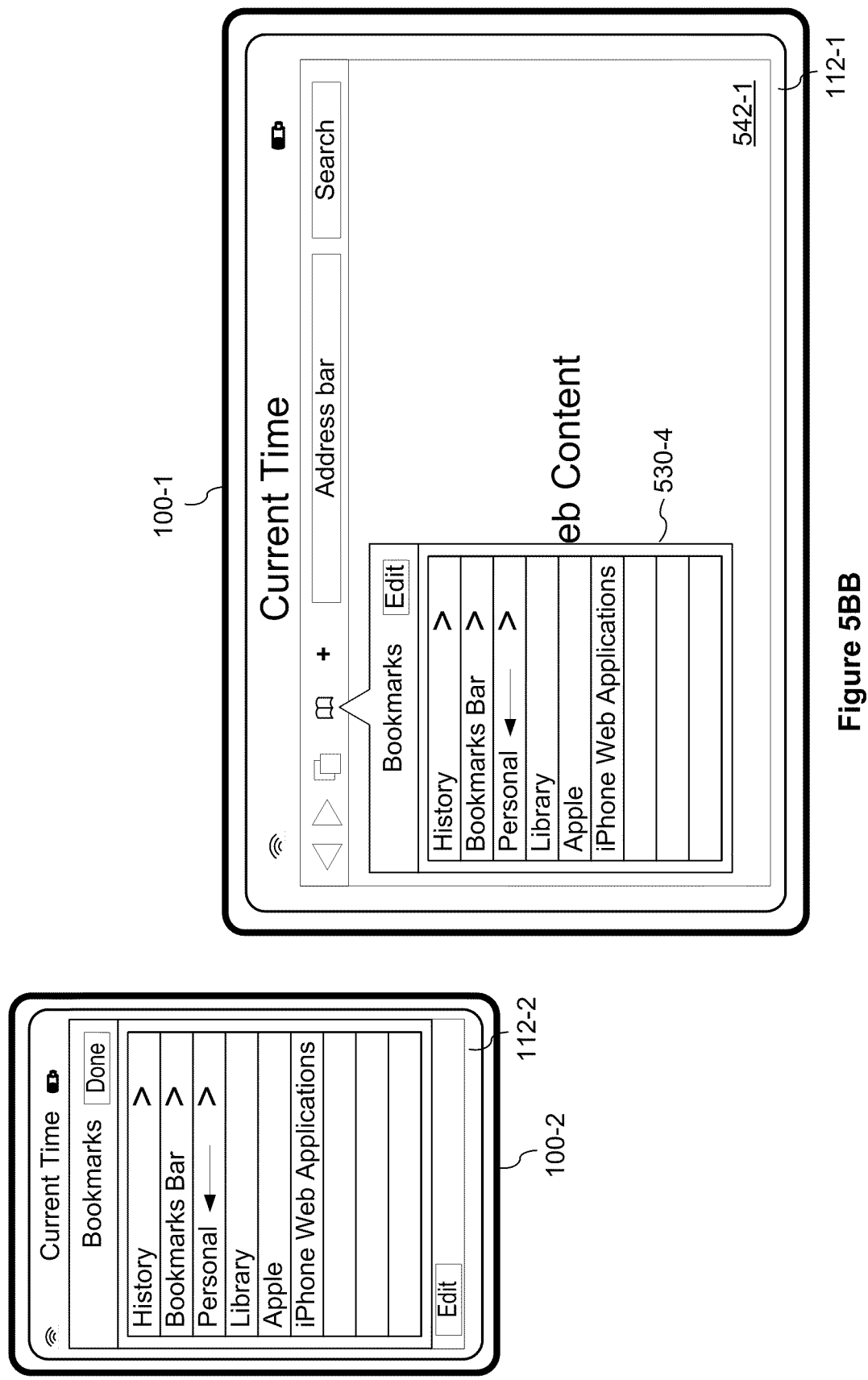
Figure 5C:
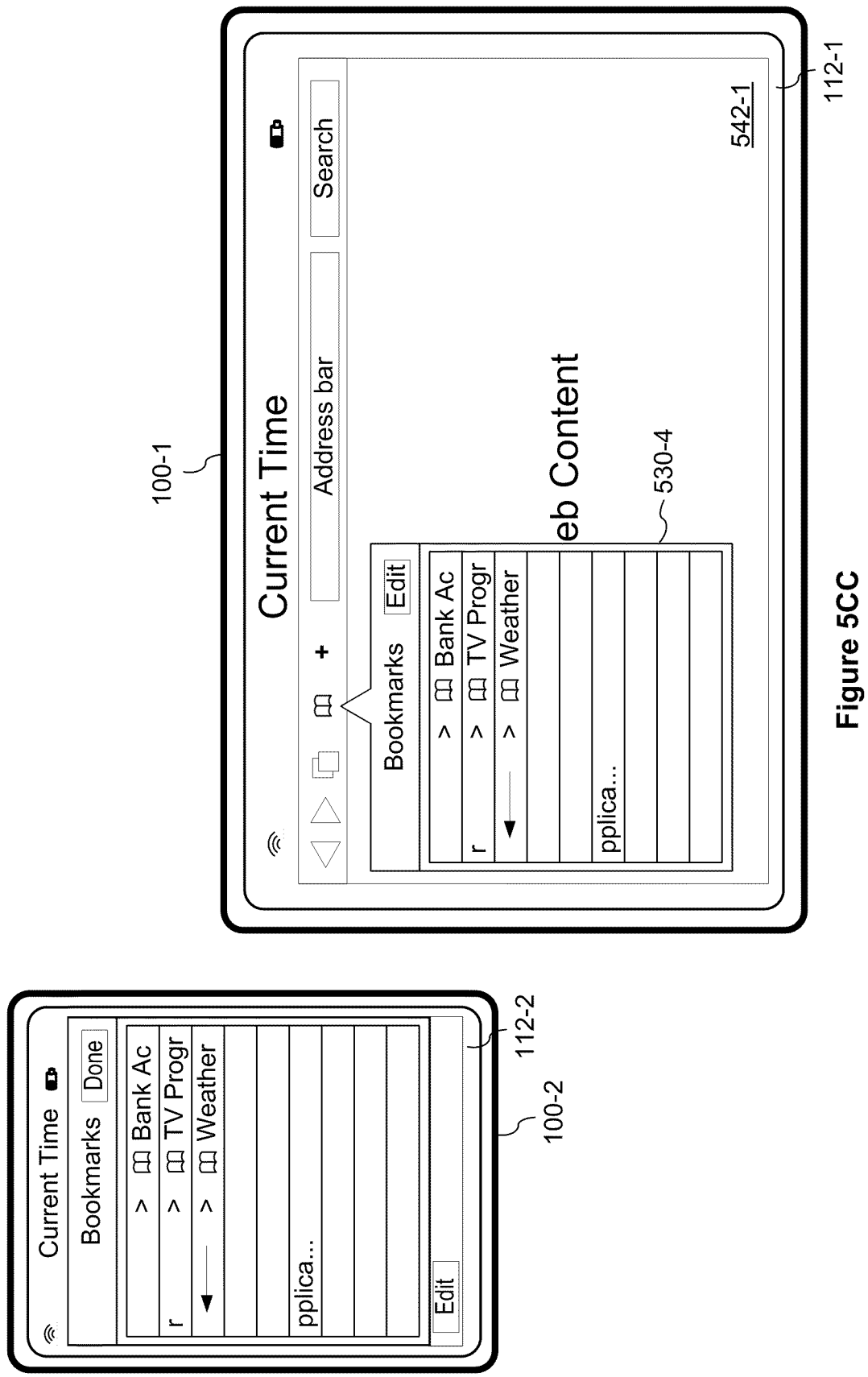
Figure 5D:
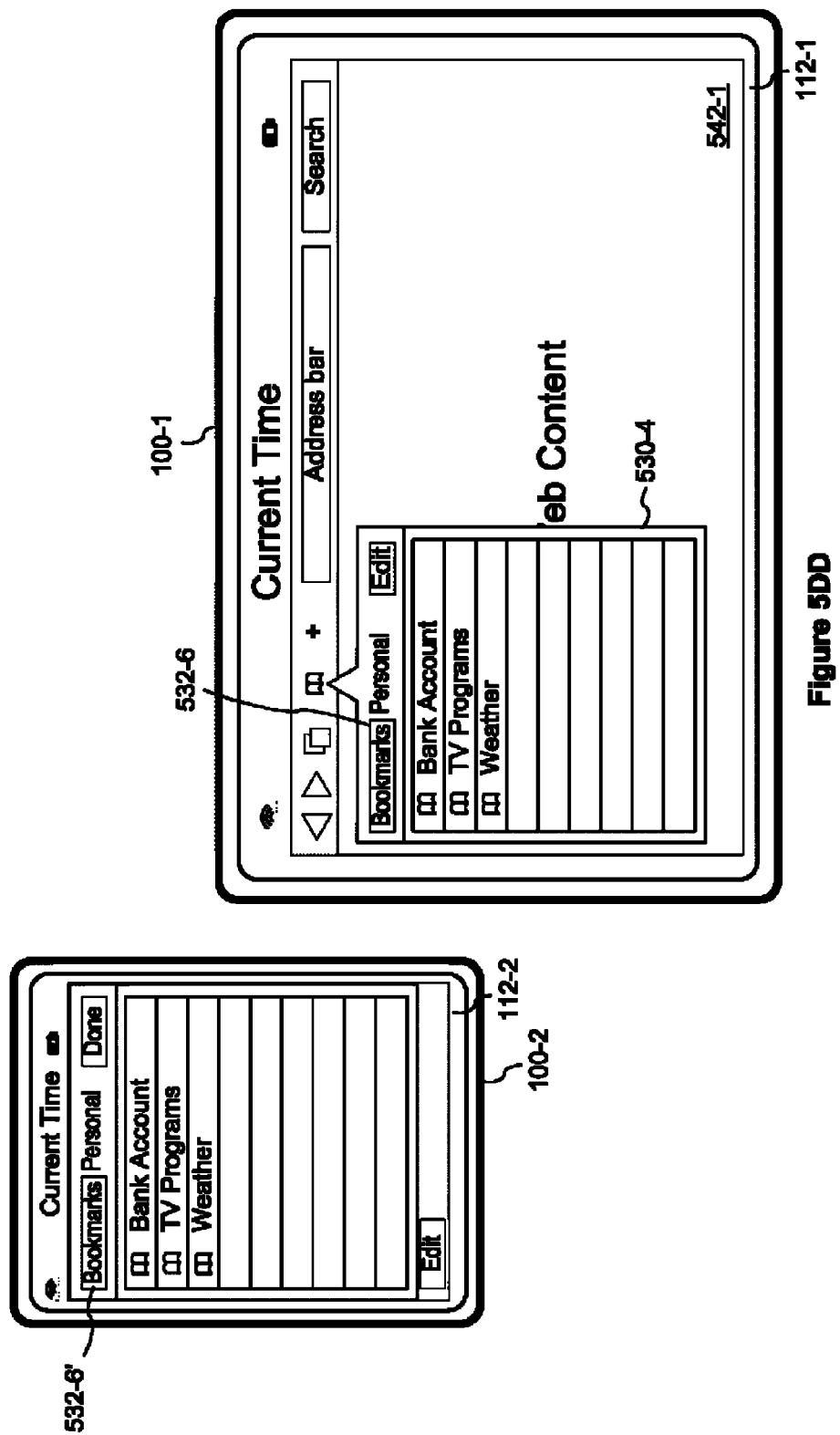
Figure 5E:
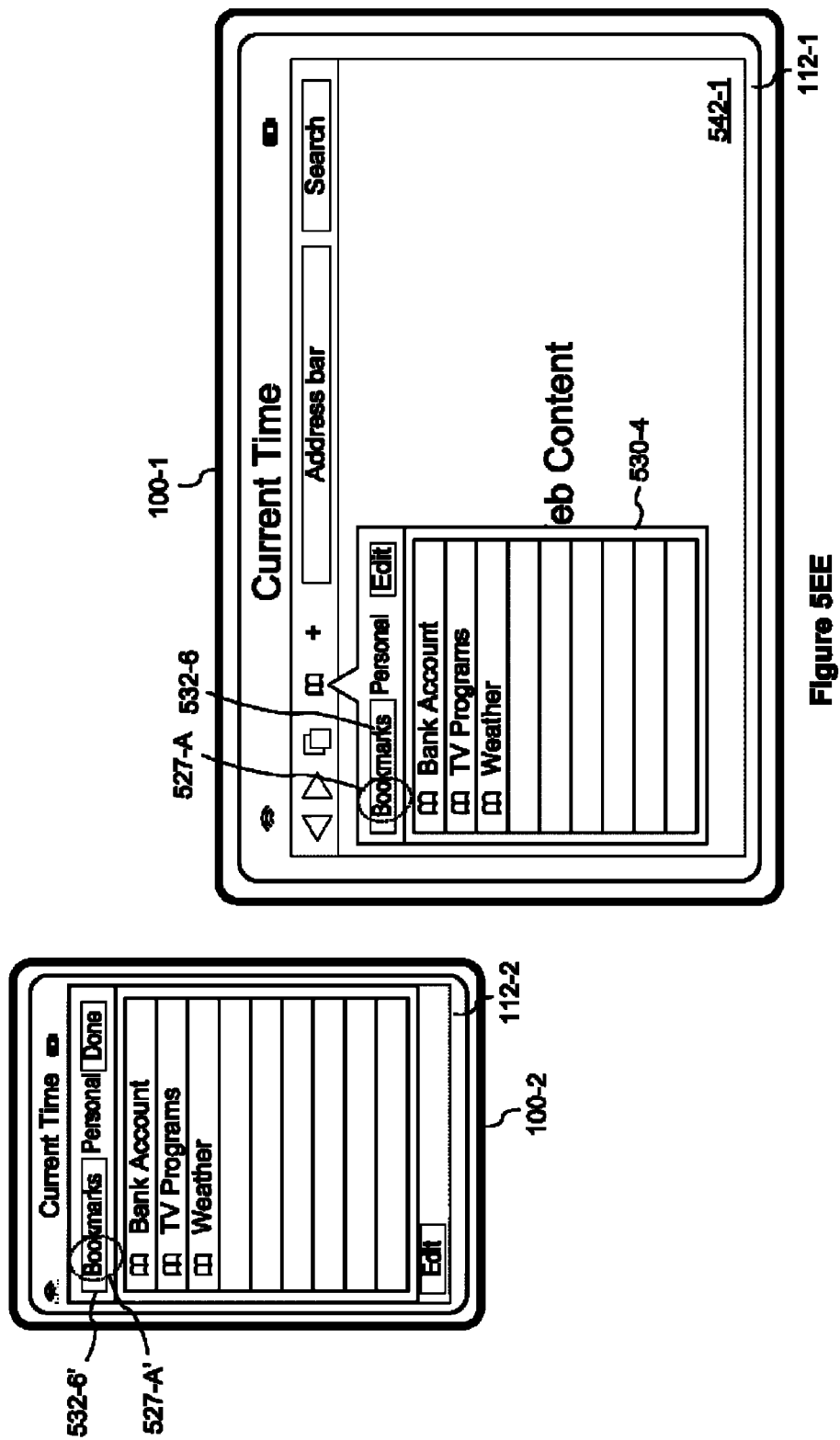
Figure 5F:
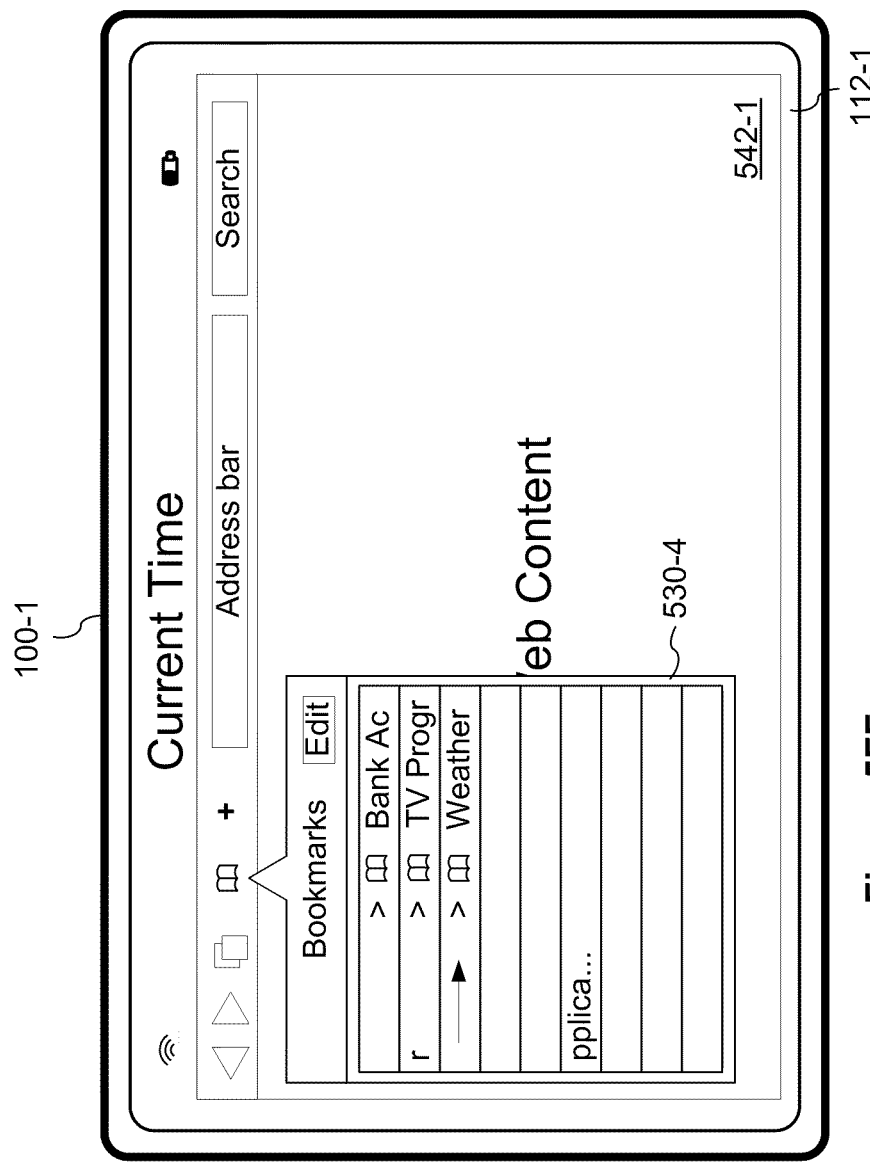
Figure 5F:
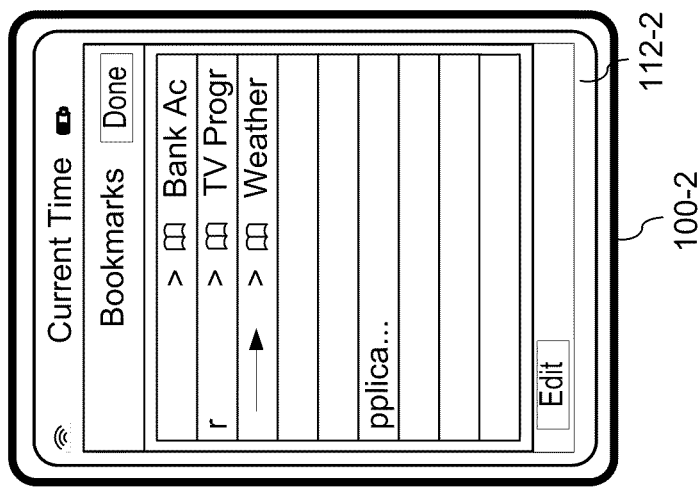
Figure 5G:
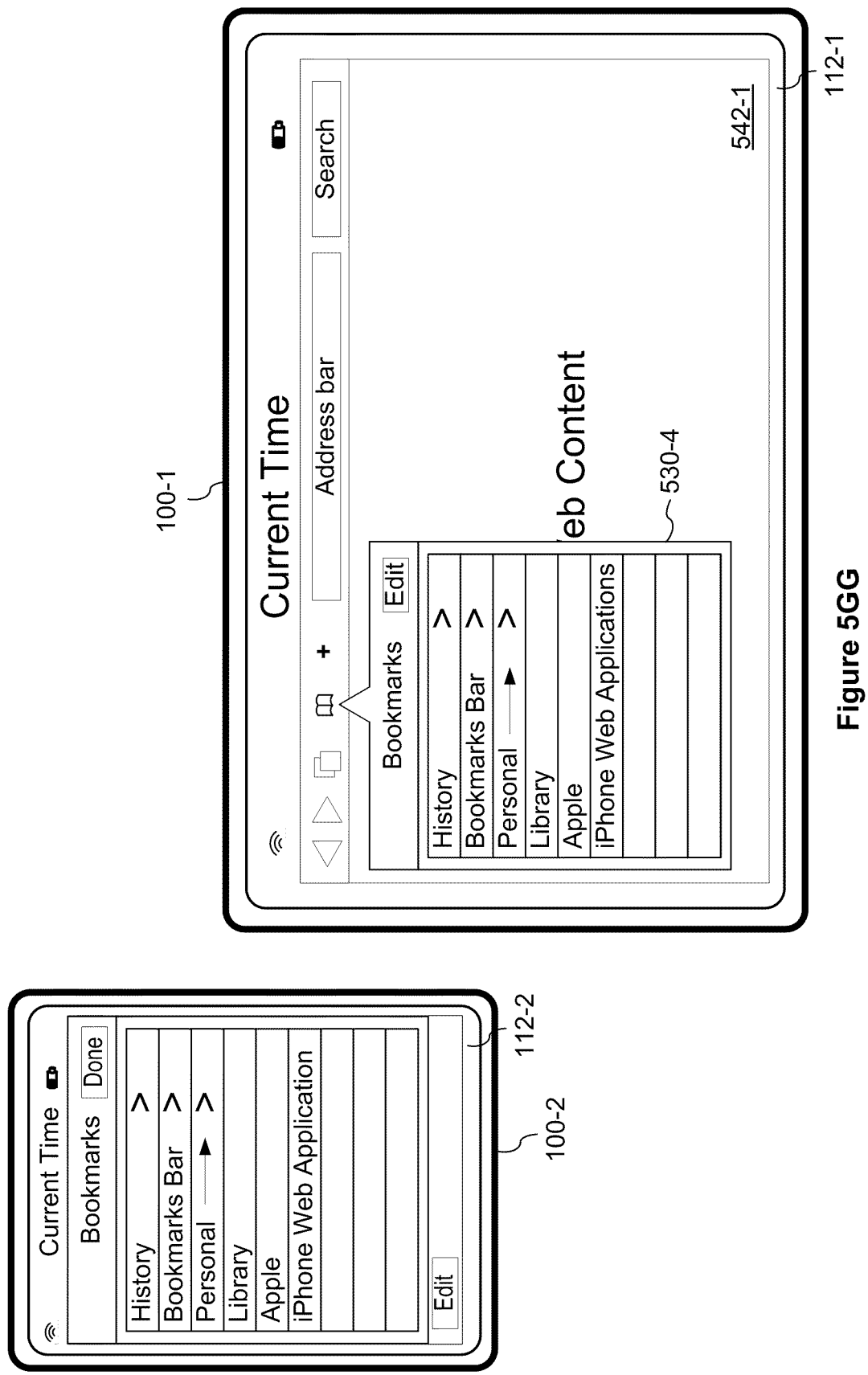
Figure 5H:
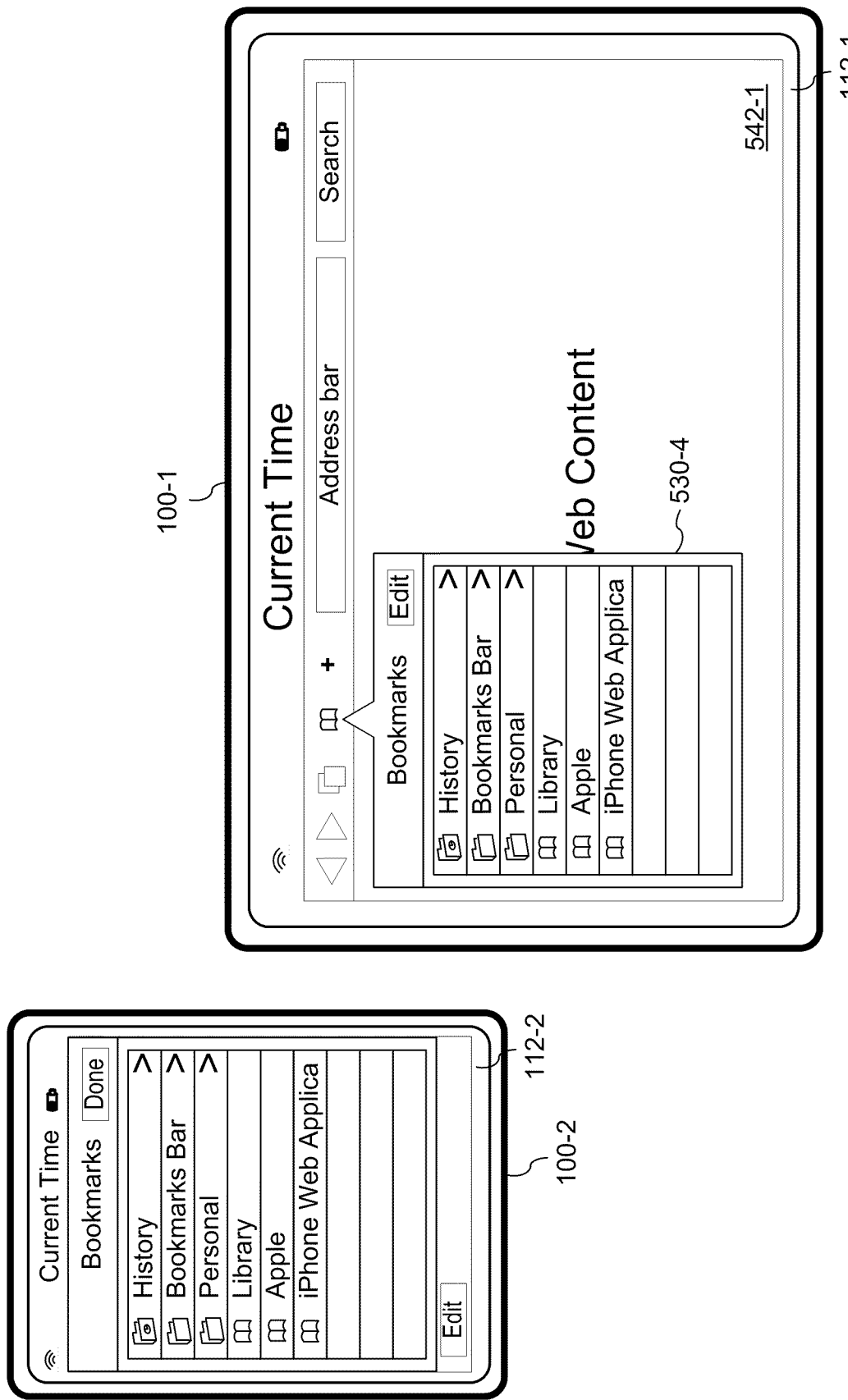
Figure 5I:
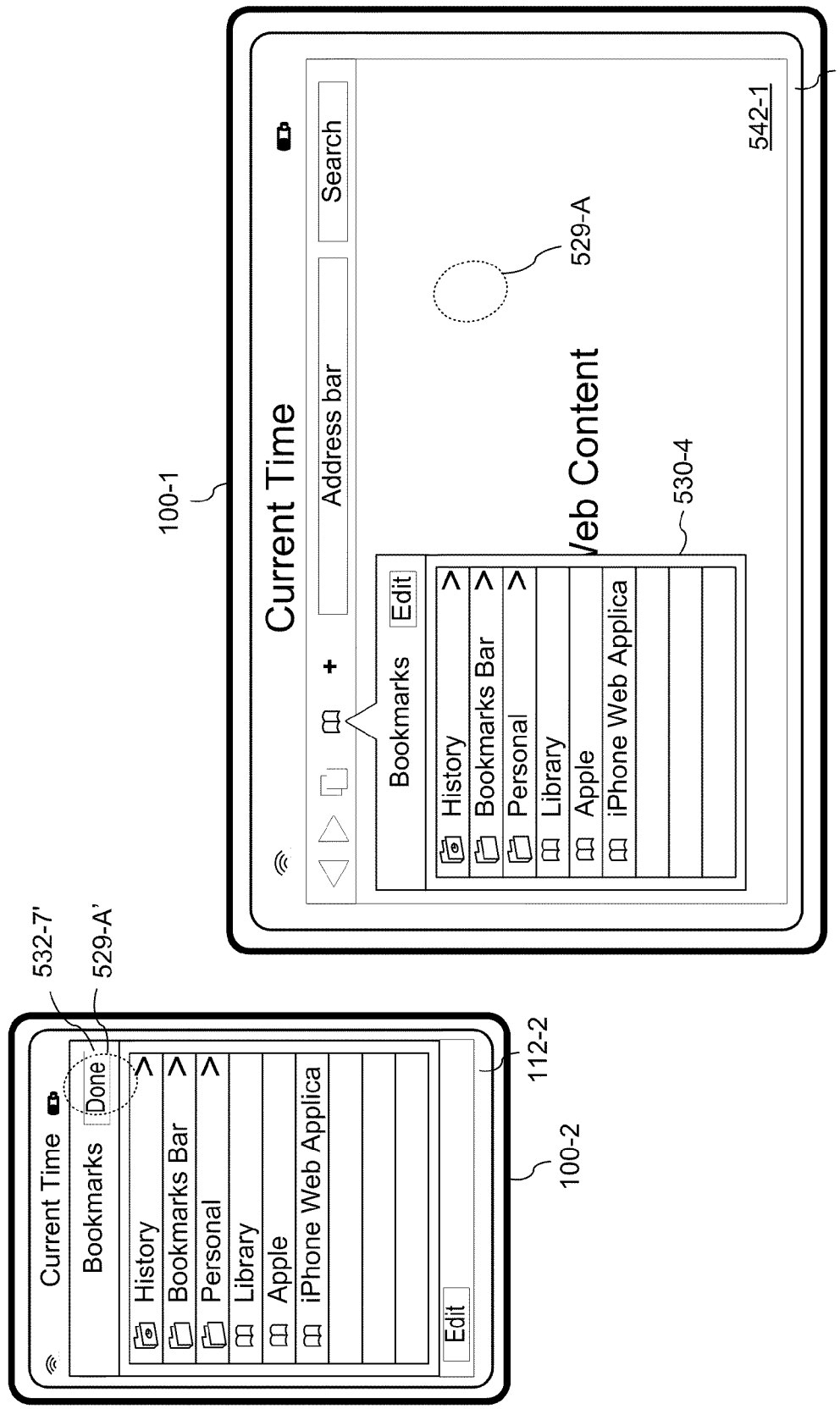
Figure 5J:
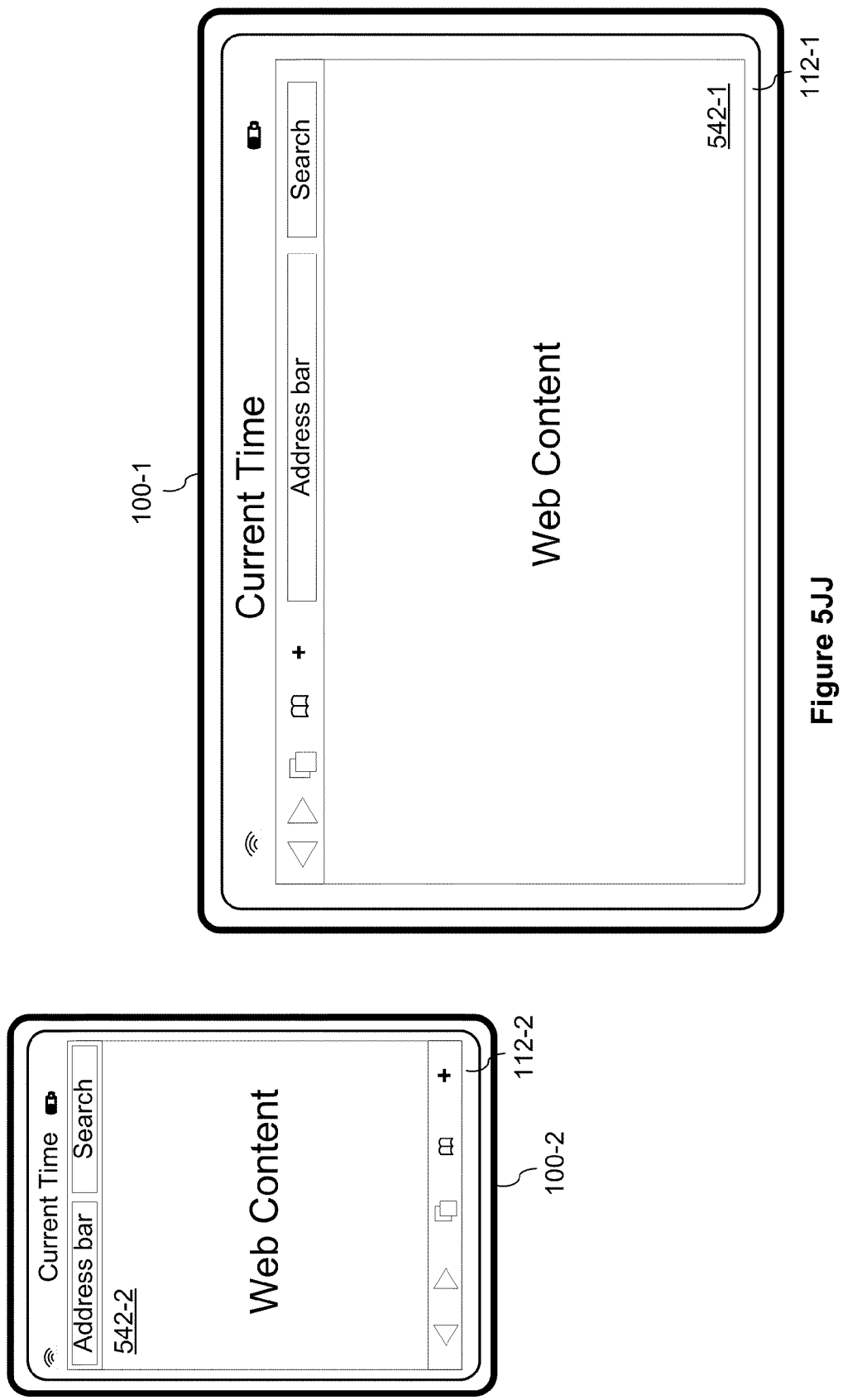
Figure 5K:
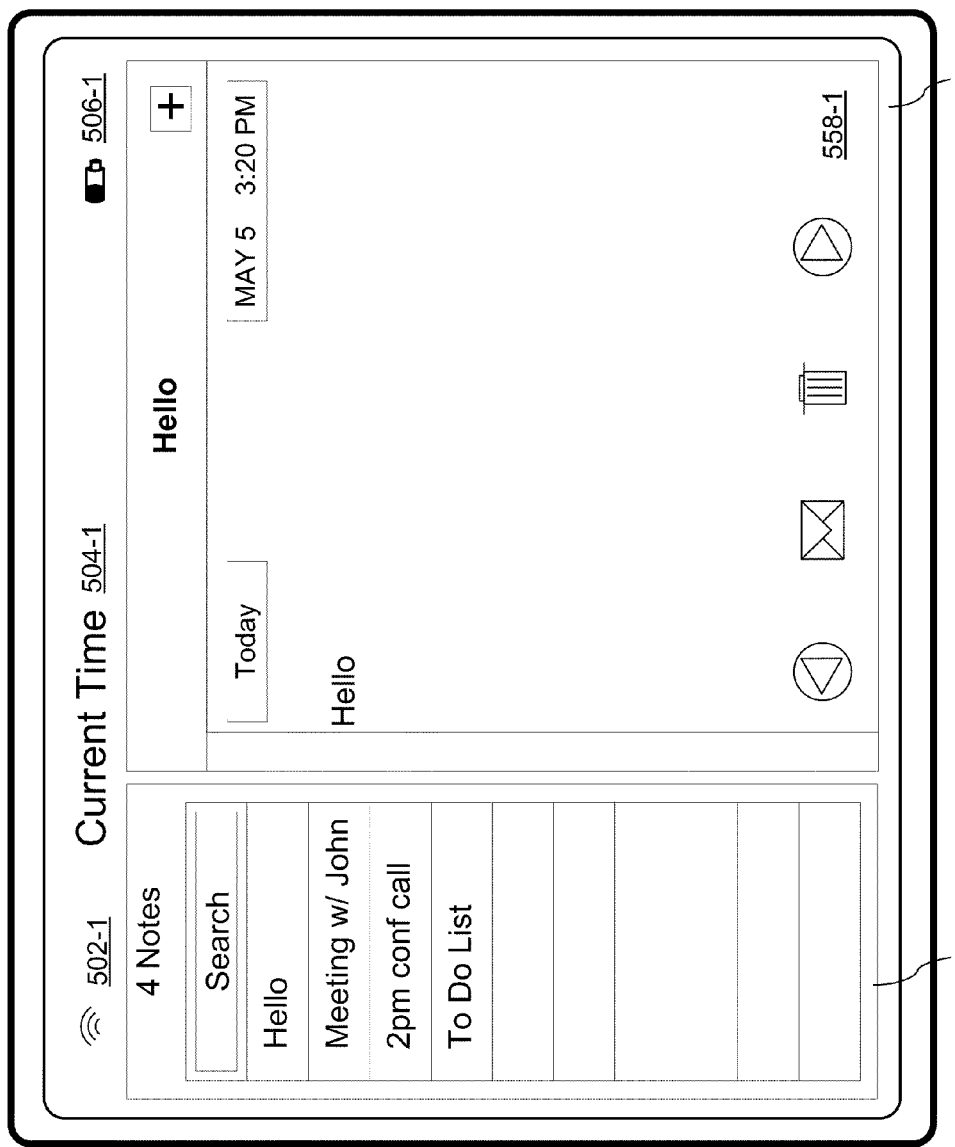
Figure 5K:
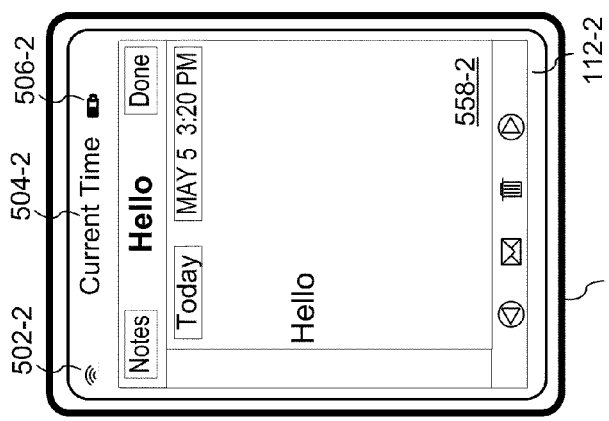
Figure 5L:
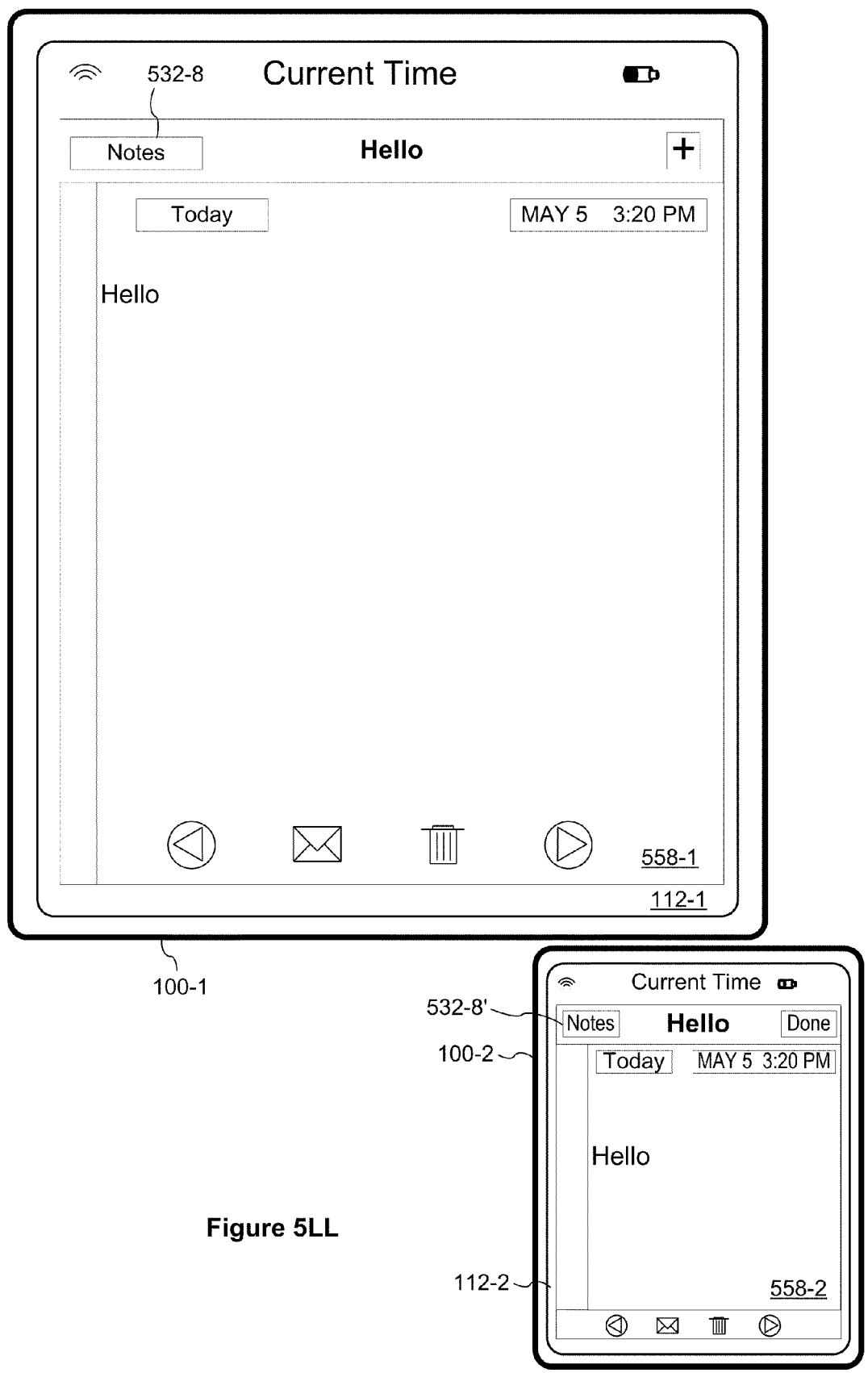
Figure 5M:
Figure 5M:
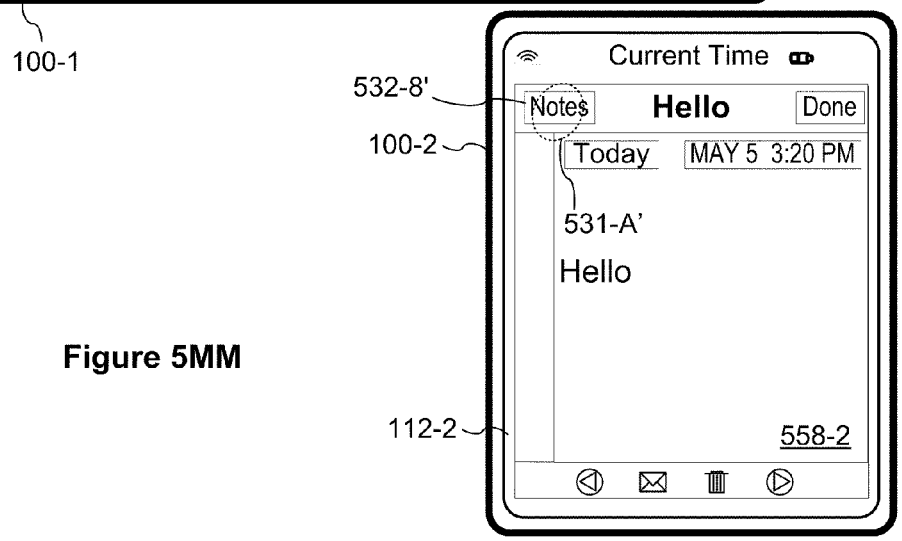
Figure 5N:
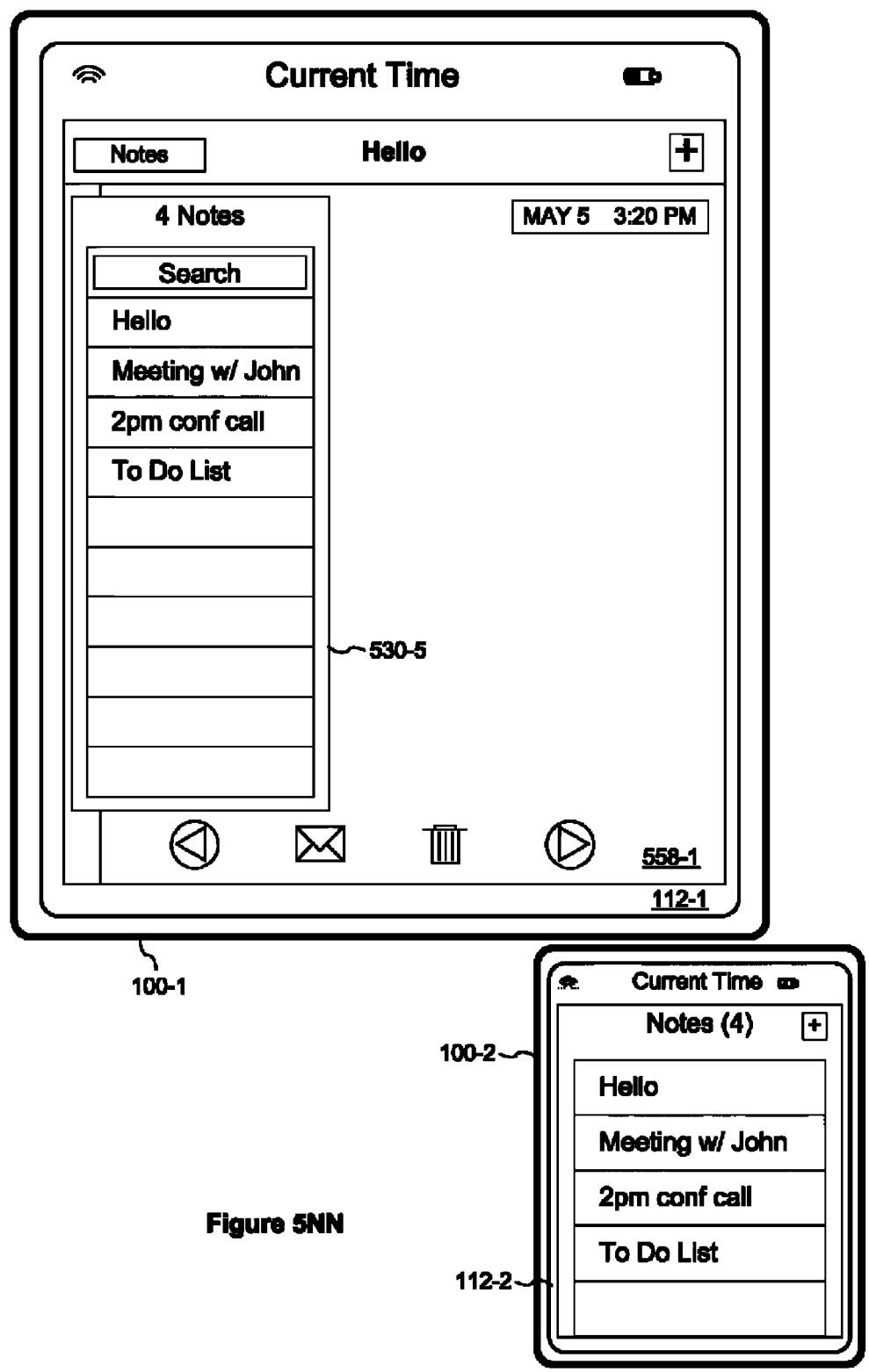
Figure 5O:
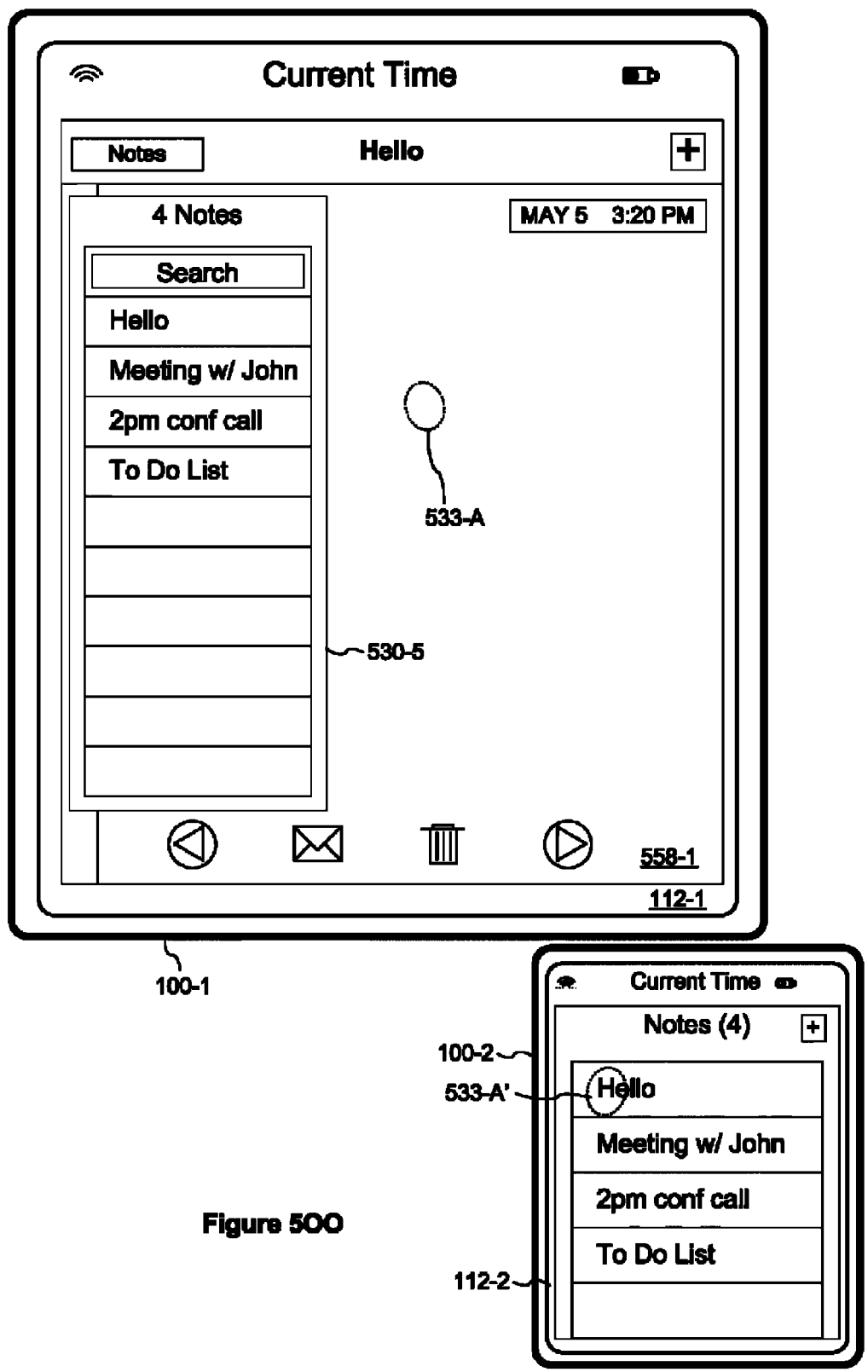
Figure 5P:
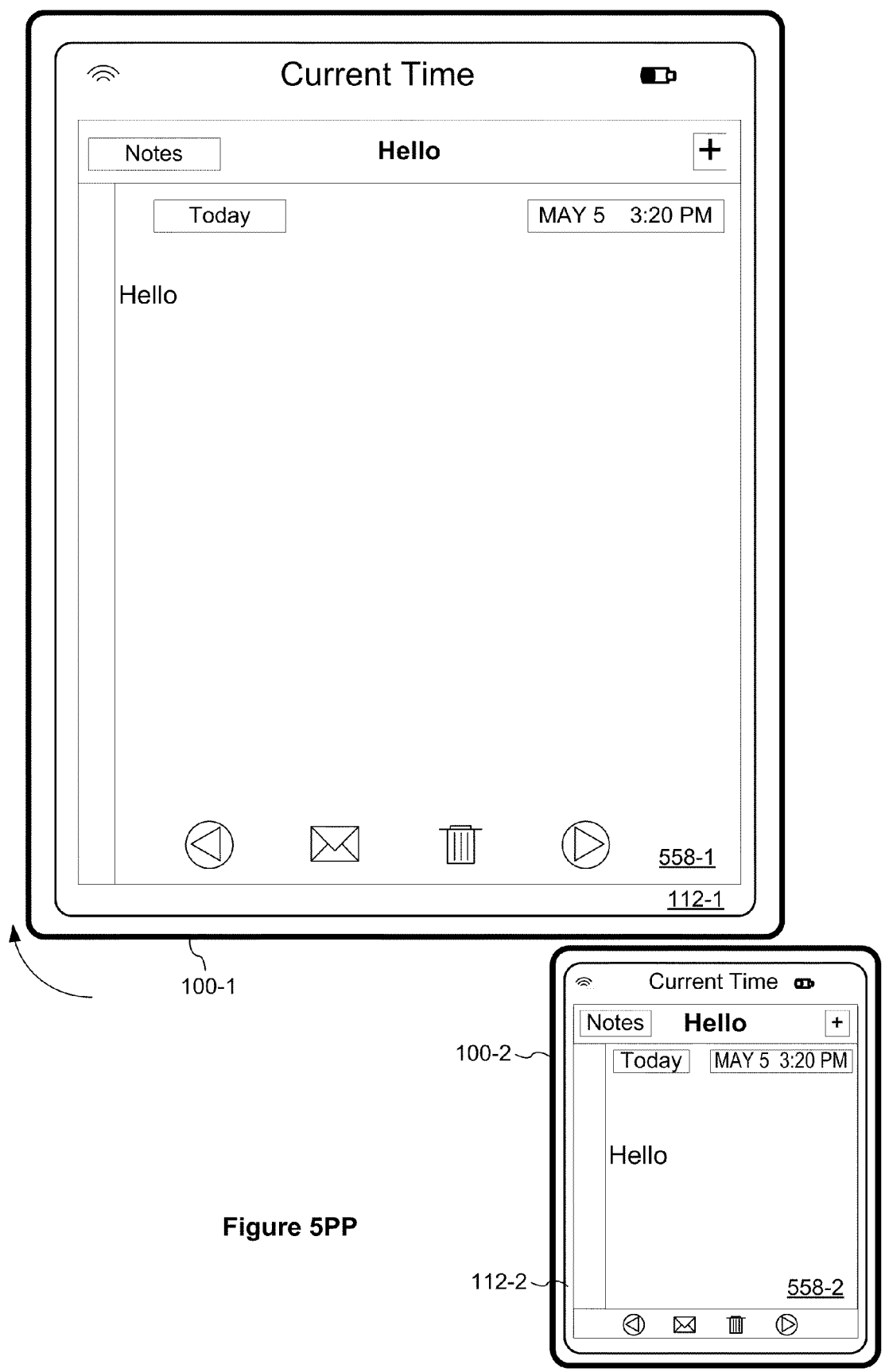
Figure 5Q:
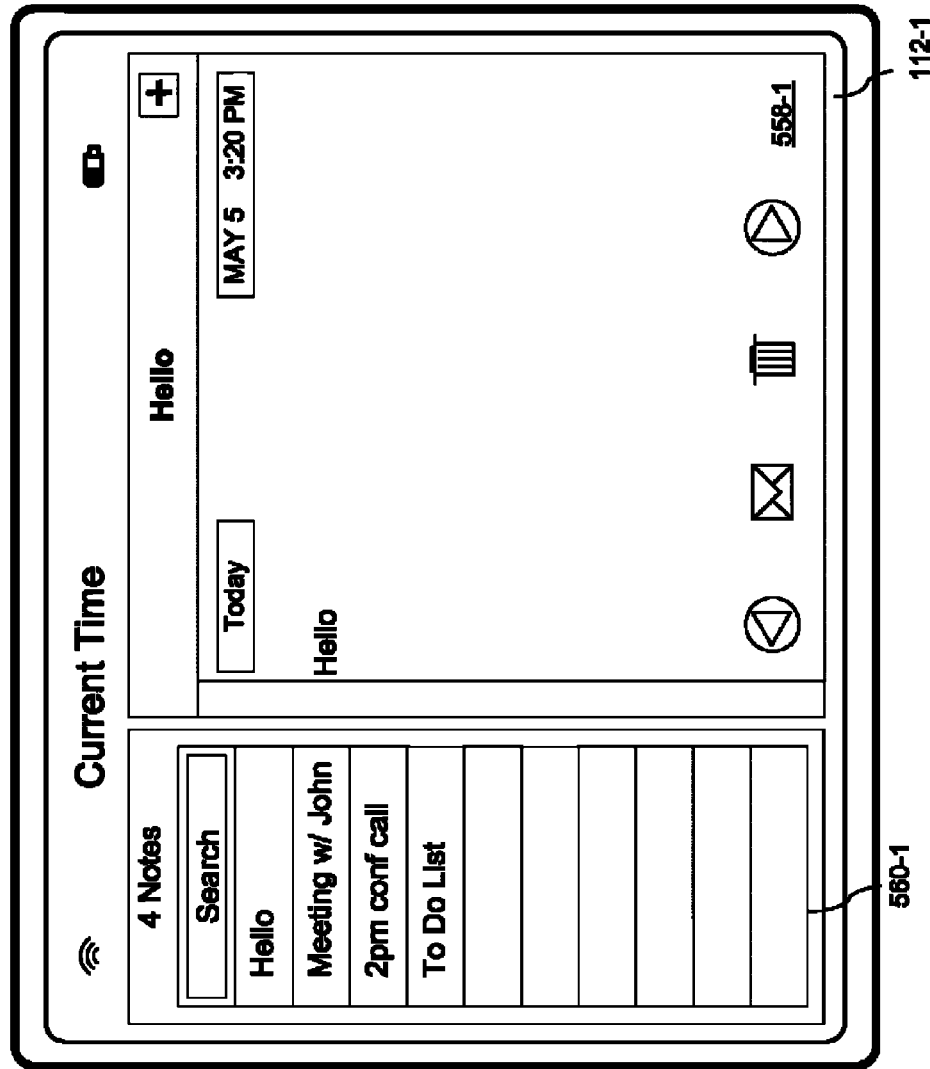
Figure 5Q:
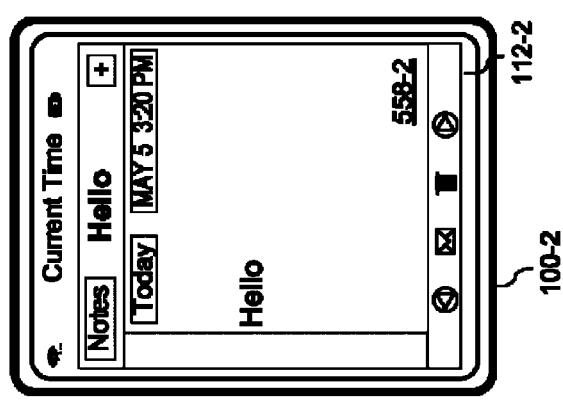
Figure 5R:
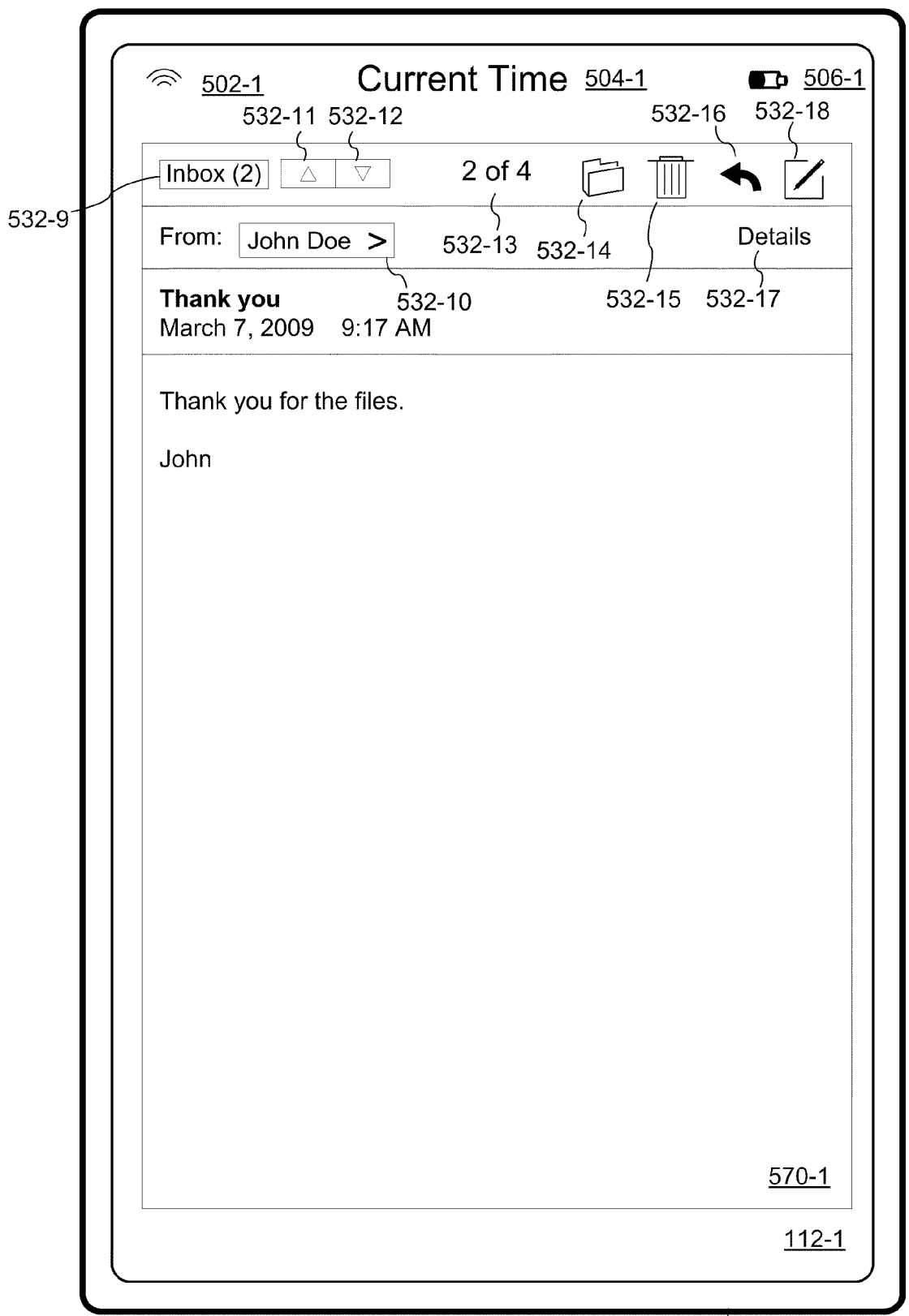
Figure 5S:
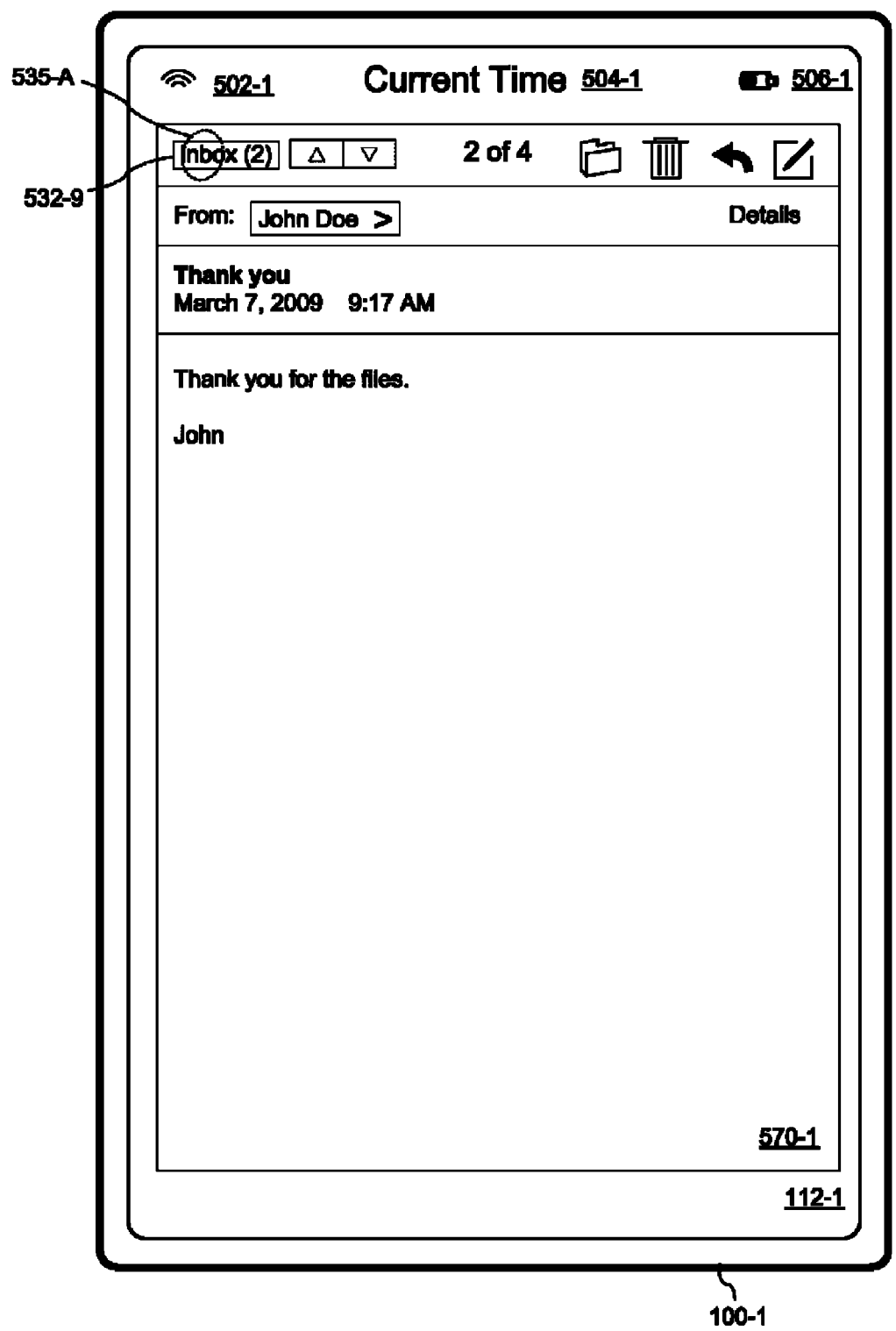
Figure 5T:
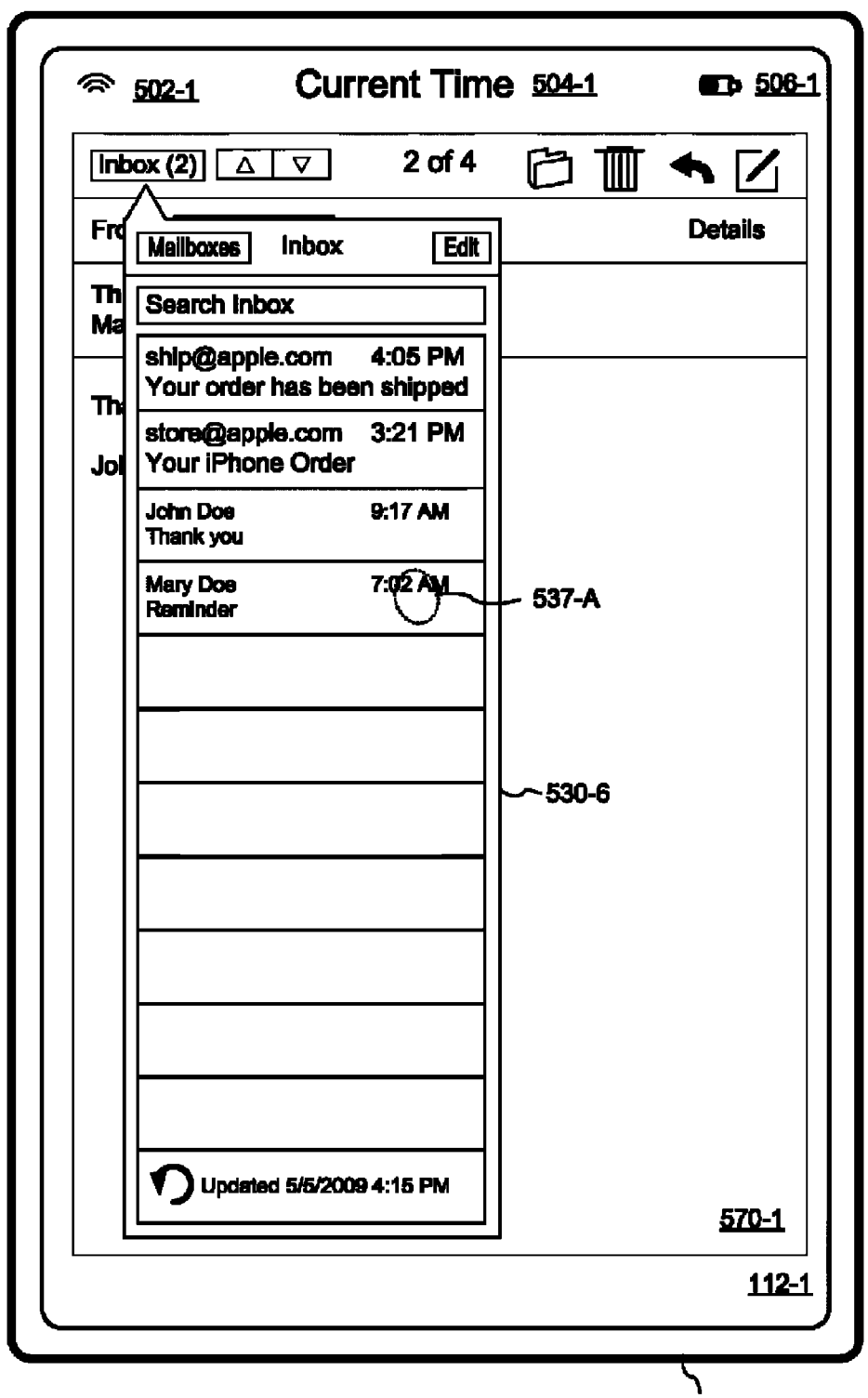
Figure 5U:
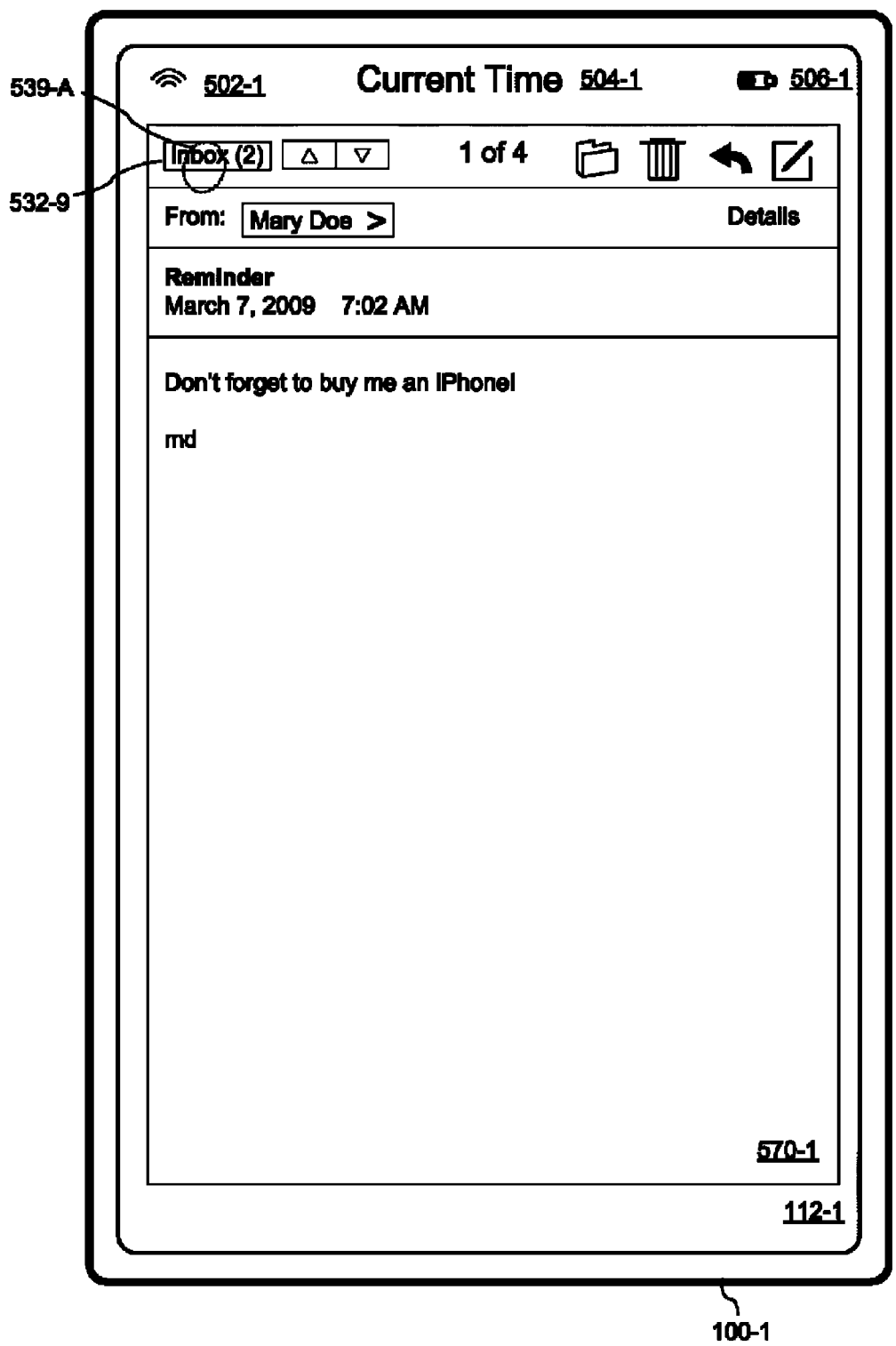
Figure 5V:
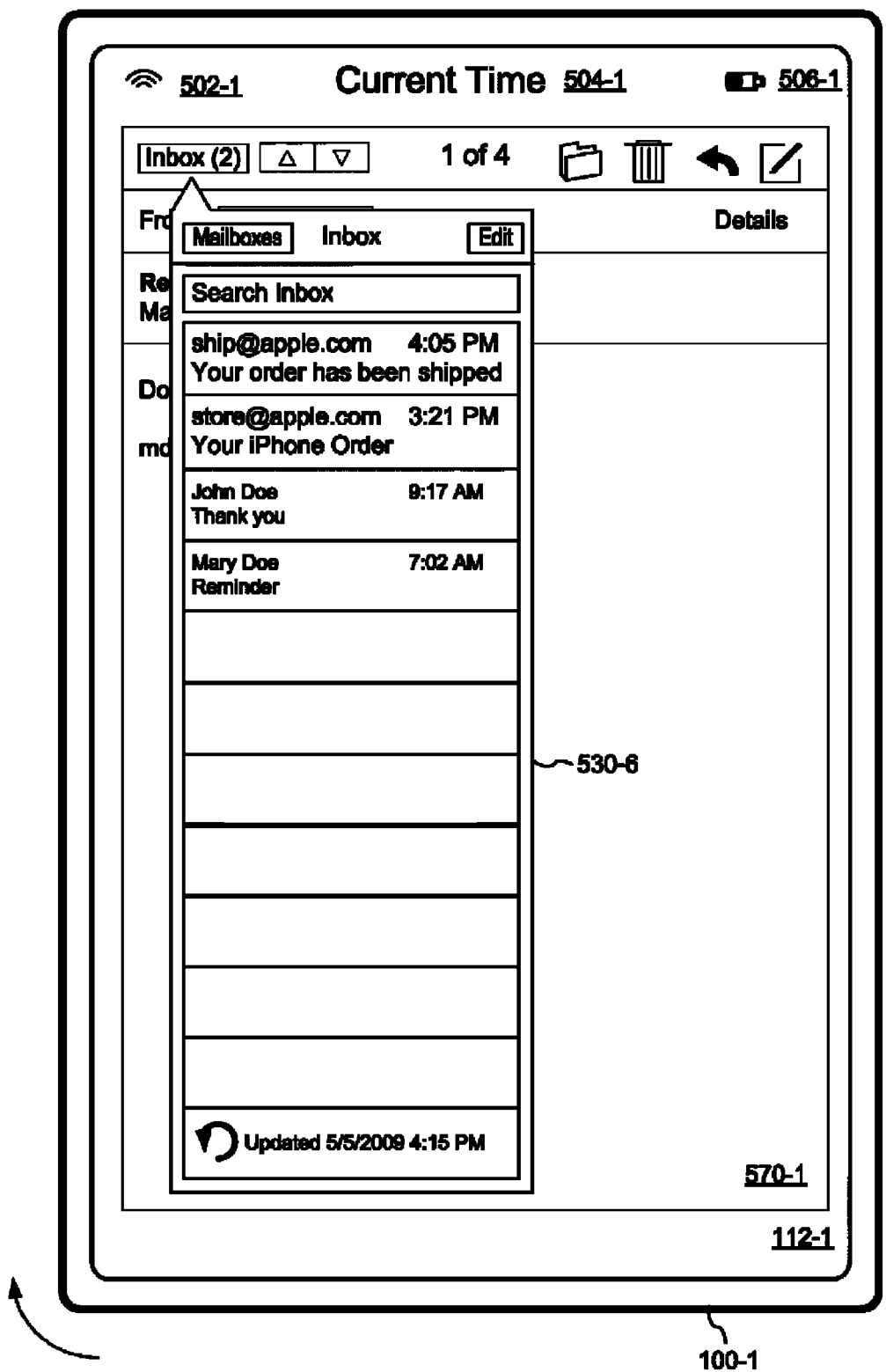
Figure 5W:
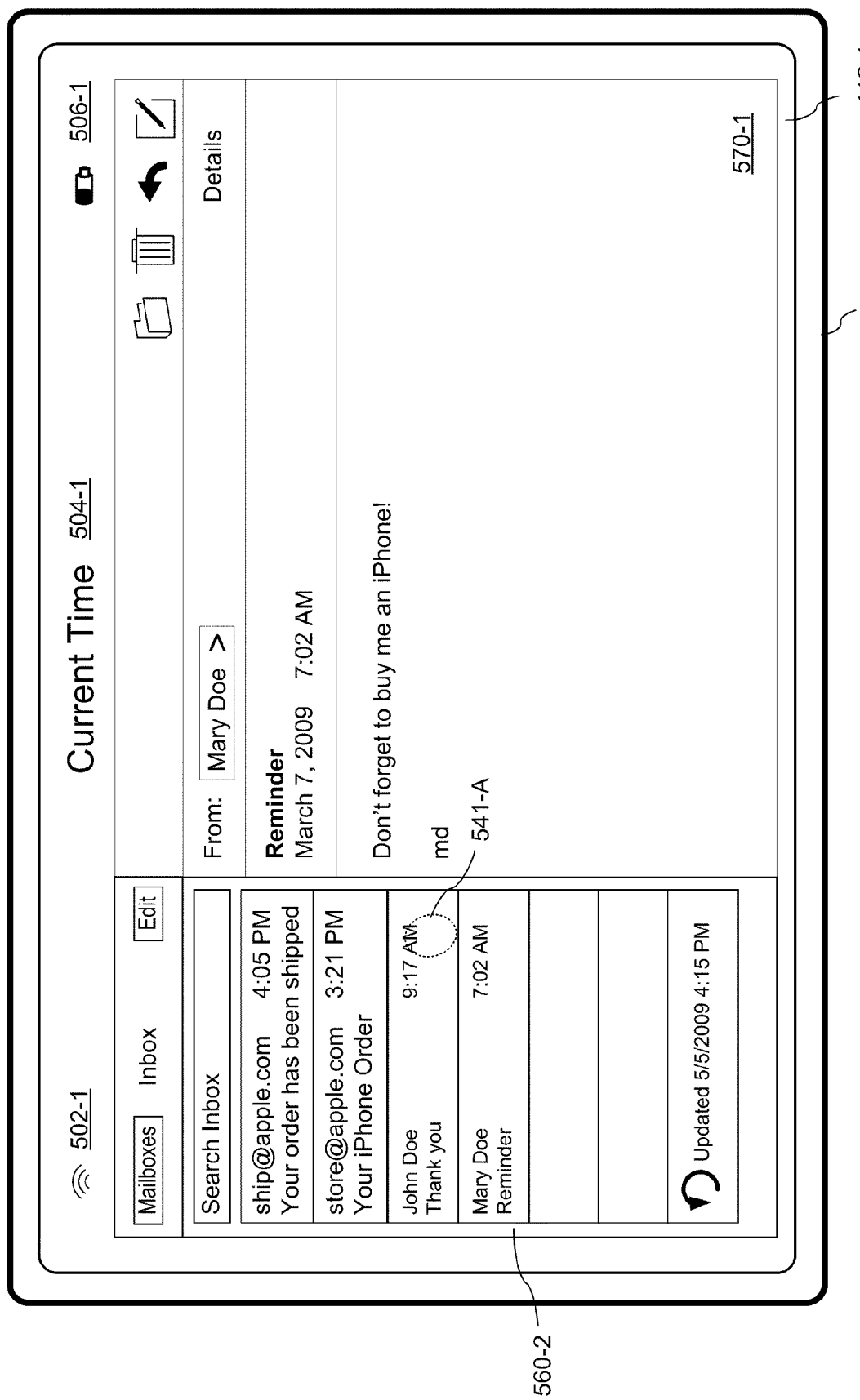
Figure 5X:
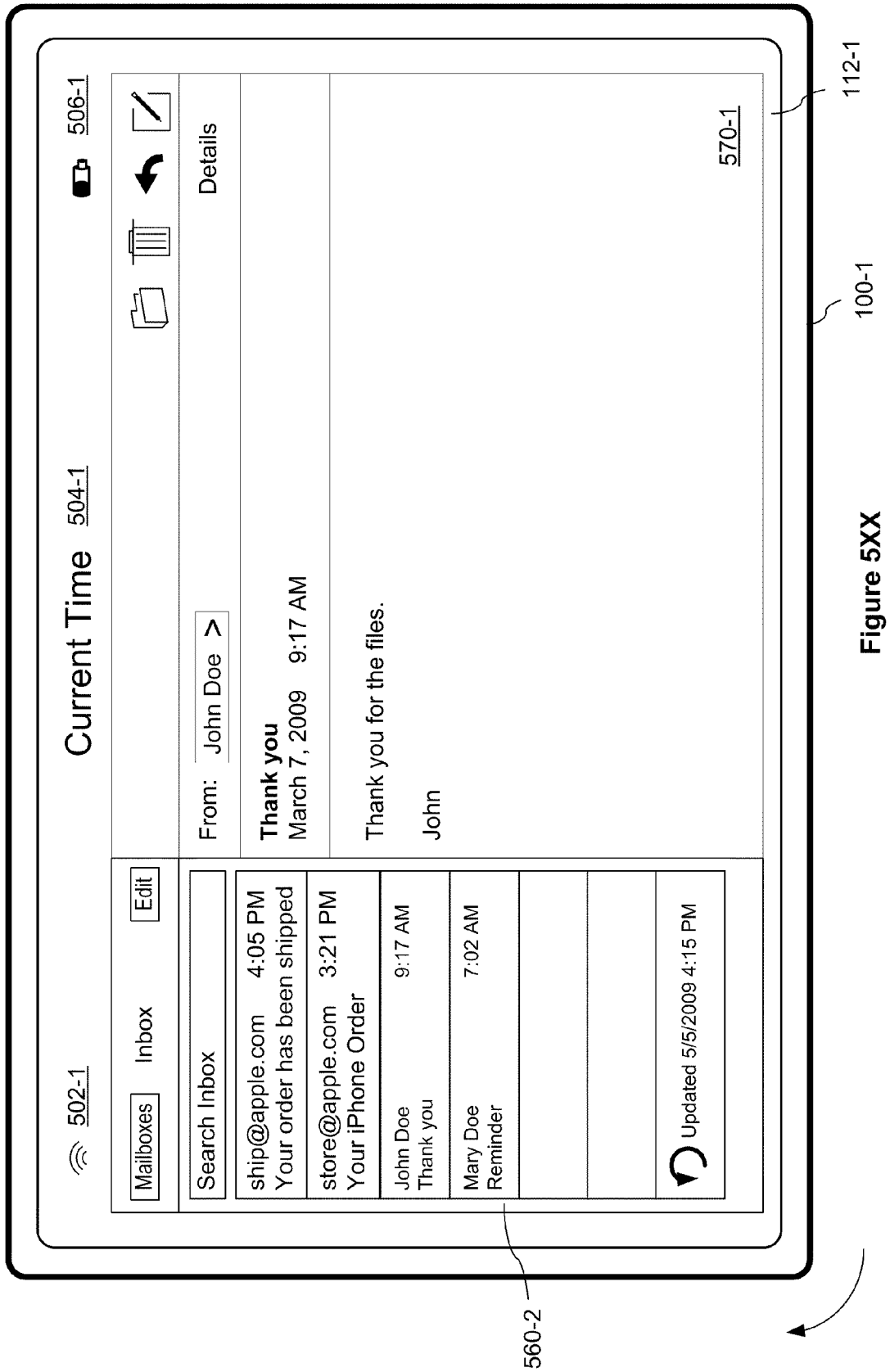
Figure 5Y:
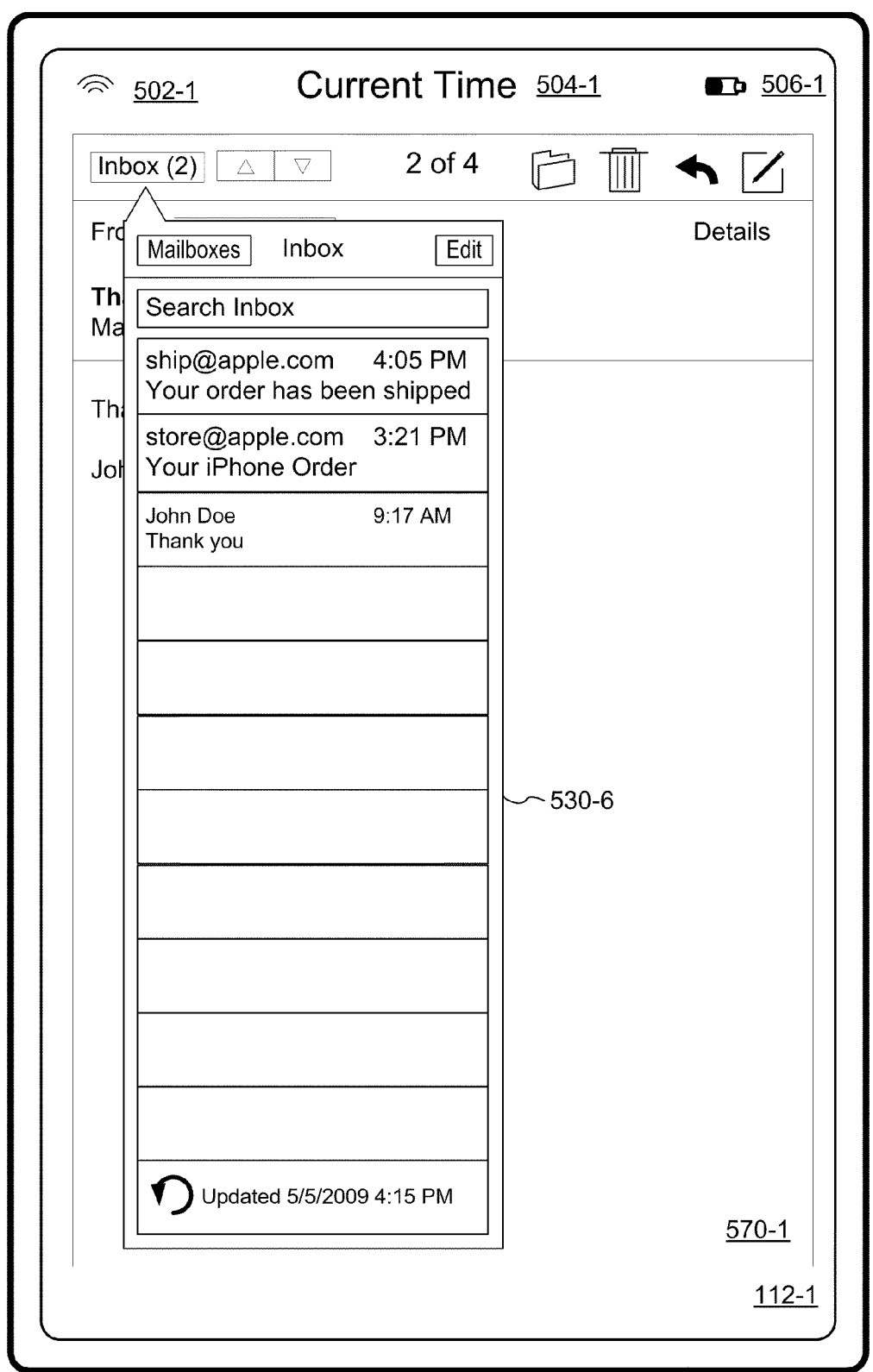
Figure 5Z:
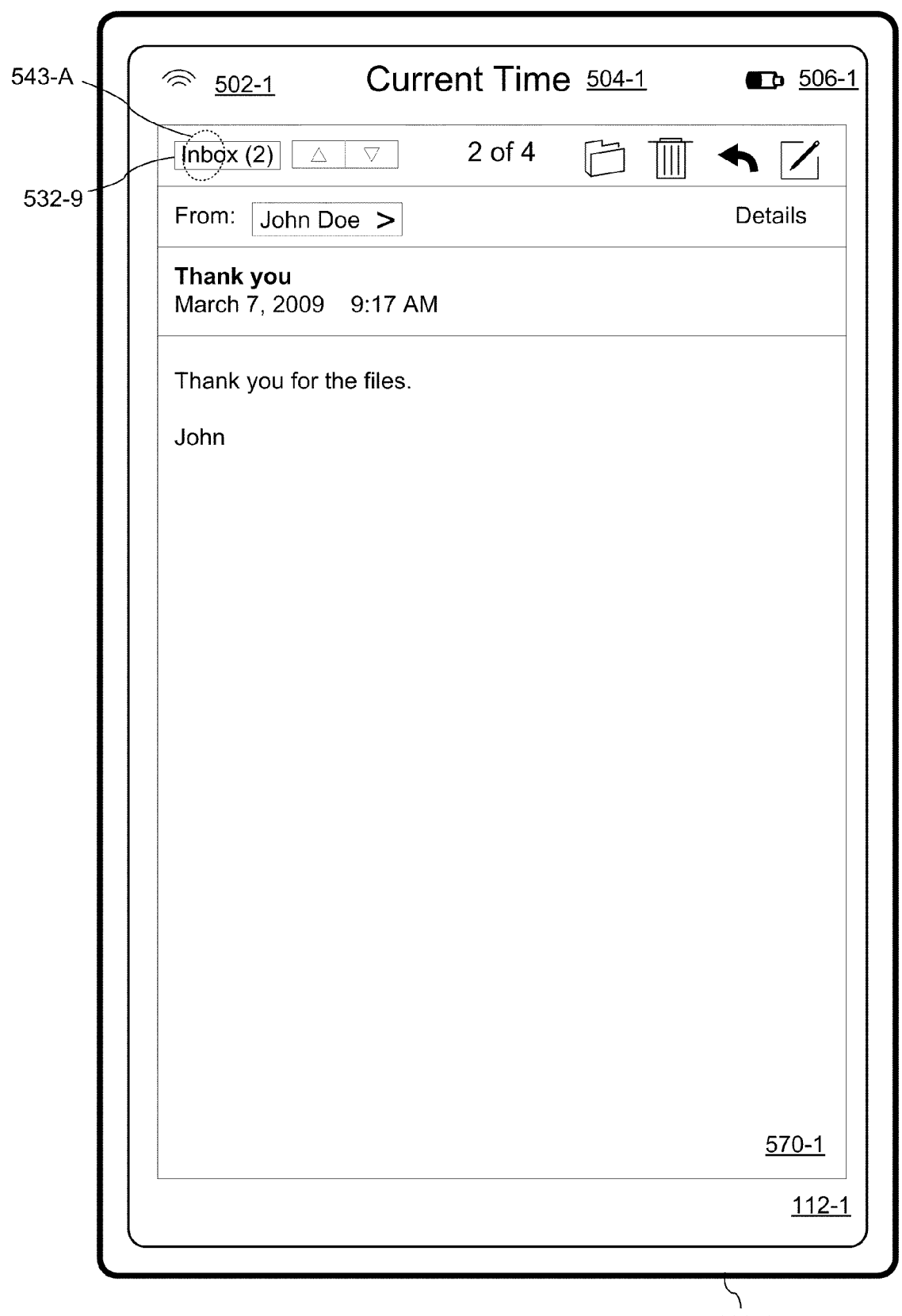

In FIG. 5X, contact 521-A or other touch gesture is detected at a location on touch screen 112-1 outside popup view 530-3. In comparison, contact 521-A' or other touch gesture is detected at a location on touch screen 112-2 corresponding to cancel icon 538-7' on second multifunction device 100-2.

FIG. 5Y illustrates that, in response to contact 521-A or other touch gesture at a location on touch screen 112-1 outside popup view 530-3, first multifunction device 100-1 ceases to display popup view 530-3. Similarly, add-menu view 536-2 ceases to be displayed on second multifunction device 100-2 in response to contact 521-A' or other touch gesture at a location on touch screen 112-2 corresponding to cancel icon 538-7'.

FIG. 5Y also illustrates detection of contact 523-A or other touch gesture at a location on touch screen 112-1 corresponding to bookmark icon 550-1. Similarly, contact 523-A' or other touch gesture is detected at a location on touch screen 112-2 corresponding to bookmark icon 550-2.

In FIG. 5Z, a bookmarks popup view 530-4 is displayed on first multifunction device 100-1. Popup view 530-4 displays bookmarks, which in this example include folders 554-1, 554-2, and 554-3, and/or web pages 556-1, 556-2, and 556-3. Similarly, second multifunction device 100-2 displays corresponding bookmarks including folders 554-1', 554-2', and 554-3', and/or web page bookmarks 556-1', 556-2', and 556-3'. In addition, second multifunction device 100-2 displays done icon 532-7' that when activated (e.g., by a finger tap or other touch gesture on the done icon 532-7') causes second multifunction device 100-2 to cease displaying the bookmarks.

In FIG. 5AA, contact 525-A or other touch gesture is detected at a location on touch screen 112-1 corresponding to one of the folders. Similarly, contact 525-A' is detected at a location on touch screen 112-2 corresponding to one of the folders displayed on second multifunction device 100-2.

FIGS. 5BB-5DD illustrate an animation of displaying folder contents. FIG. 5DD illustrates the completion of the animation. Popup view 530-4 may include "to-bookmarks" icon 532-6 that, when activated, initiates the display of bookmarks at the top level (e.g., see FIG. 5Z). Similarly, the corresponding full-screen-width view on second multifunction device 100-2 may include a "to-bookmarks" icon 532-6'.

In FIG. 5EE, contact 527-A or other touch gesture is detected at a location corresponding to "to-bookmarks" icon 532-6 on first multifunction device 100-1, which initiates the display of bookmarks at the top level (e.g., see FIG. 5Z). Similarly, contact 527-A' or other touch gesture is detected at a location on touch screen 112-2 corresponding to "to-bookmarks" icon 532-6' on second multifunction device 100-2.

FIGS. 5FF-5HH illustrate an animation of ceasing to display folder contents and instead displaying bookmarks at the top level. FIG. 5HH illustrates the completion of the animation.

In FIG. 5II, contact 529-A or other touch gesture is detected at a location outside popup view 530-4 on first multifunction device 100-1. In this example, contact 529-A or other touch gesture is detected at a location corresponding to the remaining portion of web content 542-1. In comparison, contact 529-A' or other touch gesture is detected at a location on touch screen 112-2 corresponding to done icon 532-7' on second multifunction device 100-2.

FIG. 5JJ illustrates that the bookmarks popup view 530-4 ceases to be displayed in response to the contact 529-A or other touch gesture at the location outside popup view 530-4. FIG. 5JJ also illustrates that bookmarks cease to be displayed by second multifunction device 100-2 in response to contact 529-A' or other touch gesture at a location on touch screen 112-2 corresponding to done icon 532-7'.

FIGS. 5KK-5QQ illustrate exemplary user interfaces with interactive popup views in a notes application on touch screen 112-1. For comparison, user interfaces for corresponding full-screen-width views in a corresponding notes application on touch screen 112-2 of second multifunction device 100-2 are also depicted.

In FIGS. 5KK-5QQ, popup views 530 have a lateral resolution corresponding to the lateral resolution of touch screen 112-2 of second multifunction device 100-2, as described above.

FIG. 5KK depicts an exemplary user interface displaying note 558-1 and sidebar 560-1 in the note application on first multifunction device 100-1 in a landscape orientation. The note 558-1 may include the following elements, or a subset or superset thereof:

a back icon that when activated (e.g., by a finger tap or other touch gesture on the icon) initiates the display of a previous note in the note application;

a forward icon that when activated (e.g., by a finger tap or other touch gesture on the icon) initiates the display of a next note in the note application;

an e-mail icon that when activated (e.g., by a finger tap or other touch gesture on the icon) initiates e-mailing of the displayed note;

a delete icon that when activated (e.g., by a finger tap or other touch gesture on the icon) initiates deletion of the displayed note;

a date icon that displays the date when the note was created or last modified;

a time stamp that displays the time when the note was created or last modified; and a new-note icon that when activated (e.g., by a finger tap or other touch gesture on the icon) initiates the drafting of a new note.

As used herein, a sidebar is an auxiliary view that is displayed alongside a main view in the user interface of an application. A sidebar is typically displayed alongside either a left edge or a right edge of a main view. A sidebar may include information, input fields, controls, icons and other selectable objects that are configured to interact with the main view in an application.

For example, sidebar 560-1 is a view displayed alongside a note view (e.g., with note 558-1) in the notes application. Sidebar 560-1 may include the following elements, or a subset or superset thereof:

the number of notes stored in the note application (e.g., "4 notes");

a search input area that when activated (e.g., by a finger tap or other touch gesture on the area) initiates receiving search terms to be used in a search; and a list of notes that includes the titles of notes stored in the note application.

In addition, touch screen 112-1 includes signal intensity indicator 502-1, current time indicator 504-1, and battery power indicator 506-1 as described above.

FIG. 5KK also depicts an exemplary user interface displaying corresponding note 558-2 in a corresponding note application on second multifunction device 100-2. The notes application on second multifunction device 100-2 may include the elements described above, or a subset or superset thereof. The user interface on second multifunction device 100-2 may also include the following elements, or a subset or superset thereof: 502-2, 504-2, and 506-2, which are analogous to elements 502-1, 504-1, and 506-1, described above.

FIGS. 5KK and 5LL illustrates changes that occur in the user interface displayed on touch screen 112-1 when first multifunction device 100-1 is rotated counterclockwise from the landscape orientation (shown in FIG. 5I(K) to a portrait orientation (shown in FIG. 5LL). Note 558-1 shown in FIG. 5LL includes the elements described above, or a subset or superset thereof. Sidebar 560-1 ceases to be displayed on first multifunction device 100-1 after the device has been rotated to the portrait orientation. FIG. 5LL also illustrates the corresponding exemplary user interface on second multifunction device 100-2.

In FIG. 5MM, contact 531-A or other touch gesture is detected at a location on touch screen 112-1 corresponding to notes icon 532-8 on first multifunction device 100-1. Similarly, contact 531-A' or other touch gesture is detected at a location on touch screen 112-2 corresponding to notes icon 532-8' on second multifunction device 100-2.

FIG. 5NN illustrates popup view 530-5 displayed on first multifunction device 100-1 in response to contact 531-A or other touch gesture at the location on touch screen 112-1 corresponding to notes icon 532-8. Popup view 530-5 includes elements described above with reference to the side bar 560-1.

In FIG. 5NN, popup view 530-5 partially covers note 558-1 in the note application on first multifunction device 100-1. In comparison, second multifunction device 100-2 displays the list of notes, and the list of notes covers note 558-2 completely. Also, it should be noted that in this example popup view 530-5 is taller than the height (or the vertical resolution) of the corresponding full-screen-width view on second multifunction device 100-2. In addition, popup view 530-5 is configured to list more notes than the corresponding full-screen-width view on second multifunction device 100-2. In this example, popup view 530-5 is configured to list ten notes (i.e., if ten or more notes are stored in the device, ten are listed within popup view 530-5), while the corresponding full-screen-width view on second multifunction device 100-2 is configured to list five notes (i.e., if more than five notes are stored in second multifunction device 100-2, only five are listed on display 112-2 of second multifunction device 100-2).

FIG. 5OO illustrates detection of contact 533-A or other touch gesture at a location on touch screen 112-1 outside popup view 530-5. Similarly, contact 533-A' is detected at a location on touch screen 112-2 corresponding to one of the listed notes, thereby selecting the respective note. In this example, contact 533-A' or other touch gesture is detected at a location corresponding to a note titled "Hello", thereby selecting the note titled "Hello."

In FIG. 5PP, in response to the contact 533-A or other touch gesture described above with reference to FIG. 5OO, popup view 530-5 ceases to be displayed on first multifunction device 100-1, while the corresponding full-screen-width view on second multifunction device 100-2 displays the selected note. FIGS. 5PP and 5QQ also illustrate that when first multifunction device 100-1 is rotated clockwise from the portrait orientation to a landscape orientation, the user interface of first multifunction device 100-1 displays sidebar 560-1 on touch screen 112-1 in addition to displaying the previously selected note (if any). In comparison, second multifunction device 100-2 does not display the list of notes.

FIGS. 5RR-5KKK illustrate exemplary user interfaces with interactive popup views in an e-mail application on touch screen 112-1. Touch screen 112-2 of second multifunction device 100-2 is not depicted for brevity. However, in FIGS. 5RR-5KKK, popup views 530 have a lateral resolution corresponding to the lateral resolution of touch screen 112-2 of second multifunction device 100-2, as described above.

FIG. 5RR depicts exemplary user interface 570-1 displaying an e-mail message in the e-mail application on first multifunction device 100-1 in a portrait orientation. The e-mail application's user interface 570-1 may include the following elements, or a subset or superset thereof:

current folder icon 532-9 that when activated (e.g., by a finger tap or other touch gesture on the icon) initiates the display of e-mail messages stored in the current folder; in this example, the current folder for the displayed e-mail message is an inbox (i.e., the displayed e-mail message is stored in the inbox folder);

sender icon 532-10 that when activated (e.g., by a finger tap or other touch gesture on the icon) initiates the display of detailed information about the sender;

previous e-mail icon 532-11 that when activated (e.g., by a finger tap or other touch gesture on the icon) initiates the display of a previous e-mail message stored in the e-mail application;

next e-mail icon 532-12 that when activated (e.g., by a finger tap or other touch gesture on the icon) initiates the display of a next e-mail message stored in the e-mail application;

number of e-mail indicator 532-13 that indicates the number of e-mail messages stored in the e-mail application and the position of the displayed e-mail message; in this example, the e-mail application has four e-mail messages and the displayed e-mail is the second e-mail message out of the four e-mail messages; in some embodiments, the number of e-mail indicator 532-13 may indicate the number of e-mail messages stored in the current folder instead of the number of all e-mail messages stored in the e-mail application;

folder icon 532-14 that when activated (e.g., by a finger tap or other touch gesture on the icon) initiates the display of e-mail folders into which the displayed e-mail message can be moved;

delete icon 532-15 that when activated (e.g., by a finger tap or other touch gesture on the icon) initiates the deletion of the displayed e-mail message;

action icon 532-16 that when activated (e.g., by a finger tap or other touch gesture on the icon) initiates the display of actions that can be performed with the displayed e-mail message;

new e-mail icon 532-18 that when activated (e.g., by a finger tap or other touch gesture on the icon) initiates composition of a new e-mail message; and details icon 532-17 that when activated (e.g., by a finger tap or other touch gesture on the icon) initiates the display of detailed information associated with the displayed e-mail message (e.g., recipient(s), actions taken with the displayed e-mail message, attachments, etc.).

In addition, touch screen 112-1 includes signal intensity indicator 502-1, current time indicator 504-1, and battery power indicator 506-1 as described above.

In FIG. 5SS, contact 535-A or other touch gesture is detected at a location on touch screen 112-1 that corresponds to current folder icon 532-9. In response to this contact or other touch gesture, device 100-1 displays folder popup view 530-6, illustrated in FIG. 5TT. Folder popup view 530-6 may include the following elements, or a subset or superset thereof:

a list of e-mail messages stored in the current folder; the list includes respective icons for e-mail messages that when activated (e.g., by a finger tap or other touch gesture on the icon) initiate the display of a corresponding e-mail message in the e-mail application user interface 570-1; in this example, the current folder is Inbox;

a search input area that when activated initiates receiving search terms for a search in e-mails;

a refresh icon that displays the last date and time of updating folder popup view 530-6; the refresh icon when activated (e.g., by a finger tap or other touch gesture on the icon) initiates updating folder popup view 530-6;

a mailboxes icon that when activated (e.g., by a finger tap or other touch gesture on the icon) initiates the display of a list of mailboxes (e.g., the mailboxes or folders in the user's e-mail account); and an edit icon that when activated (e.g., by a finger tap or other touch gesture on the icon) initiates editing of the list of e-mail messages (e.g., where editing the list allows deletion of messages in the list of e-mail messages).

FIG. 5TT also illustrates detection of contact 537-A or other touch gesture at a location on touch screen 112-1 corresponding to one of the listed e-mail messages, thereby selecting the respective e-mail message. In response to contact 537-A or other touch gesture shown in FIG. 5TT, the selected e-mail message is displayed in e-mail application user interface 570-1, as shown in FIG. 5UU. FIG. 5UU also illustrates detection of contact 539-A or other touch gesture at a location on touch screen 112-1 corresponding to current folder icon 532-9.

FIG. 5VV illustrates the display of folder popup view 530-6 as described above. FIGS. 5VV and 5WW also illustrate that first multifunction device 100-1 can be rotated clockwise from the portrait orientation (FIG. 5VV) to the landscape orientation (FIG. 5WW). In the landscape orientation, popup view 530-6 is converted to sidebar 560-2.

In FIG. 5WW, contact 541-A is detected at a location on the touch screen corresponding to one of the listed e-mail messages, thereby selecting the respective e-mail message. FIG. 5XX illustrates the selected e-mail message is displayed in e-mail application user interface 570-1. FIGS. 5XX, 5YY and 5ZZ-5AAA also illustrate changes in the user interface when first multifunction device 100-1 is be rotated clockwise from the landscape orientation (FIG. 5XX) to the portrait orientation (FIG. 5YY). More particularly, FIGS. 5YY and 5ZZ-5AAA illustrate two embodiments of first multifunction device 100-1 in responding to a rotation to the portrait orientation. In one embodiment, as depicted in FIG. 5YY, the sidebar (shown in FIG. 5XX) is converted into popup view 530-6. In comparison, the sidebar ceases to be displayed and folder popup view 530-6 is not automatically displayed in another embodiment depicted in FIG. 5ZZ. FIG. 5ZZ also illustrates detection of contact 543-A at current folder icon 532-9. In FIG. 5AAA, popup view 530-6 is displayed in response to contact 543-A or other touch gesture at current folder icon 532-9 (shown in FIG. 5ZZ).

FIG. 5BBB illustrates that folder popup view 530-6 ceases to be displayed in user interface 570-1 of the e-mail application after detection of contact 545-A or other touch gesture at a location on touch screen 112-1 outside folder popup view 530-6, as shown in FIG. 5AAA.

FIG. 5CCC illustrates the display of popup view 530-7 for moving a respective e-mail message (e.g., the currently displayed e-mail message shown in FIG. 5BBB) in response to detection of contact 547-A or other touch gesture at a location on touch screen 112-1 corresponding to folder icon 532-14 (FIG. 5BBB). Popup view 530-7 (FIG. 5CCC) includes a list of mailboxes, for example mailboxes 554-7, 554-8, 554-9, 554-10, 554-11, and 554-12, to which the currently displayed respective e-mail message can be moved. When the user selects a respective mailbox 554 (e.g., by a finger tap or other touch gesture on the icon for the respective mailbox), the respective e-mail message is moved to the user-selected mailbox.

In FIG. 5CCC, in displaying popup view 530-7, the respective view in the e-mail application's user interface 570-1 is also modified in response to contact 547-A. In particular, the displayed e-mail message is decreased in size, and a text bar is displayed, providing instructions to a respective user. The text bar includes a cancel icon 532-19, for canceling the message move operation. In FIG. 5CCC, contact 549-A or other touch gesture is detected at a location on touch screen 112-1 corresponding to cancel icon 532-19, and in response popup view 530-7 and the text bar cease to be displayed, as shown in FIG. 5DDD.

In FIG. 5DDD, contact 551-A of other touch gesture is detected on touch screen 112-1 at a location corresponding to action icon 532-16. In response, the e-mail application user interface 570-1 displays action popup view 530-8, shown in FIG. 5EEE. Action popup view 530-8 includes a list of actions that can be taken with or performed with respect to the displayed e-mail message. In this example, action popup view 530-8 lists Reply (i.e., reply to the message sender), Reply All (i.e., reply to all participants of the message), and Forward (i.e., forward the displayed e-mail message to contacts or e-mail addresses selected by the user) as actions that can be taken with the displayed e-mail message.

In FIG. 5EEE, contact 553-A or other touch gesture is detected at a location on touch screen 112-1 outside popup view 530-8. In response, action popup view 530-8 ceases to be displayed on touch screen 112-1, as shown in FIG. 5FFF.

In FIG. 5FFF, contact 555-A or other touch gesture is detected at a location on touch screen 112-1 corresponding to sender icon 532-10, which identifies the sender of the currently displayed e-mail message. In response, the e-mail application displays popup view 530-9 in user interface 570-1, as shown in FIG. 5GGG. Popup view 530-9 includes information about the sender of the displayed e-mail message.

In FIG. 5GGG, contact 557-A or other touch gesture is detected at a location on touch screen 112-1 outside popup view 530-9. In response, the e-mail application ceases to display popup view 530-9 in user interface 570-1, as shown in FIG. 5HHH.

FIGS. 5HHH and 5III illustrate changes in user interface 570-1 of the e-mail application when first multifunction device 100-1 is rotated counterclockwise from the portrait orientation (FIG. 5HHH) to the landscape orientation (FIG. 5III). In the landscape orientation, first multifunction device 100-1 displays sidebar 560-2 in addition to the displayed e-mail message in the e-mail application's user interface 570-1.

FIGS. 5III and 5JJJ illustrate changes in user interface 570-1 of the e-mail application when first multifunction device 100-1 is rotated clockwise from the landscape orientation (FIG. 5III) to the portrait orientation (FIG. 5JJJ). FIG. 5JJJ illustrates the display of popup view 530-6, which replaces sidebar 560-2 in FIG. 5III.

FIG. 5JJJ also illustrates detection of contact 559-A or other touch gesture at a location corresponding to action icon 532-16. In response, the e-mail application's user interface 570-1 displays action popup view 530-8, as shown in FIG. 5KKK.

FIG. 5LLL illustrates exemplary user interfaces with interactive popup view 530-9 on touch screen 112-1 in the settings mode of first multifunction device 100-1. Touch screen 112-2 of second multifunction device 100-2 is not depicted for brevity. However, in FIG. 5LLL, popup view 530-9 has a lateral resolution corresponding to the lateral resolution of touch screen 112-2 of second multifunction device 100-2, as described above.

In FIG. 5LLL, popup view 530-9 includes the following elements, or a subset or superset thereof:
- a date element that displays the current date; when activated, the date element initiates the display of wheels of time for the current date;
- a time element that displays the current time; when activated, the time element initiates the display of a "wheels of time" object for setting the current time; and
- a wheels of time object that displays the current time or date; when activated, the wheels of time object enables a user to edit the current time or date; in the example shown in FIG. 5LLL, the wheels of time object is configured to allow editing of the current time.

Figure 6A:
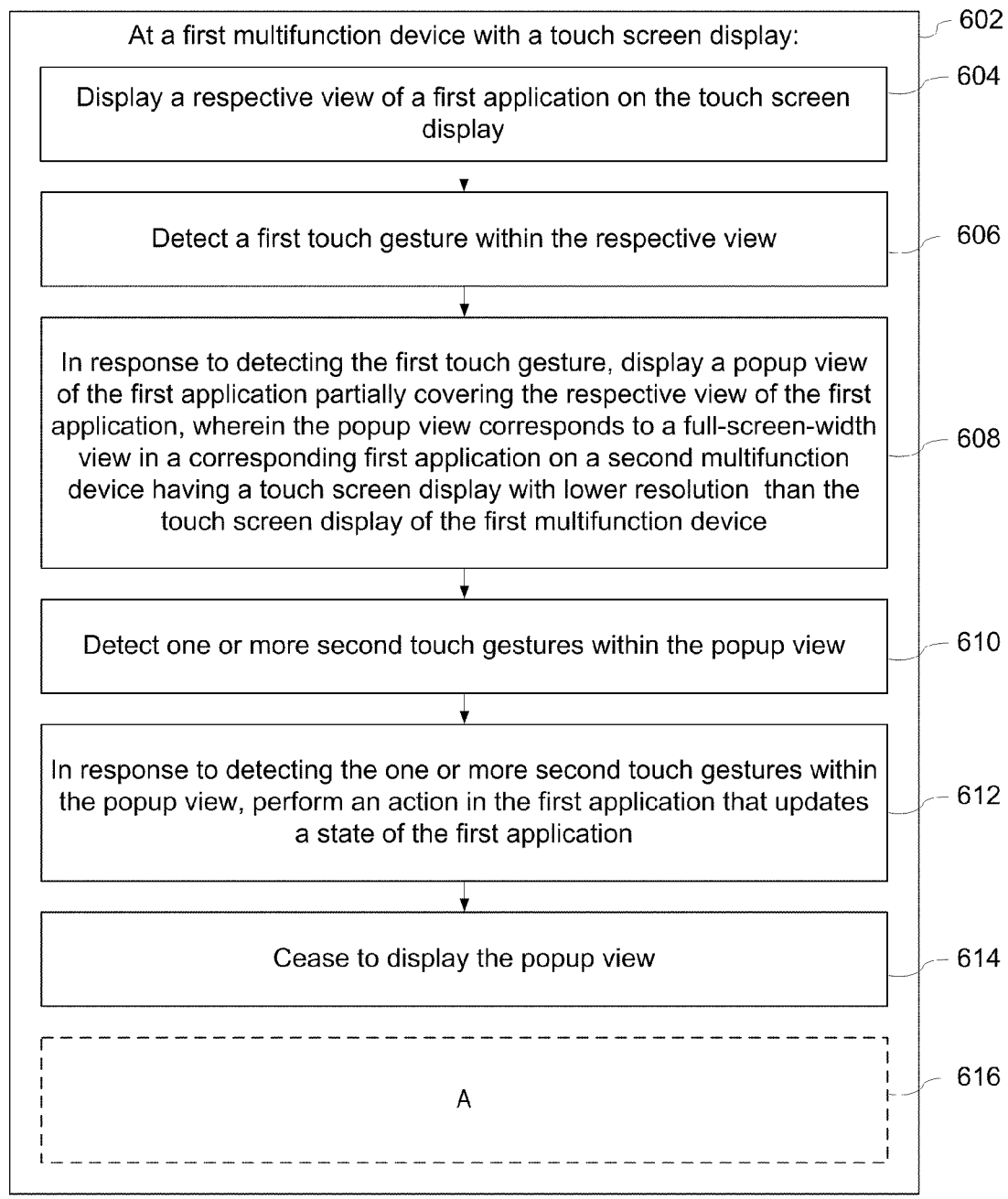
FIGS. 6A-6B are flow diagrams illustrating a method of using interactive popup views in accordance with some embodiments.
Figure 6B:
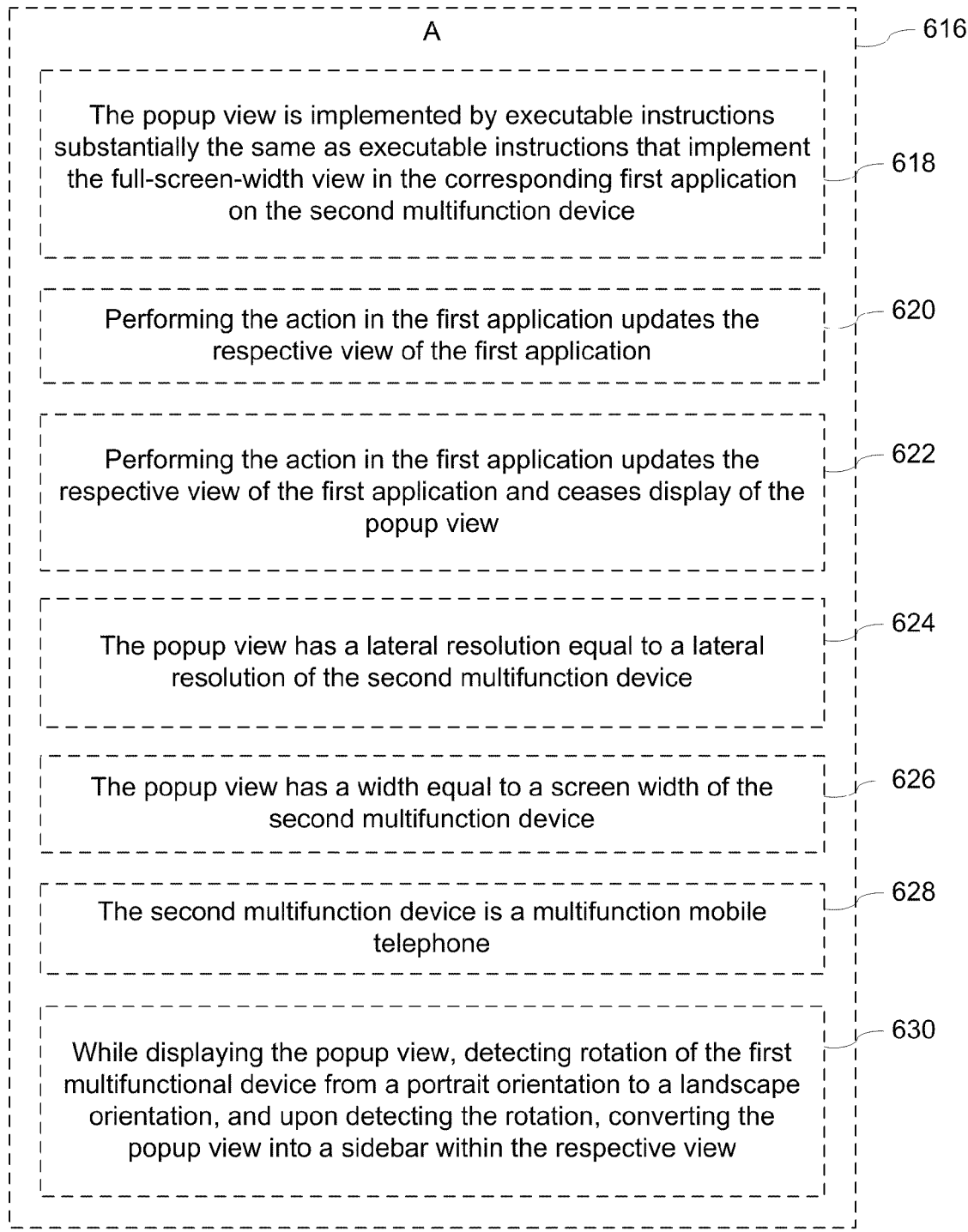

FIGS. 6A-6B are flow diagrams illustrating method 600 of using interactive popup views in accordance with some embodiments. FIG. 6A-6B also include limitations (616) in various embodiments. Method 600 is performed at a first multifunction device (e.g., device 300, FIG. 3, or portable multifunction device 100, FIG. 1A or FIG. 1B) having a display and a touch-sensitive surface. In some embodiments, the display is a touch screen display (602) and the touch-sensitive surface is on the display (e.g., touch screen display 112 in FIGS. 5A-5LLL). In some embodiments, the display is separate from the touch-sensitive surface. As described in more detail below, some operations in method 600 may be combined and/or the order of some operations may be changed.

As described below, method 600 provides an intuitive way to use popup views on a first multifunction device having a touch screen with a first resolution. When a user is familiar with applications in a second multifunction device having a touch screen display with second, lower resolution than the first resolution of the touch screen of the first multifunction device, the method reduces the cognitive burden on a user when working with corresponding applications in the first multifunction device by providing a familiar graphical user interface, thereby creating a more efficient human-machine interface. Also developers, when porting applications developed for the second multifunction device to the first multifunction device, either do not need to change the graphical user interface, or can leave large portions of the instructions implementing the graphical user interface unchanged, thereby reducing development time and cost. For battery-operated computing devices, enabling a user to work with the applications faster and more efficiently conserves power and increases the time between battery charges.

The device displays a respective view of a first application on the touch screen display (604). For example, the respective view may be a view of a map application (e.g., FIG. 5A), a browser application (e.g., FIG. 5U), a note application (e.g., 5KK), and/or an e-mail application (e.g., FIG. 5RR).

The device detects a first touch gesture within the respective view (606). The touch gesture is any gesture detected by the sensor of a touch screen display (e.g., the detected gesture may be any of contacts 507-A, 519-A, 523-A, 531-A, 535-A, 539-A, 543-A, 547-A, 551-A, and 555-A). As described with reference to FIG. 2, the detected first touch gesture is a gesture on, or in close proximity to touch screen 112 made by one or more fingers or one or more styluses 203.

In response to detecting the first touch gesture, the device displays a popup view of the first application partially covering the respective view of the first application (608). The popup view corresponds to a full-screen-width view in a corresponding first application on a second multifunction device having a touch screen display with lower resolution than the touch screen display of the first multifunction device.

In some embodiments, the popup view and the corresponding full-screen-width view are identical (e.g., identical elements appear in identical layout). For example, in FIG. 5N, popup view 530-2 and the corresponding full-screen-width view on second multifunction device 100-2 are identical.

In some embodiments, the popup view and the corresponding full-screen-width view include some elements in common, but not all elements on one view appear on the other view. For example, in FIG. 5G, popup view 530-1 includes directions to icon 532-4, directions from icon 532-5, phone icon 538-1, home page icon 538-2, and address icon 538-3. The full-screen-width view of second multifunction device 100-2 also includes corresponding icons. However, popup view 530-1 includes one or more additional elements, for example street view icon 538-4, which are not included in the full-screen-width view on second multifunction device 100-2. In another example, in FIG. 5W, popup view 530-3 includes icons 538-8, 538-9, and 538-10. The corresponding full-screen-width view includes corresponding icons (e.g., icons 538-8', 538-9', and 538-10') as well as additional elements (e.g., cancel icon 538-7', address bar, and search input area) that do not appear in popup view 530-3.

In some embodiments, the popup view and the corresponding full-screen-width view include functionally identical elements but the functionally identical elements are laid out or configured differently. For example, in FIG. 5Z, popup view 530-4 and the corresponding full-screen-width view have identical elements (except for the done icon 532-7'), but the edit icon is laid out in different locations in the respective views.

In some embodiments, the popup view is opaque. In some embodiments, the popup view is transparent. In some other embodiments, the popup view is semi-transparent. In yet other embodiments, at least a portion of the popup view is transparent or semi-transparent.

In some embodiments, in response to detecting the first touch gesture, the device updates the respective view before displaying the popup view (e.g., as described above with reference to FIG. 5CCC, in response to a touch gesture, a displayed e-mail message is decreased in size, and a text bar is displayed, providing instructions to a respective user).

In some embodiments, the second multifunction device is a pocket-sized portable device that has a screen width of one to four inches (e.g., 2.5 inches) and a lateral resolution of 200 to 500 pixels (e.g., 320 pixels).

In some embodiments, the popup view has a lateral resolution equal to a lateral resolution of the second multifunction device (624). For example, when the lateral resolution of the second multifunction device is 320 pixels, the popup view has a lateral resolution of 320 pixels. In some embodiments, the popup view has a lateral resolution substantially equal to the lateral resolution of the second multifunction device (e.g., the lateral resolution of the popup view is within 5%, 10%, 15%, or 20% of the lateral resolution of the second multifunction device).

In some embodiments, the popup view has a lateral resolution that is an integer multiple of the lateral resolution of the second multifunction device (e.g., the lateral resolution of the second multifunction device is 320 pixels, and the lateral resolution of the popup view is 640 pixels (2× multiplier) or 960 pixels (3× multiplier)). Such integer multiples allow an efficient method of converting a user interface in a lower resolution device for display in a higher resolution device. In some embodiments, the popup view has a vertical resolution that is an integer multiple of a vertical resolution of the second multifunction device (e.g., the vertical resolution of the second multifunction device is 480 pixels, and the vertical resolution of the popup view is 960 pixels (2× multiplier) or 1440 pixels (3× multiplier)). In some embodiments, the integer multiple for the lateral resolution and the integer multiple for the vertical resolution are identical.

In some embodiments, the popup view has a width equal to a screen width of the second multifunction device (626). For example, when the screen width of the second multifunction device is two inches, the popup view on the first multifunction device has a width of two inches, regardless of the resolution of either device. However, in other embodiments, while the popup view has a lateral resolution equal to a lateral resolution of the second multifunction device (624), the width of the popup view displayed by the first multifunction device is larger than the screen width of the second multifunction device. In some embodiments, the popup view has a width substantially equal to the screen width of the second multifunction device (e.g., the width of the popup view is within 5%, 10%, 15%, or 20% of the screen width of the second multifunction device).

In some embodiments, the second multifunction device is a portable computing device that can process media such as audio, video, and/or images. For example, the second multifunction device may include a music player, a game player, a video player, a video recorder, a camera, and/or an image viewer. In some embodiments, the second multifunction device includes a mobile phone. The second multifunction device is typically battery operated and highly portable. In some embodiments, the second multifunction device is a handheld device that is sized for placement into a pocket of the user. By being pocket sized, the user does not have to directly carry the second multifunction device and therefore the device can be taken almost anywhere the user travels. Furthermore, the user's hands may operate the second multifunction device without needing a reference surface such as a desktop.

In some embodiments, the second multifunction device is a multifunction mobile telephone (628).

After displaying the popup view, the device also detects one or more second touch gestures within the popup view (610). In response to detecting the one or more second touch gestures within the popup view, the device performs an action in the first application that updates a state (e.g., application internal state 192, FIG. 1C) of the first application (612). For example, in FIGS. 5J-5K, contact 511-A is detected, and in response, the second popup view 534-1 is displayed. In FIGS. 5K-5N, contact 513-A or 513-AA is detected, and in response, the third popup view 530-2 is displayed. In addition, in response to user-entered information and user selection of done icon 532-5 (FIG. 5N), the map application creates an entry for a new contact in the user's address book or contact list, which is stored in memory (e.g., in application internal state 192 of contacts module 137 in memory 102 or memory 370).

In some embodiments, performing the action in the first application updates the respective view of the first application (620). For example, in FIG. 5TT-5UU, contact 537-A is detected within popup view 530-6, and in response, the device 100-1 displays the selected e-mail message in the respective view of the e-mail application, and ceases the display of popup view 530-6. In this example, the e-mail application also updates its application internal state 192 (e.g., in memory 102 or memory 370) to indicate the selected e-mail message as an e-mail message for display.

In some embodiments, performing the action in the first application updates the respective view of the first application and ceases display of the popup view (622). For example, in FIG. 5TT-5UU, the device 100-1 updates the respective view of the e-mail application, as described above. In addition, the e-mail application ceases the display of popup view 530-6.

As noted above, in response to certain user actions, the device ceases to display the popup view (614). For example, in FIGS. 5X-5Y, in response to detecting contact 521-A, the device 100-1 ceases to display popup view 530-3. Additional examples can be found in FIGS. 5II-5JJ, 5OO-5PP, 5AAA-5BBB, 5EEE-5FFF, and 5GGG-5HHH.

In some embodiments, the popup view is implemented by executable instructions for the first multifunction device that are substantially the same as executable instructions that implement a corresponding full-screen-width view in the corresponding first application on the second multifunction device (618). For example, in FIGS. 5A-5LLL, a map application (e.g., FIG. 5A), a browser application (e.g., FIG. 5U), a note application (e.g., 5KK), and/or an e-mail application (e.g., FIG. 5RR) on the first multifunction device 100-1 may have substantially the same executable instructions that implement the corresponding full-screen-width view in the corresponding applications on the second multifunction device 100-2. Having substantially the same executable instructions makes it faster and easier for developers to write an application for the first multifunction device and a corresponding application for the second multifunction device. For example, developers that have written an application to run on a pocket-sized multifunction device (e.g., a smart phone) can easily write a corresponding application to run on a larger multifunction device (e.g., a tablet computer). In addition, the user interfaces in the respective applications on the first and second multifunction devices will behave similarly, thereby reducing the time needed for users to learn and become proficient in using the respective applications on the first and second multifunction devices. For example, a user that knows how to use an application on a pocket-sized multifunction device (e.g., a smart phone) will be able to use the corresponding application on a larger multifunction device (e.g., a tablet computer) with little or no additional training.

In some embodiments, executable instructions (as further defined below) for the first multifunction device and executable instructions for the second multifunction device are substantially the same when at least a substantial portion of the executable instructions are identical (e.g., 50, 75 or 90 percent of the executable instructions). The aforementioned executable instructions for the first multifunction device refer to the set of instructions for the first multifunction device within an application required to display a popup view, detect one or more gestures in the popup view, and perform one or more actions in response to the gestures.

In some embodiments, while displaying the popup view, the device detects rotation of the first multifunctional device from a portrait orientation to a landscape orientation, and upon detecting the rotation, converts the popup view into a sidebar alongside the respective view (630). For example, in FIGS. 5VV-5WW, the device 100-1 detects rotation from a portrait orientation to a landscape orientation, and upon detecting the rotation, converts popup view 530-6 into sidebar 560-2 alongside the respective view.

Figure 7A:
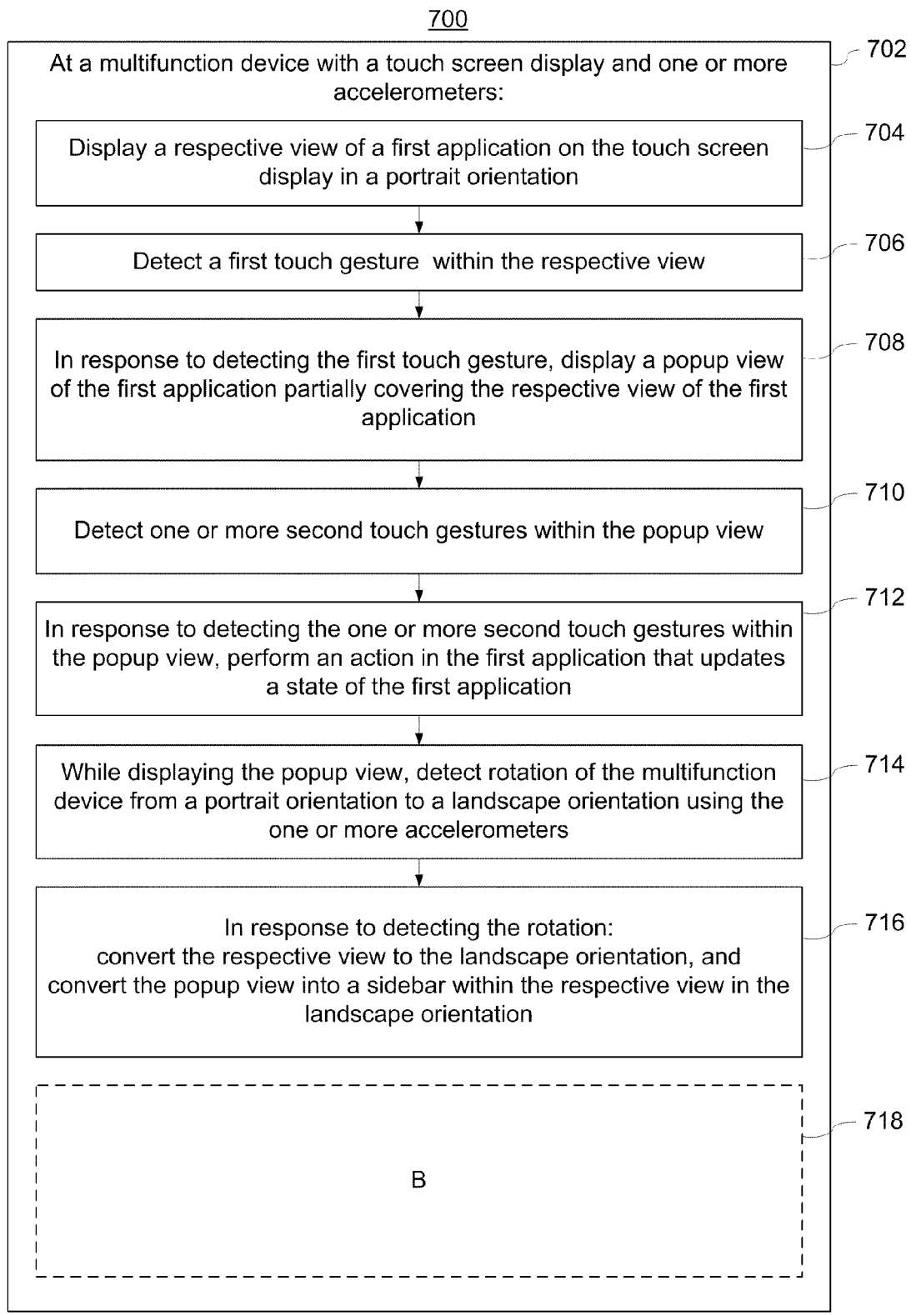
FIGS. 7A-7B are flow diagrams illustrating a method of converting a popup view into a sidebar in accordance with some embodiments.
Figure 7B:
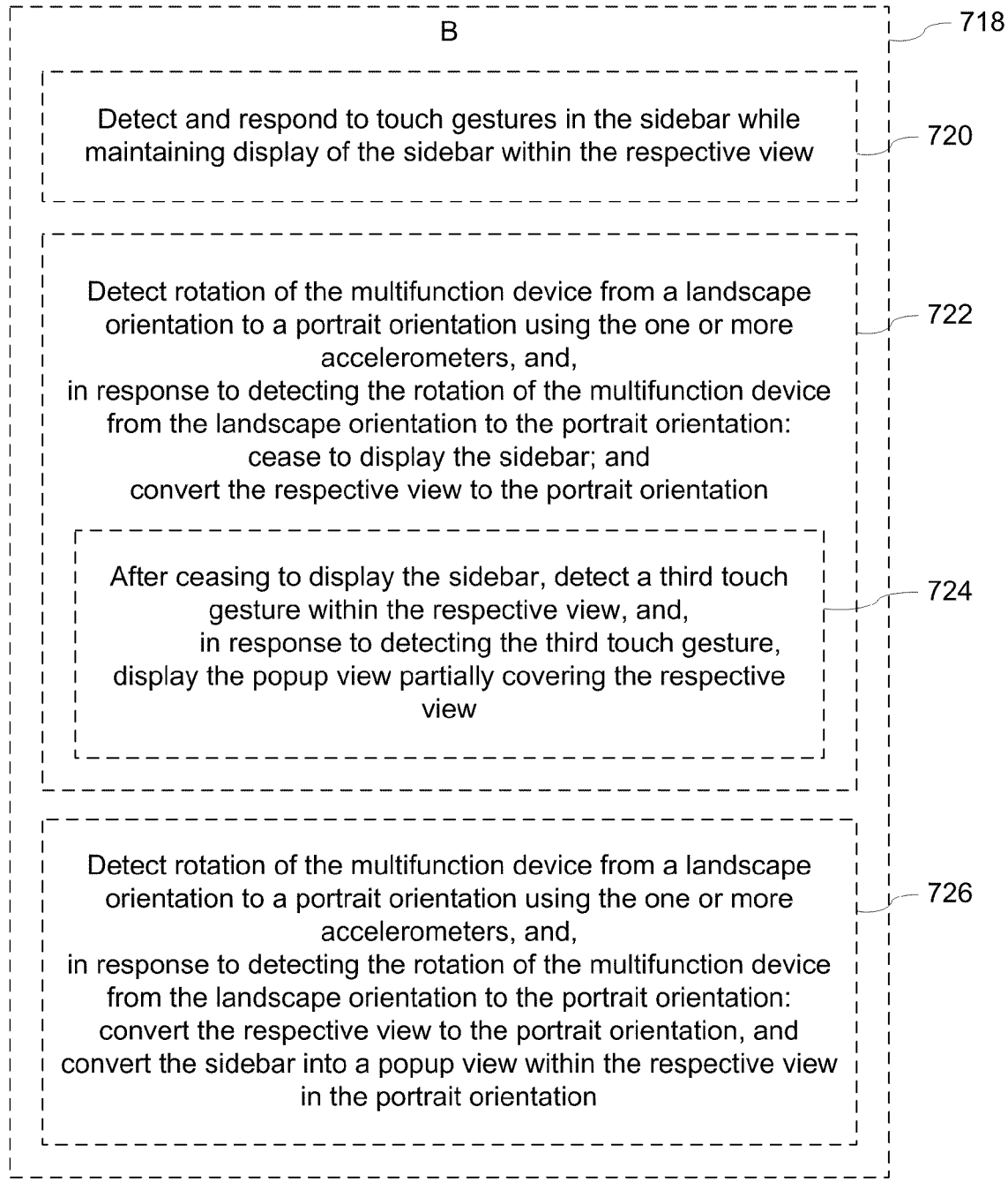

FIGS. 7A-7B are flow diagrams illustrating method 700 of converting a popup view into a sidebar in accordance with some embodiments. Method 700 is performed at a first multifunction device (e.g., device 300, FIG. 3, or portable multifunction device 100, FIG. 1) with a display and a touch-sensitive surface, and one or more accelerometers (702). In some embodiments, the display is a touch screen display and the touch-sensitive surface is on the display (e.g., touch screen display 112 in FIGS. 5A-5LLL). In some embodiments, the display is separate from the touch-sensitive surface. Some operations in method 700 may be combined and/or the order of some operations may be changed.

It should be noted that the details of method 600 above (e.g., FIGS. 6A-6B) are also applicable in an analogous manner to the methods described below. For brevity, these details are not repeated below.

As described below, method 700 provides a better way to utilize the entire display area of a multifunction device. When the device is in a particular orientation, the device can simultaneously display related information to help more efficient use of an application. This method eliminates extra steps to retrieve the related information, and also reduces the cognitive burden on a user when working with the application by making it easy to find related information in a simultaneous display, thereby creating a more efficient human-machine interface. For battery-operated computing devices, enabling a user to work with applications faster and more efficiently conserves power and increases the time between battery charges.

The device displays a respective view of a first application on the touch screen display in a portrait orientation (704). The device detects a first touch gesture within the respective view (706). In response to detecting the first touch gesture, the device displays a popup view of the first application partially covering the respective view of the first application (708). After displaying the popup view, the device detects one or more second touch gestures within the popup view (710). In response to detecting the one or more second touch gestures within the popup view, the device performs an action in the first application that updates a state (e.g., application internal state 192, FIG. 1C) of the first application (712).

While displaying the popup view, the device detects rotation of the multifunction device from a portrait orientation to a landscape orientation using the one or more accelerometers (714). In response to detecting the rotation, the device converts the respective view to the landscape orientation, and converts the popup view into a sidebar alongside the respective view in the landscape orientation (716). For example, in FIGS. 5VV-5WW, the device 100-1 detects rotation from a portrait orientation to a landscape orientation using the one or more accelerometers. In response, the device 100-1 converts the respective view to the landscape orientation, and converts popup view 530-6 into sidebar 560-2 alongside the respective view in the landscape orientation.

Method 700 optionally includes one or more additional limitations (718) in various embodiments. In some embodiments, the device also detects and responds to touch gestures in the sidebar while maintaining display of the sidebar alongside the respective view (720). For example, in FIG. 5WW, the device 100-1 detects contact 541-A in sidebar 560-2, which selects a respective e-mail message, and responds by displaying the selected e-mail message in touch screen 112-1.

In some embodiments, the device also detects rotation of the multifunction device from a landscape orientation to a portrait orientation using the one or more accelerometers (722). In response to detecting the rotation of the multifunction device from the landscape orientation to the portrait orientation, the device ceases to display the sidebar, and converts the respective view to the portrait orientation (722). For example, in FIGS. 5XX and 5ZZ, the device 100-1 detects rotation from a landscape orientation to a portrait orientation. In response, the device 100-1 ceases to display sidebar 560-2, and converts the respective view to the portrait orientation.

In some embodiments, after ceasing to display the sidebar, the device detects a third touch gesture within the respective view (724). In response to detecting the third touch gesture, the device displays a popup view partially covering the respective view. For example, in FIGS. 5ZZ-5AAA, the device 100-1 detects contact 543-A and displays popup view 530-6.

In some embodiments, the device detects rotation of the multifunction device from a landscape orientation to a portrait orientation using the one or more accelerometers (726). In response to detecting the rotation of the multifunction device from the landscape orientation to the portrait orientation, the device converts the respective view to the portrait orientation, and converts a respective sidebar into a corresponding popup view within the respective view in the portrait orientation. For example, in FIGS. 5XX-5YY, the device 100-1 detects rotation from a landscape orientation to a portrait orientation. In response, the device 100-1 converts the respective view to the portrait orientation, and converts sidebar 560-2 into popup view 530-6. Another example is depicted in FIGS. 5III-5JJJ.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are included within the scope of protection of the invention.

The operations described above with reference to FIGS. 6A, 6B, 7A and 7B may be implemented by components depicted in FIGS. 1A-1C. For example, detection operation 610, action performance operation 612, and rotation detection and response operation 630 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 180 associated with the detection of the event or sub-event. Event handler 180 may utilize or call data updater 176 or object updater 177 to update the internal state of application 136-1 data. In some embodiments, event handler 180 accesses a respective GUI updater 178 to update what is displayed by the application. Similarly, it would be clear to a person having ordinary skill in the art how other processes can be implemented based on the components depicted in FIGS. 1A-1C.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A multifunction device, comprising:
    a touch screen display;
    one or more accelerometers
    one or more processors;
    memory; and
    one or more programs, wherein the one or more programs are stored in the memory and configured to be executed by the one or more processors, the one or more programs including instructions for:
        displaying a respective view of a first application on the touch screen display in a portrait orientation;
        detecting a first touch gesture within the respective view;
        in response to detecting the first touch gesture, displaying a popup view of the first application partially covering the respective view of the first application;
        detecting one or more second touch gestures within the popup view;
        in response to detecting the one or more second touch gestures within the popup view, performing an action in the first application that updates a state of the first application;
        while displaying the popup view, detecting rotation of the multifunction device from a portrait orientation to a landscape orientation using the one or more accelerometers, and, in response to detecting the rotation:
            converting the respective view to the landscape orientation, and
            converting the popup view into a sidebar view alongside the respective view in the landscape orientation.

2. The device of claim 1, further including detecting and responding to touch gestures in the sidebar while maintaining display of the sidebar alongside the respective view.

3. The device of claim 1, further including:
    detecting rotation of the multifunction device from a landscape orientation to a portrait orientation using the one or more accelerometers; and,
    in response to detecting the rotation of the multifunction device from the landscape orientation to the portrait orientation:
        ceasing to display the sidebar; and
        converting the respective view to the portrait orientation.

4. The device of claim 3, further including:
    after ceasing to display the sidebar, detecting a third touch gesture within the respective view; and,
    in response to detecting the third touch gesture, displaying the popup view partially covering the respective view.

5. The device of claim 1, further including:
    detecting rotation of the multifunction device from a landscape orientation to a portrait orientation using the one or more accelerometers; and,
    in response to detecting the rotation of the multifunction device from the landscape orientation to the portrait orientation:
        converting the respective view to the portrait orientation; and
        converting the sidebar into a popup view within the respective view in the portrait orientation.

6. A method, comprising:
    at a multifunction device with a touch screen display and one or more accelerometers:
        displaying a respective view of a first application on the touch screen display in a portrait orientation;
        detecting a first touch gesture within the respective view;
        in response to detecting the first touch gesture, displaying a popup view of the first application partially covering the respective view of the first application;
        detecting one or more second touch gestures within the popup view;
        in response to detecting the one or more second touch gestures within the popup view,
            performing an action in the first application that updates a state of the first application;
        while displaying the popup view, detecting rotation of the multifunction device from a portrait orientation to a landscape orientation using the one or more accelerometers, and,
        in response to detecting the rotation:

converting the respective view to the landscape orientation, and converting the popup view into a sidebar alongside the respective view in the landscape orientation.

7. A non-transitory computer readable storage medium storing one or more programs, the one or more programs comprising instructions, which when executed by a multifunction device with a touch screen display and one or more accelerometers, cause the device to:

display a respective view of a first application on the touch screen display in a portrait orientation;

detect a first touch gesture within the respective view;

in response to detecting the first touch gesture, display a popup view of the first application partially covering the respective view of the first application;

detect one or more second touch gestures within the popup view;

in response to detecting the one or more second touch gestures within the popup view, perform an action in the first application that updates a state of the first application;

while displaying the popup view, detect rotation of the multifunction device from a portrait orientation to a landscape orientation using the one or more accelerometers, and, in response to detecting the rotation:

convert the respective view to the landscape orientation, and convert the popup view into a sidebar alongside the respective view in the landscape orientation.

8. The method of claim 6, including detecting and responding to touch gestures in the sidebar while maintaining display of the sidebar alongside the respective view.

9. The method of claim 6, including:

detecting rotation of the multifunction device from a landscape orientation to a portrait orientation using the one or more accelerometers; and, in response to detecting the rotation of the multifunction device from the landscape orientation to the portrait orientation:

ceasing to display the sidebar; and converting the respective view to the portrait orientation.

10. The method of claim 9, including:

after ceasing to display the sidebar, detecting a third touch gesture within the respective view; and, in response to detecting the third touch gesture, displaying the popup view partially covering the respective view.

11. The method of claim 6, including:

detecting rotation of the multifunction device from a landscape orientation to a portrait orientation using the one or more accelerometers; and, in response to detecting the rotation of the multifunction device from the landscape orientation to the portrait orientation:

converting the respective view to the portrait orientation; and converting the sidebar into a popup view within the respective view in the portrait orientation.

12. The computer readable storage medium of claim 7, including instructions which cause the device to: detect and respond to touch gestures in the sidebar while maintaining display of the sidebar alongside the respective view.

13. The computer readable storage medium of claim 7, including instructions which cause the device to:

detect rotation of the multifunction device from a landscape orientation to a portrait orientation using the one or more accelerometers; and, in response to detecting the rotation of the multifunction device from the landscape orientation to the portrait orientation:

cease to display the sidebar; and convert the respective view to the portrait orientation.

14. The computer readable storage medium of claim 13, including instructions which cause the device to:

after ceasing to display the sidebar, detect a third touch gesture within the respective view; and, in response to detecting the third touch gesture, display the popup view partially covering the respective view.

15. The computer readable storage medium of claim 7, including instructions which cause the device to:

detect rotation of the multifunction device from a landscape orientation to a portrait orientation using the one or more accelerometers; and, in response to detecting the rotation of the multifunction device from the landscape orientation to the portrait orientation:

convert the respective view to the portrait orientation; and convert the sidebar into a popup view within the respective view in the portrait orientation.

* * * * *